(12) United States Patent
Schneider

(10) Patent No.: US 8,612,565 B2
(45) Date of Patent: *Dec. 17, 2013

(54) FICTITIOUS DOMAIN NAME METHOD, SYSTEM, PRODUCT, AND APPARATUS

(75) Inventor: Eric Schneider, Delray Beach, FL (US)

(73) Assignee: ESDR Network Solutions LLC, Wilmington, DE (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/538,433

(22) Filed: Jun. 29, 2012

(65) Prior Publication Data
US 2012/0278467 A1 Nov. 1, 2012

Related U.S. Application Data

(63) Continuation of application No. 10/711,834, filed on Oct. 7, 2004, now Pat. No. 8,224,994, which is a continuation of application No. 09/682,351, filed on Aug. 23, 2001, now abandoned, which is a continuation-in-part of application No. 09/682,133, filed on Jul. 25, 2001, now Pat. No. 7,194,552, and a continuation-in-part of application No. 09/525,350, filed on Mar. 15, 2000, now Pat. No. 6,338,082, and a continuation-in-part of application No. 09/635,100, filed on Aug. 31, 2000, now Pat. No. 6,760,746, and a continuation-in-part of application No. 09/650,827, filed on Aug. 30, 2000, now Pat. No. 6,901,436, and a continuation-in-part of application No. 09/598,134, filed on Jun. 21, 2000, now Pat. No. 6,895,430, and a continuation-in-part of application No. 09/532,500, filed on Mar. 21, 2000, now Pat. No. 7,136,932.

(60) Provisional application No. 61/075,825, filed on Jan. 13, 2000, provisional application No. 60/160,125, filed on Oct. 18, 1999, provisional application No. 60/157,075, filed on Oct. 1, 1999, provisional application No. 60/130,136, filed on Apr. 20, 1999, provisional application No. 60/125,531, filed on Mar. 22, 1999.

(51) Int. Cl.
*G06F 15/173* (2006.01)

(52) U.S. Cl.
USPC ........... 709/223; 709/203; 709/219; 709/227; 709/244

(58) Field of Classification Search
USPC .......................... 709/203, 219, 223, 227, 244
See application file for complete search history.

(56) References Cited

U.S. PATENT DOCUMENTS 4,155,042 A 5/1979 Permut et al.
4,190,800 A 2/1980 Kelly, Jr. et al.
(Continued)

FOREIGN PATENT DOCUMENTS

JP 54136617 10/1979
JP 11085492 3/1999
(Continued)

OTHER PUBLICATIONS

Network Solutions and Leading Launch Premier Domain Registration Service Program, Mar. 1997.

(Continued)

*Primary Examiner* — Backhean Tiv
(74) *Attorney, Agent, or Firm* — Fitch, Even, Tabin & Flannery LLP

(57) ABSTRACT

A DNS server receives a DNS query based on a predetermined syntax, with the DNS query having a domain name having a highest level domain (HLD). The DNS server uses a root zone file having a resource record to resolve the DNS query in response to determining that the HLD is a top level domain alias (TLDA) that is not an HLD registered in the DNS server. The resource record of the root zone file includes an IP address corresponding to a network resource that is configured to determine a namespace provider that can process the domain name having the TLDA.

17 Claims, 47 Drawing Sheets

(56) References Cited

U.S. PATENT DOCUMENTS

| | | |
|---|---|---|
| 4,196,310 A | 4/1980 | Forman et al. |
| 4,390,876 A | 6/1983 | Bjorklund et al. |
| 4,486,853 A | 12/1984 | Parsons |
| 4,754,326 A | 6/1988 | Kram et al. |
| 4,811,382 A | 3/1989 | Sleevi |
| 4,823,265 A | 4/1989 | Nelson |
| 4,903,206 A | 2/1990 | Itoh et al. |
| 4,956,771 A | 9/1990 | Neustaedter |
| 4,956,875 A | 9/1990 | Bernard et al. |
| 5,109,486 A | 4/1992 | Seymour |
| 5,155,837 A | 10/1992 | Liu et al. |
| 5,155,847 A | 10/1992 | Kirouac et al. |
| 5,175,681 A | 12/1992 | Iwai et al. |
| 5,231,570 A | 7/1993 | Lee |
| 5,249,230 A | 9/1993 | Mihm, Jr. |
| 5,249,275 A | 9/1993 | Srivastava |
| 5,319,699 A | 6/1994 | Kerihuel et al. |
| 5,321,740 A | 6/1994 | Gregorek et al. |
| 5,386,369 A | 1/1995 | Christiano |
| 5,402,490 A | 3/1995 | Mihm, Jr. |
| 5,404,231 A | 4/1995 | Bloomfield |
| 5,404,505 A | 4/1995 | Levinson |
| 5,418,951 A | 5/1995 | Damashek |
| 5,437,031 A | 7/1995 | Kitami |
| 5,444,823 A | 8/1995 | Nguyen |
| 5,446,891 A | 8/1995 | Kaplan et al. |
| 5,454,105 A | 9/1995 | Hatakeyama et al. |
| 5,500,561 A | 3/1996 | Wilhelm |
| 5,534,734 A | 7/1996 | Pugh et al. |
| 5,535,257 A | 7/1996 | Goldberg et al. |
| 5,544,036 A | 8/1996 | Brown, Jr. et al. |
| 5,572,438 A | 11/1996 | Ehlers et al. |
| 5,576,700 A | 11/1996 | Davis et al. |
| 5,592,620 A | 1/1997 | Chen et al. |
| 5,598,464 A | 1/1997 | Hess et al. |
| 5,600,778 A | 2/1997 | Swanson et al. |
| 5,603,034 A | 2/1997 | Swanson |
| 5,623,679 A | 4/1997 | Rivette et al. |
| 5,623,681 A | 4/1997 | Rivette et al. |
| 5,625,818 A | 4/1997 | Zarmer et al. |
| 5,634,016 A | 5/1997 | Steadham, Jr. et al. |
| 5,634,048 A | 5/1997 | Ryu et al. |
| 5,640,561 A | 6/1997 | Satoh et al. |
| 5,644,625 A | 7/1997 | Solot |
| 5,649,186 A | 7/1997 | Ferguson |
| 5,664,170 A | 9/1997 | Taylor |
| 5,673,252 A | 9/1997 | Johnson et al. |
| 5,684,710 A | 11/1997 | Ehlers et al. |
| 5,692,132 A | 11/1997 | Hogan |
| 5,693,205 A | 12/1997 | Santure et al. |
| 5,696,695 A | 12/1997 | Ehlers et al. |
| 5,699,428 A | 12/1997 | McDonnal et al. |
| 5,701,399 A | 12/1997 | Lee et al. |
| 5,708,709 A | 1/1998 | Rose |
| 5,721,897 A | 2/1998 | Rubinstein |
| 5,742,818 A | 4/1998 | Shoroff et al. |
| 5,745,360 A | 4/1998 | Leone et al. |
| 5,761,083 A | 6/1998 | Brown, Jr. et al. |
| 5,761,689 A | 6/1998 | Rayson et al. |
| 5,764,906 A | 6/1998 | Edelstein et al. |
| 5,777,989 A * | 7/1998 | McGarvey .................... 370/254 |
| 5,778,367 A | 7/1998 | Wesinger, Jr. et al. |
| 5,790,790 A | 8/1998 | Smith et al. |
| 5,802,524 A | 9/1998 | Flowers et al. |
| 5,812,776 A | 9/1998 | Gifford |
| 5,813,007 A | 9/1998 | Nielsen |
| 5,815,830 A | 9/1998 | Anthony |
| 5,835,087 A | 11/1998 | Herz et al. |
| 5,841,850 A | 11/1998 | Fan |
| 5,842,203 A | 11/1998 | D'Elena et al. |
| 5,848,396 A | 12/1998 | Gerace |
| 5,857,201 A | 1/1999 | Wright, Jr. et al. |
| 5,870,546 A | 2/1999 | Kirsch |
| 5,881,131 A | 3/1999 | Farris et al. |
| 5,890,172 A | 3/1999 | Borman et al. |
| 5,892,919 A | 4/1999 | Nielsen |
| 5,892,920 A | 4/1999 | Arvidsson et al. |
| 5,895,454 A | 4/1999 | Harrington |
| 5,898,836 A | 4/1999 | Freivald et al. |
| 5,907,680 A | 5/1999 | Nielsen |
| 5,908,467 A | 6/1999 | Barrett et al. |
| 5,913,215 A | 6/1999 | Rubinstein et al. |
| 5,926,116 A | 7/1999 | Kitano et al. |
| 5,933,604 A | 8/1999 | Inakoshi |
| 5,937,037 A | 8/1999 | Kamel et al. |
| 5,937,162 A | 8/1999 | Funk et al. |
| 5,940,847 A | 8/1999 | Fein et al. |
| 5,944,787 A | 8/1999 | Zoken |
| 5,949,419 A | 9/1999 | Domine et al. |
| 5,953,400 A | 9/1999 | Rosenthal et al. |
| 5,953,721 A | 9/1999 | Doi et al. |
| 5,963,205 A | 10/1999 | Sotomayor |
| 5,963,915 A | 10/1999 | Kirsh |
| 5,970,680 A | 10/1999 | Powers |
| 5,974,453 A | 10/1999 | Andersen et al. |
| 5,978,806 A | 11/1999 | Lund |
| 5,978,817 A | 11/1999 | Giannandrea et al. |
| 5,978,828 A | 11/1999 | Greer et al. |
| 5,978,842 A | 11/1999 | Noble et al. |
| 5,982,863 A | 11/1999 | Smiley et al. |
| 5,987,464 A | 11/1999 | Schneider |
| 5,987,508 A | 11/1999 | Agraharam et al. |
| 5,991,368 A | 11/1999 | Quatse et al. |
| 5,991,751 A | 11/1999 | Rivette et al. |
| 5,995,594 A | 11/1999 | Shaffer et al. |
| 5,999,907 A | 12/1999 | Donner |
| 5,999,912 A | 12/1999 | Wodarz et al. |
| 6,003,061 A | 12/1999 | Jones et al. |
| 6,003,077 A | 12/1999 | Bawden et al. |
| 6,003,082 A | 12/1999 | Gampper et al. |
| 6,006,264 A | 12/1999 | Colby et al. |
| 6,006,265 A | 12/1999 | Rangan et al. |
| 6,009,150 A | 12/1999 | Kamel et al. |
| 6,009,459 A | 12/1999 | Belfiore |
| 6,012,066 A | 1/2000 | Discount et al. |
| 6,014,660 A | 1/2000 | Lim et al. |
| 6,018,619 A | 1/2000 | Allard et al. |
| 6,018,768 A | 1/2000 | Ullman et al. |
| 6,021,433 A | 2/2000 | Payne et al. |
| 6,023,724 A | 2/2000 | Bhatia et al. |
| 6,029,195 A | 2/2000 | Herz |
| 6,032,150 A | 2/2000 | Nguyen |
| 6,038,601 A | 3/2000 | Lambert et al. |
| 6,041,324 A | 3/2000 | Earl et al. |
| 6,057,834 A | 5/2000 | Pickover |
| 6,058,250 A | 5/2000 | Harwood et al. |
| 6,058,355 A | 5/2000 | Ahmed et al. |
| 6,061,700 A | 5/2000 | Brobst et al. |
| 6,061,734 A | 5/2000 | London |
| 6,061,738 A | 5/2000 | Osaku et al. |
| 6,065,054 A * | 5/2000 | Dutcher et al. ................ 709/226 |
| 6,085,242 A | 7/2000 | Chandra |
| 6,091,956 A | 7/2000 | Hollenberg |
| 6,092,100 A | 7/2000 | Berstis et al. |
| 6,094,665 A | 7/2000 | Lyons et al. |
| 6,097,108 A | 8/2000 | Tweed |
| 6,098,099 A | 8/2000 | Ellesson et al. |
| 6,104,582 A | 8/2000 | Cannon et al. |
| 6,104,990 A | 8/2000 | Chaney et al. |
| 6,105,098 A | 8/2000 | Ninose et al. |
| 6,119,153 A | 9/2000 | Dujari et al. |
| 6,119,234 A | 9/2000 | Aziz et al. |
| 6,122,520 A | 9/2000 | Want et al. |
| 6,122,627 A | 9/2000 | Carey et al. |
| 6,125,361 A | 9/2000 | Chakrabarti et al. |
| 6,128,623 A | 10/2000 | Mattis et al. |
| 6,134,588 A | 10/2000 | Guenthner et al. |
| 6,137,873 A | 10/2000 | Gilles |
| 6,141,408 A | 10/2000 | Garfinkle |
| 6,141,653 A | 10/2000 | Conklin et al. |
| 6,148,289 A | 11/2000 | Virdy |
| 6,148,342 A | 11/2000 | Ho |
| 6,151,622 A | 11/2000 | Fraenkel et al. |
| 6,151,624 A | 11/2000 | Teare et al. |

(56) References Cited

U.S. PATENT DOCUMENTS

| | | | |
|---|---|---|---|
| 6,154,600 A | 11/2000 | Newman et al. | |
| 6,154,725 A | 11/2000 | Donner | |
| 6,154,771 A | 11/2000 | Rangan et al. | |
| 6,154,777 A | 11/2000 | Ebrahim | |
| 6,157,292 A | 12/2000 | Piercy et al. | |
| 6,167,389 A | 12/2000 | Davis et al. | |
| 6,167,449 A | 12/2000 | Arnold et al. | |
| 6,169,476 B1 | 1/2001 | Flanagan | |
| 6,173,406 B1 | 1/2001 | Wang et al. | |
| 6,181,787 B1 | 1/2001 | Malik | |
| 6,181,985 B1 | 1/2001 | O'Donnell et al. | |
| 6,182,148 B1 | 1/2001 | Tout | |
| 6,182,227 B1 | 1/2001 | Blair et al. | |
| 6,185,619 B1 | 2/2001 | Joffe et al. | |
| 6,189,030 B1 | 2/2001 | Kirsch et al. | |
| 6,195,691 B1 | 2/2001 | Brown | |
| 6,199,076 B1 | 3/2001 | Logan et al. | |
| 6,202,087 B1 | 3/2001 | Gadish | |
| 6,205,139 B1 | 3/2001 | Voit | |
| 6,209,048 B1 | 3/2001 | Wolff | |
| 6,212,565 B1 | 4/2001 | Gupta | |
| 6,219,696 B1 | 4/2001 | Wynblatt et al. | |
| 6,219,709 B1 | 4/2001 | Byford | |
| 6,229,532 B1 | 5/2001 | Fujii | |
| 6,230,168 B1 | 5/2001 | Unger et al. | |
| 6,240,360 B1 | 5/2001 | Phelan | |
| 6,240,555 B1 | 5/2001 | Shoff et al. | |
| 6,249,817 B1 | 6/2001 | Nakabayashi et al. | |
| 6,256,671 B1 | 7/2001 | Strentzsch et al. | |
| 6,256,739 B1 | 7/2001 | Skopp et al. | |
| 6,259,771 B1 | 7/2001 | Kredo et al. | |
| 6,259,972 B1 | 7/2001 | Sumic et al. | |
| 6,269,361 B1 | 7/2001 | Davis et al. | |
| 6,282,511 B1 | 8/2001 | Mayer | |
| 6,292,172 B1 | 9/2001 | Makhlouf | |
| 6,292,709 B1 | 9/2001 | Uhl et al. | |
| 6,297,819 B1 | 10/2001 | Furst | |
| 6,298,327 B1 | 10/2001 | Hunter et al. | |
| 6,298,341 B1 | 10/2001 | Mann et al. | |
| 6,298,352 B1 | 10/2001 | Kannan et al. | |
| 6,311,214 B1 | 10/2001 | Rhoads | |
| 6,314,469 B1 * | 11/2001 | Tan et al. | 709/245 |
| 6,321,222 B1 | 11/2001 | Soderstrom et al. | |
| 6,321,242 B1 | 11/2001 | Fogg et al. | |
| 6,324,538 B1 | 11/2001 | Wesinger, Jr. et al. | |
| 6,324,585 B1 | 11/2001 | Zhang et al. | |
| 6,324,650 B1 | 11/2001 | Ogilvie | |
| 6,332,141 B2 | 12/2001 | Gonzalez et al. | |
| 6,332,158 B1 * | 12/2001 | Risley et al. | 709/219 |
| 6,338,082 B1 | 1/2002 | Schneider | |
| 6,339,767 B1 | 1/2002 | Rivette et al. | |
| 6,339,786 B1 | 1/2002 | Ueda et al. | |
| 6,356,422 B1 | 3/2002 | Bilac et al. | |
| 6,356,898 B2 | 3/2002 | Cohen et al. | |
| 6,360,256 B1 | 3/2002 | Lim | |
| 6,363,433 B1 | 3/2002 | Nakajima | |
| 6,366,298 B1 | 4/2002 | Haitsuka et al. | |
| 6,366,906 B1 | 4/2002 | Hoffman | |
| 6,381,627 B1 | 4/2002 | Kwan et al. | |
| 6,381,651 B1 | 4/2002 | Nishio et al. | |
| 6,385,620 B1 | 5/2002 | Kurzius et al. | |
| 6,389,462 B1 | 5/2002 | Cohen et al. | |
| 6,393,117 B1 | 5/2002 | Trell | |
| 6,401,118 B1 | 6/2002 | Thomas | |
| 6,405,243 B1 | 6/2002 | Nielsen | |
| 6,412,014 B1 | 6/2002 | Ryan | |
| 6,421,675 B1 | 7/2002 | Ryan et al. | |
| 6,425,003 B1 * | 7/2002 | Herzog et al. | 709/223 |
| 6,427,164 B1 | 7/2002 | Reilly | |
| 6,430,623 B1 | 8/2002 | Alkhatib | |
| 6,434,547 B1 | 8/2002 | Mishelevich et al. | |
| 6,438,583 B1 | 8/2002 | McDowell et al. | |
| 6,442,549 B1 | 8/2002 | Schneider | |
| 6,442,602 B1 * | 8/2002 | Choudhry | 709/218 |
| 6,449,657 B2 | 9/2002 | Stanbach, Jr. et al. | |
| 6,452,609 B1 | 9/2002 | Katinsky et al. | |
| 6,496,981 B1 | 12/2002 | Wistendahl et al. | |
| 6,502,131 B1 | 12/2002 | Vaid et al. | |
| 6,502,132 B1 | 12/2002 | Kumano et al. | |
| 6,505,201 B1 | 1/2003 | Haitsuka et al. | |
| 6,509,833 B2 | 1/2003 | Tate | |
| 6,510,461 B1 | 1/2003 | Nielsen | |
| 6,513,060 B1 | 1/2003 | Nixon et al. | |
| 6,519,589 B2 | 2/2003 | Mann et al. | |
| 6,526,402 B2 | 2/2003 | Ling | |
| 6,532,366 B1 | 3/2003 | Chung et al. | |
| 6,549,892 B1 | 4/2003 | Sansone | |
| 6,556,992 B1 | 4/2003 | Barney et al. | |
| 6,560,634 B1 | 5/2003 | Broadhurst | |
| 6,574,737 B1 | 6/2003 | Kingsford et al. | |
| 6,578,078 B1 | 6/2003 | Smith et al. | |
| 6,591,291 B1 | 7/2003 | Gabber et al. | |
| 6,594,697 B1 | 7/2003 | Praitis et al. | |
| 6,603,844 B1 | 8/2003 | Chavez, Jr. et al. | |
| 6,604,132 B1 | 8/2003 | Hitt | |
| 6,604,241 B1 | 8/2003 | Haeri et al. | |
| 6,605,120 B1 | 8/2003 | Fields et al. | |
| 6,606,659 B1 | 8/2003 | Hegli et al. | |
| 6,608,891 B1 | 8/2003 | Pelletier et al. | |
| 6,611,803 B1 | 8/2003 | Furuyama et al. | |
| 6,615,237 B1 | 9/2003 | Kyne et al. | |
| 6,615,247 B1 | 9/2003 | Murphy | |
| 6,615,348 B1 | 9/2003 | Gibbs | |
| 6,618,697 B1 | 9/2003 | Kantrowitz et al. | |
| 6,618,726 B1 | 9/2003 | Colbath et al. | |
| 6,628,314 B1 | 9/2003 | Hoyle | |
| 6,636,854 B2 | 10/2003 | Dutta et al. | |
| 6,636,961 B1 | 10/2003 | Braun et al. | |
| 6,637,032 B1 | 10/2003 | Feinleib | |
| 6,650,877 B1 | 11/2003 | Tarbouriech et al. | |
| 6,654,741 B1 | 11/2003 | Cohen et al. | |
| 6,654,746 B1 | 11/2003 | Wong et al. | |
| 6,654,779 B1 | 11/2003 | Tsuei | |
| 6,658,573 B1 * | 12/2003 | Bischof et al. | 726/16 |
| 6,665,620 B1 | 12/2003 | Burns et al. | |
| 6,668,278 B1 | 12/2003 | Yen et al. | |
| 6,671,585 B2 | 12/2003 | Lof et al. | |
| 6,671,714 B1 | 12/2003 | Weyer et al. | |
| 6,671,738 B1 | 12/2003 | Rajchel et al. | |
| 6,674,993 B1 | 1/2004 | Tarbouriech | |
| 6,678,717 B1 | 1/2004 | Schneider | |
| 6,691,105 B1 | 2/2004 | Virdy | |
| 6,711,585 B1 | 3/2004 | Copperman et al. | |
| 6,718,321 B2 | 4/2004 | Birrell et al. | |
| 6,728,767 B1 * | 4/2004 | Day et al. | 709/223 |
| 6,735,585 B1 | 5/2004 | Black et al. | |
| 6,745,367 B1 | 6/2004 | Bates et al. | |
| 6,748,375 B1 | 6/2004 | Wong et al. | |
| 6,751,562 B1 | 6/2004 | Blackett et al. | |
| 6,751,606 B1 | 6/2004 | Fries et al. | |
| 6,760,746 B1 * | 7/2004 | Schneider | 709/203 |
| 6,760,770 B1 | 7/2004 | Kageyama | |
| 6,766,369 B1 | 7/2004 | Haitsuka et al. | |
| 6,779,178 B1 | 8/2004 | Lloyd et al. | |
| 6,799,201 B1 | 9/2004 | Lee et al. | |
| 6,826,617 B1 * | 11/2004 | Ansell et al. | 709/229 |
| 6,829,653 B1 * | 12/2004 | Tout | 709/245 |
| 6,836,805 B1 | 12/2004 | Cook | |
| 6,850,940 B2 | 2/2005 | Wesinger, Jr. et al. | |
| 6,880,007 B1 | 4/2005 | Gardos et al. | |
| 6,892,226 B1 | 5/2005 | Tso et al. | |
| 6,895,402 B1 | 5/2005 | Emens et al. | |
| 6,895,430 B1 | 5/2005 | Schneider | |
| 6,901,436 B1 | 5/2005 | Schneider | |
| 6,931,451 B1 | 8/2005 | Logan et al. | |
| 6,944,658 B1 | 9/2005 | Schneider | |
| 6,959,339 B1 | 10/2005 | Wu et al. | |
| 6,961,700 B2 | 11/2005 | Mitchell et al. | |
| 6,963,928 B1 * | 11/2005 | Bagley et al. | 709/245 |
| 6,973,505 B1 | 12/2005 | Schneider | |
| 6,981,023 B1 | 12/2005 | Hamilton et al. | |
| 6,990,678 B2 | 1/2006 | Zigmond | |
| 7,000,028 B1 | 2/2006 | Broadhurst et al. | |
| 7,003,442 B1 | 2/2006 | Tsuda | |

(56) References Cited

U.S. PATENT DOCUMENTS

| | | | |
|---|---|---|---|
| 7,003,719 B1 | 2/2006 | Rosenoff et al. | |
| 7,010,568 B1 | 3/2006 | Schneider et al. | |
| 7,013,298 B1 | 3/2006 | De La Huerga | |
| 7,039,697 B2 | 5/2006 | Bayles | |
| 7,039,708 B1 | 5/2006 | Knobl et al. | |
| 7,069,323 B2 | 6/2006 | Gardos et al. | |
| 7,080,158 B1 | 7/2006 | Squire | |
| 7,089,194 B1 | 8/2006 | Berstis et al. | |
| 7,120,236 B1 | 10/2006 | Schneider | |
| 7,136,725 B1 | 11/2006 | Paciorek et al. | |
| 7,136,932 B1* | 11/2006 | Schneider | 709/245 |
| 7,149,780 B2 | 12/2006 | Quine et al. | |
| 7,188,138 B1 | 3/2007 | Schneider | |
| 7,194,552 B1 | 3/2007 | Schneider | |
| 7,225,249 B1 | 5/2007 | Barry et al. | |
| 7,337,910 B2* | 3/2008 | Cartmell et al. | 209/245 |
| 7,359,987 B2 | 4/2008 | Stahura | |
| 7,418,471 B2 | 8/2008 | King et al. | |
| 7,472,160 B2 | 12/2008 | King et al. | |
| 7,490,124 B2 | 2/2009 | King et al. | |
| 7,543,026 B2 | 6/2009 | Quine et al. | |
| 7,546,381 B2 | 6/2009 | Tout | |
| 7,565,402 B2 | 7/2009 | Schneider | |
| 7,606,858 B2 | 10/2009 | King et al. | |
| 7,627,628 B2 | 12/2009 | King et al. | |
| 7,725,596 B2* | 5/2010 | Garcia-Luna-Aceves et al. | 709/238 |
| 7,752,260 B2 | 7/2010 | King et al. | |
| RE42,665 E | 8/2011 | Schneider | |
| 8,037,168 B2 | 10/2011 | Schneider | |
| 8,224,994 B1* | 7/2012 | Schneider | 709/245 |
| RE43,690 E | 9/2012 | Schneider | |
| 2001/0010032 A1 | 7/2001 | Ehlers et al. | |
| 2001/0021947 A1 | 9/2001 | Kim | |
| 2001/0047429 A1 | 11/2001 | Seng et al. | |
| 2002/0010795 A1 | 1/2002 | Brown | |
| 2002/0016174 A1 | 2/2002 | Gibson et al. | |
| 2002/0023034 A1 | 2/2002 | Brown et al. | |
| 2002/0024424 A1 | 2/2002 | Burns et al. | |
| 2002/0059161 A1 | 5/2002 | Li | |
| 2002/0065903 A1 | 5/2002 | Fellman | |
| 2002/0069080 A1 | 6/2002 | Roy et al. | |
| 2002/0069378 A1 | 6/2002 | McLellan et al. | |
| 2002/0073233 A1 | 6/2002 | Gross et al. | |
| 2002/0091703 A1 | 7/2002 | Bayles | |
| 2002/0091827 A1 | 7/2002 | King et al. | |
| 2002/0091836 A1 | 7/2002 | Moetteli | |
| 2002/0103745 A1 | 8/2002 | Lof et al. | |
| 2002/0129013 A1 | 9/2002 | Thomas | |
| 2002/0156800 A1 | 10/2002 | Ong | |
| 2002/0188699 A1 | 12/2002 | Ullman et al. | |
| 2002/0194113 A1 | 12/2002 | Lof et al. | |
| 2003/0009592 A1 | 1/2003 | Stahura | |
| 2003/0014450 A1 | 1/2003 | Hoffman | |
| 2003/0074672 A1 | 4/2003 | Daniels | |
| 2003/0088708 A1 | 5/2003 | Lewallen | |
| 2003/0098375 A1 | 5/2003 | Shiga et al. | |
| 2003/0182447 A1* | 9/2003 | Schilling | 709/245 |
| 2003/0213316 A1* | 11/2003 | Harvey | 73/866.4 |
| 2003/0225670 A1 | 12/2003 | DeCarlo, III | |
| 2004/0030759 A1 | 2/2004 | Hidary et al. | |
| 2004/0044791 A1 | 3/2004 | Pouzzner | |
| 2004/0088083 A1 | 5/2004 | Davis et al. | |
| 2004/0107025 A1 | 6/2004 | Ransom et al. | |
| 2005/0055306 A1 | 3/2005 | Miller et al. | |
| 2005/0102354 A1 | 5/2005 | Hollenbeck et al. | |
| 2005/0235031 A1 | 10/2005 | Schneider | |
| 2006/0129696 A1* | 6/2006 | Bagley et al. | 709/245 |
| 2006/0190623 A1 | 8/2006 | Stahura | |
| 2006/0265516 A1 | 11/2006 | Schilling | |
| 2008/0005342 A1 | 1/2008 | Schneider | |
| 2008/0010365 A1 | 1/2008 | Schneider | |
| 2008/0016142 A1 | 1/2008 | Schneider | |
| 2008/0016233 A1 | 1/2008 | Schneider | |
| 2008/0059607 A1 | 3/2008 | Schneider | |
| 2008/0235383 A1 | 9/2008 | Schneider | |
| 2012/0102206 A1* | 4/2012 | Larson et al. | 709/227 |

FOREIGN PATENT DOCUMENTS

| | | |
|---|---|---|
| JP | 11184667 | 7/1999 |
| JP | 11242682 | 9/1999 |
| JP | 11296428 | 10/1999 |
| WO | 9909726 | 2/1999 |
| WO | 9922488 | 5/1999 |
| WO | 9939275 | 8/1999 |
| WO | 0007133 | 2/2000 |

OTHER PUBLICATIONS

Network Solutions and VeriSign Launch Combined Internet Name and Certification Registration, Internet World. Mar. 10, 1997.

Perez, Juan-Carlos, Mozilla Launches Firefox 1.0, PCWORLD.com, Nov. 9, 2004 <http:--www.pcworld.com-news-article-0,aid,118537,00.asp>.

Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; p. 4, paragraph 4 & 5; p. 5; p. 6, paragraph 1, p. 7; p. 8.

Hollenbeck et al., "Domain Name System Wildcards in Top-Level Domain Zones", VeriSign Naming and Directory Services, VeriSign, Inc., Sep. 9, 2003.

Ohta, "Incremental Zone Transfer in DNS", RFC 1995, Aug. 1996.

Vixie et al., "Dynamic Updates in the Domain Name System (DNS Update)", RFC 2136, Apr. 1997.

Mockapetris, Request for Comment (RFC) 1034, Domain Names—Concepts and Facilities, Section 4.3.3, IETF, Nov. 1987, pp. 1-55.

Berners, Lee T.; "RFC 1630: Universal Resource Identifiers in WWW—A Unifying Syntax for the Expression of Names and Addresses of Objects on the Network as used in the World Wide Web", IETF, Jun. 1994; http:--www.faqs.org-rfcs-rfc1630.html.

Mockapetris P., "RFC 1035: Domain Names—Implementation and Specification", IETF, Nov. 1987, http:-www.faq.org-rfcs-rfc1035.html.

Harrenstien, et al.; "RFC 954: Nicname-Whois", IETF, Oct. 1985, http:-www.faq.org-rfcs-rfc954.html.

Samson, M., PGMedia, Inc. d-b-a Name.Space TM, v. Networks Solutions, Inc., et al., Mar. 1999, pp. 1-2.

Request for Comment (RFC) 1480, The US Domain; Copper & Postel, Jun. 1993, pp. 1-47.

Request for Comment (RFC) 2276, Architectural Principles of Resource Name Resolution, Sollins, Jan. 1998; pp. 1-24.

Liberto, S.M., Domain Name Conflicts: Hey! That s My.Com!, WWWiz Magazine, Mar. 1998, pp. 1-3.

Cabell, D., Learning Cyberlaw in Cyberspace, Name Conflicts, ; Berkman Center for Internet & Society, Harvard Law School, Aug. 1999, pp. 1-21.

Crow, R., the Telephone Exchange Name Project, Web Site (1998), from http:--ourwebhome.com-TENP-TENproject.html.

Network Solutions, Inc., Online Team up to Server Internet Needs of Small Business Owners, Jan. 1998, pp. 1-2.

Goodin, D., CNET News.com: NSI domain slowdown persists, Jan. 1999, pp. 1-4.

Goodin, D., CNET News.com: NSI confirms database revisions, Jan. 21, 1999, pp. 1-2.

Northrup, T., Windows IT Library: Domain Name Services, Jul. 1998, pp. 1-41.

Berners-Lee et al., Network Working Group, Uniform Resource Identifiers (URI): General Syntax, Xerox Corporation, http:--www.ietf.org-rfc-rfc2396.txt Aug. 1998.

Press Release, "OINGO Pioneers New Domain Name Variation Technology", May 17, 2000; http:--www.namingsolutions.com-ns_new_pr_51700.html.

The Economic Structure of Internet Generic Top-Level Domain Name Registries Analysis and Recommendations; Statement of the Policy Oversight Committee; Jul. 23, 1998.

NTIA-DOC, Improvement of Technical Management of Internet Names and Addresses, Federal Register V63 N 34, Feb.

(56) References Cited

OTHER PUBLICATIONS 20, 1998, from http:-www.ntia.doc.gov-ntiahome-domainname-022098fedreg.httm.

NTIA-DOC, RFC on the enhancement of the .us Domain Space, Aug. 4, 1998, from http:--www.ntia.doc.gov-ntiahome-domainname-usrfc-dotusrfc.htm.

Deep Space Web?, Wired News Report, Jul. 22, 1999, from http://www.wired.com-news-technology-0,1282,139-09,00.htm.

Oakes, C., Internet Keywords Patent Spat, Wired News, Jul. 22, 1999 from http:--www.wired.com-news-technology-0,1282,13892.00html.

Wired News Report, The Postal Proposal, Wired News, May 8, 1999 from http:-www.wired.com-newstechnology-0,1282.131-30,00.html.

Norman, J.; Southern Telcom and Main.net Announce Successful Demonstration of Broadband over Power Lines; Southern Telcom; Dec. 2003-; p. 1.

Load Management; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.

Blackout early warnings mandated; American City Business Journals, Apr. 3, 2001; USA; paragraphs 1, 2, 5, 6.

Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.

California Independent System Operator Participant's whom have entered into an Interruptible Service Contract or similar agreement; California Independent System Operator (CAISO); Dec. 10, 2002; p. 1.

Energy Action Plan; State of California; May 20, 2003; USA; p. 5, Section 1; pp. 7 & 8 Section V.

Desmond, J.; Customer Centric Alert and Response Program Overview; California Independent System Operator (CAISO); May 24, 2001; USA; pp. 2, 3, 4, 5, 6, 12, 13, 17, 18.

Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:--eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Graves, K.; CAISO Feb. 2001 Winter Assessment and Summer 2001 Post-season Summary; California Independent System Operator (CAISO); Oct. 8, 2001; USA; pp. 17 & 18, Section IV.

Graves, K.; CAISO Summer 2001 Assessment; California Independent System Operator (CAISO); Mar. 22, 2001; USA; p. 29, paragraphs 1 & 2, p. 30, paragraphs 1, 2, Figure III-E.

Gross, G.; FCC moves ahead with powerline broadband rules; IDG News Service; Feb. 13, 2004; USA; paragraphs 1, 2, 6, 9.

Guardino; Board of Governors; Notification Plan 2; California Independent System Operator (CAISO); May 21, 2001; USA.

Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.

Jonker, R et al, "Enabling Distributed Generation and Demand Response with Enterprise Energy-Management Systems" Darnell.com Power Pulse.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.

Keoni, A.; California Independent System Operator Load Program Participants; California Independent System Operator (CAISO); Apr. 8, 2002; pp. 1, 2, 3.

Keoni, A.; Implementation Plan and Required Information for the Participating Load Program (PLP); California Independent System Operator (CAISO); Aug. 8, 2002; USA; p. 1, paragraphs 2 & 3; p. 2, paragraphs 1 & 2, Table 1.

Labaton, S., F.C.C. Begins Rewriting Rules on Delivery of the Internet; Associated Press; Feb. 13, 2004; USA; paragraphs 1, 2, 6, 7.

Lyon, D.; the Development of Electric System Emergencies and the Emergecy Response Communication Network: White Paper; California Independent System Operator (CAISO); Jun. 20, 2001; USA; p. 2, paragraphs 1 p. 3, paragraph 1 & Section II; pp. 6, 7, 8, 9; p. 10, Section III, paragraphs 1, 2, 3; p. 11, paragraphs 2 & 3; p. 12 paragraph 1; p. 13, paragraph 4, p. 14.

Motegi, N., Piette, MA.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.

"What does your phone number spell?" Internet print-out of www.phonespell.com; Wayback Machine, 1996.

"What Words are Hiding in Your Phone Number?" Internet print-out of www.dialabc.com; Wayback Machine.

Courter, Gini; Microsoft Office 2000 Professional Edition, 1999, Sybex, pp. 92-96, 254-257.

www.phonetic.com; Internet print-out; Wayback Machine.

Berners-Lee, T. et al., Uniform Resource Identifiers (URI): General Syntax; Network Working Group, Aug. 1988.

Web Page of Network Solutions.

Oakes, Chris, "Net Sol, ICANN Reach Accord," Wired News, from wired.com-news-politics-0,1283,31557,00.html, Sep. 29, 1999, pp. 1-3.

Singhal, Vigyan et al, "Analysis of locking behavior in three real database systems," The VLDB Journal, vol. 6, 1997. pp. 40-52.

IEA—experts group on r&d priority setting and evaluation liberalisation of the electricity market, Osterreichische Gesellschaft fur Umwelt and Technik. Mar. 18, 2002; Austria (in English); pp. 4 (sections 3 and 4), 7 (section 3), 8 (Controllable "Dispatchable" Loads, section 2), 9 (Distributed Energy Resources).

O'Neil, E.; Cumulative Totals of No-Touch, Restricted Maintenance Operations, Alert, Warning, Emergency and Power Watch Notices Issued from 1998 to Present; California Independent System Operator (CAISO); May 29, 2003; USA; p. 4, Table; p. 5, Table; p. 6 Table; p. 7, Table; p. 9, Table; p. 10, Table; p. 11, Table; p. 11, Table; p. 12, Table; p. 14, Table.

Perez-Pena, R.; Utility Could Have Halted '03 Blackout, Panel Says; New York Times; http://www.nytimes.com-2004-0406-national-06BLAC.html; Apr. 6, 2004; paragraphs 1, 2, 3, 4, 9.

Purdum, T.; Statewide Blackouts Ordered as Heat Strains California Grid; New York Times; May 8, 2001; paragraphs 3, 4, 5, 8, 9.

United States of America, Federal Energy Regulation Commission; National Transmission Grid Study, Consolidated List of Recommendations; FERC; May 6, 2002, USA; pp. 2-76 & 3-77 Section 4, 5-79 Section 5.

Weiss, J.; EPRI's Enterprise Infrastructure Security (EIS) Program ; Jul. 7, 2000; USA; pp. 2 through 24.

Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:--certs.lbl.gov-; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.

Werst, K.L., Why Rotating Outages?; California Independent System Operator (CAISO); Aug. 17, 2001; USA; paragraphs 1, 2, 3, 5, 6, 7.

Donaghy, Melanie, "Wines & Vines", Sep. 1997, vol. 78, No. 9, p. 39(6).

Fax-Phone Switch for Multi-Ring Telephone Lines; Derwent Abstract; Jul. 1992.

Schneider, Eric; Claims from Pending U.S. Appl. No. 11/687,672.

Schneider, Eric; Claims from Pending U.S. Appl. No. 11/952,105.

* cited by examiner

| Default | Zip Code | City | State |
|---|---|---|---|
| T | 44114 | cleveland | oh |
| T | 44115 | cleveland | oh |
| F | 44116 | cleveland | oh |
| T | 44116 | rockyriver | oh |
| F | 44117 | cleveland | oh |
| T | 44117 | euclid | oh |
| T | 44118 | cleveland | oh |
| F | 44118 | clevelandheights | oh |
| F | 44118 | eastcleveland | oh |
| F | 44118 | shakerheights | oh |
| F | 44118 | universityheights | oh |

| Row | Location Field | Generated URI |
|---|---|---|
| 1 | example.com<br>www.example.com<br>http://www.example.com | http://www.example.com:80/index.html |
| 2 | example.company | http://example.com<br>http://company.example.com<br>http://example.company.com<br>http://example.company.tlda.com<br>http://example.com/company/index.html<br>http://example.com/example.company/<br>http://example.com/example/company/<br>http://example.com/pany/index.html<br>http://example.co |
| 3 | free.love:to | http://free.to<br>http://love.free.to<br>http://free.love.to<br>http://free.to/love |
| 4 | 800.555.1212<br><br>12345.67890<br><br>123.45.6789<br><br>4428.1234.3456.5678<br><br>3.1415.9265.3 | http://www.1212.800.555.com<br>http://2.1.2.1.5.5.5.0.0.8.1.e164.arpa<br><br>http://12345.67890.upc.arpa<br><br>http://6789.45.123.ssn.arpa<br><br>http://8.7.6.5.6.5.4.3.4.3.2.1.8.2.1.4.card.arpa<br><br>http://3.5.6.2.9.5.1.4.1.3.isbn.urn.arpa |
| 5 | http://example.44106<br>http://example.44106:us | http://example.cleveland.oh.us |
| 6 | foo@bar.company | mailto:foo@bar.com |

*Fig. 13*

| Name | Method | Scheme | Web | Domain | TLD | Port | Path | Component |
|---|---|---|---|---|---|---|---|---|
| top.stories | 3 | http:// | www | example | .to | :80 | count/top.stories | search string |
| search.now | 2 | ftp:// | www2 | | | :21 | | stuff |
| name.game | 4 | | | name | .net | | | etc. |

| Method Name | Method # | Rank | Example/Function | Form |
|---|---|---|---|---|
| Truncate | 3 | 1 | top.stories=top.st | SLD.TLD |
| Replace | 1 | 2 | top.stories=top.to | SLD.TLD |
| Path | 4 | 3 | top.stories=top.to/stories | SLD.TLD/TLDA |
| Rotate | 5 | 4 | top.stories=stories.top.to | TLDA.SLD.TLD |
| Append | 9 | 5 | top.stories=top.stories.to | SLD.TLDA.TLD |
| Delimit | 2 | 6 | top.stories=top.st/ories | SLD.TLD/A |
| Reverse | 8 | 7 | top.stories.today=today.stories.top.to | TLDA.SLD.3LD.TLD |
| Custom | 16 | 8 | top.com.today=today.top.com | TLDA.3LD.SLD |
| Query | 6 | 9 | top.stories=top.com/cgi-bin/index.cgi?tlda=stories | |
| PURI | 7 | 10 | top.stories=top.com/any/path/equals/stories | |
| Netword | 15 | 11 | top.stories=somename.com | |
| Centraal | 14 | 12 | top.stories=anothername.com | |
| ZipNames | 10 | 13 | top.stories=yetanothername.com | |
| Netscape | 13 | 14 | top.stories=onemorename.com | |
| Microsoft | 11 | 15 | top.stories=microsoft.com/news | |
| AOL | 12 | 16 | top.stories=aol.com/topstories | |

Dear John,

TLDA is pleased to introduce to you how to get started on the Internet right away with your very own TLDA name.

If you don't have a way to connect to the Internet then ask a friend who is on-line or go to your local library and come to our website WWW.TLDA.COM and learn how you can register and use your very own TLDA name.

You can give your new TLDA name to friends or print your TLDA name on your business card so people know how to reach you on the Internet!!

We have reserved a few names for you to try risk free.
John.Doe          
123.Coventry         2030
Smithtown.Pizza    
Coventry.Wine     

Come to our web site and type or scan in any TLDA names listed above.

If you are not interested in the names we have set aside for you, then you can trade them in and pick another name to get started with the TLDA name service.

If you'd like-- call our toll free number for more information or to reserve your TLDA name right away!

Sincerely,
Your local TLDA representative

*Fig. 20b*

```
. IN   SOA   A.ROOT-SERVERS.NET. hostmaster.nsiregistry.net. (
              2001041700 ;serial
              1800 ;refresh every 30 min
              900 ;retry every 15 min
              604800 ;expire after a week
              86400 ;minimum of a day
              )
. 518400 IN NS A.ROOT-SERVERS.NET.
. 518400 IN NS H.ROOT-SERVERS.NET.
. 518400 IN NS C.ROOT-SERVERS.NET.
A.ROOT-SERVERS.NET. 518400 IN A 198.41.0.4
H.ROOT-SERVERS.NET. 518400 IN A 128.63.2.53
C.ROOT-SERVERS.NET. 518400 IN A 192.33.4.12
COM. 172800 IN NS A.GTLD-SERVERS.NET.
COM. 172800 IN NS G.GTLD-SERVERS.NET.
COM. 172800 IN NS C.GTLD-SERVERS.NET.
CA. 172800 IN NS CLOUSO.RISQ.QC.CA.
CA. 172800 IN NS NS2.UUNET.CA.
CA. 172800 IN NS RELAY.CDNNET.CA.

; Illustration of the Root Zone File

A.GTLD-SERVERS.NET. 172800 IN A 192.5.6.30
G.GTLD-SERVERS.NET. 172800 IN A 192.42.93.30
C.GTLD-SERVERS.NET. 172800 IN A 192.26.92.30
CLOUSO.RISQ.QC.CA. 172800 IN A 192.26.210.1
NS2.UUNET.CA. 172800 IN A 142.77.1.5
RELAY.CDNNET.CA. 172800 IN A 192.73.5.1

*. 172800 IN NS TLDA.ARPA.
TLDA.ARPA. 172800 IN A 123.45.67.89

;TLDA.ARPA is used as a Primary Virtual Zero Level Domain and is in
;operative association with a network resource adapted to determine how
;to process the detected identifier having a top level domain alias
```

*Fig. 23b*

FICTITIOUS DOMAIN NAME METHOD, SYSTEM, PRODUCT, AND APPARATUS

CROSS-REFERENCE TO RELATED APPLICATION

The application for patent is based on a disclosure filed on Jul. 17, 1998, as Disclosure Document No. 442,796 and portions of a disclosure filed on Jul. 11, 2001, as Disclosure Document No. 496,673 under the Document Disclosure Program and is a continuation of U.S. patent application Ser. No. 10/711,834, filed Oct. 7, 2004, which is a continuation of U.S. patent application Ser. No. 09/682,351, filed Aug. 23, 2001, now abandoned, which is a continuation in part of U.S. patent application Ser. No. 09/682,133, filed Jul. 25, 2001, now U.S. Pat. No. 7,194,552, which claims the benefit of PCT application Ser. No. 01/08,048, filed Mar. 13, 2001, and U.S. patent application Ser. No. 09/682,351, filed Aug. 23, 2001, now abandoned, is a continuation in part of U.S. patent application Ser. No. 09/525,350, filed Mar. 15, 2000, now U.S. Pat. No. 6,338,082, and U.S. patent application Ser. No. 09/682,351, filed Aug. 23, 2001, now abandoned, is a continuation in part of U.S. patent application Ser. No. 09/653,100, filed Aug. 31, 2000, now U.S. Pat. No. 6,760,746, and U.S. patent application Ser. No. 09/682,351, filed Aug. 23, 2001, now abandoned, is a continuation in part of U.S. patent application Ser. No. 09/650,827, filed Aug. 30, 2000, now U.S. Pat. No. 6,901,436, and U.S. patent application Ser. No. 09/682,351, filed Aug. 23, 2001, now abandoned, is a continuation in part of U.S. patent application Ser. No. 09/598,134, filed Jun. 21, 2000, now U.S. Pat. No. 6,895,430, and U.S. patent application Ser. No. 09/682,351, filed Aug. 23, 2001, now abandoned, is a continuation in part of U.S. patent application Ser. No. 09/532,500, filed Mar. 21, 2000, now U.S. Pat. No. 7,136,932, which claims the benefit of U.S. Provisional Application Ser. No. 60/175,825 filed Jan. 13, 2000, now abandoned, and U.S. patent application Ser. No. 09/525,350, filed Mar. 15, 2000, now U.S. Pat. No. 7,136,932, claims the benefit of U.S. Provisional Application Ser. No. 60/160,125 filed Oct. 18, 1999, now abandoned, and U.S. patent application Ser. No. 09/525,350, filed Mar. 15, 2000, now U.S. Pat. No. 7,136,932, claims the benefit of U.S. Provisional Application Ser. No. 60/157,075, filed Oct. 1, 1999, now abandoned, and U.S. patent application Ser. No. 09/525,350, filed Mar. 15, 2000, now U.S. Pat. No. 7,136,932, claims the benefit of U.S. Provisional Application Ser. No. 60/130,136, filed Apr. 20, 1999, now abandoned, and U.S. patent application Ser. No. 09/525,350, filed Mar. 15, 2000, now U.S. Pat. No. 7,136,932, claims the benefit of U.S. Provisional Application Ser. No. 60/125,531 filed Mar. 22, 1999, now abandoned, all of which are incorporated by reference as though fully rewritten herein.

FIELD OF THE INVENTION

This invention generally relates to identifier resolution, and more specifically relates to a method, system, product, and apparatus for processing fictitious domain names.

DESCRIPTION OF THE RELATED ART

In the same way that a street address represents a location in the physical world, a domain name can be used to represent a location on the Internet. In the physical world, one relies on both street addresses and the postal system to send information back and forth between individuals and organizations. On the Internet, one relies on the Domain Name System (DNS) to translate domain names into Internet addresses.

In general, names are thought of as discrete emblems used to establish or designate identity; addresses are thought of as emblems designating location. Domain names might seem to be unusual because they appear to be both names and addresses; they both locate and identify Internet resources. Yet people's personal names, for example, establish identity, and such identifiers travel with the individual rather than changing when the person changes location. Street addresses or geographic names, by contrast, are more static in order to establish location. Yet such addresses and geographic names also serve to identify the physical place, differentiating it from other places.

Geographic names of all kinds—street addresses, zip codes, counties—are in fact overlays on an unchanging numerical system of longitude and latitude, which is a universally recognized designator and locator for a particular place on the earth's surface. In this sense, geographic names are much like Internet domain names, which are an overlay of Internet address number designations.

Name space is a set of names in which all names are unique. Address space is a set of addresses in which all addresses are unique. Names are commonly used as mnemonic devices to help remember information. For instance, names are used to remember telephone numbers, and domain names are used to remember Internet addresses.

Currently, national phone numbers take the form of an international dialing code, area code, prefix, and number (e.g., 1-212-555-1212). During the turn of the century, phone companies built "exchanges" known as Central Offices to serve a certain geographical area. The exchange was named after the first prefix installed in that office. Before phones had dials on them, an operator connected the caller's request to the name of the exchange and number, such as Spring 3456 or Pennsylvania 5000. In the late 1920's, once dials started appearing on phones, a caller could connect the phone number by first dialing the first three letters of the exchange and then the number. For example, the caller would dial the S-P-R in Spring and then the 3456 or the P-E-N in Pennsylvania 5000. Back then, phone numbers were written with the dialed letters capitalized such as SPRing 3456 and PENnsylvania 5000, as a mnemonic device.

By the 1930's, large cities were dropping the third letter from the dialing routine and replacing it with a number, in order to increase the available numbers for each exchange. So numbers such as SPRing 3456 would become Spring2-3456 and PENnsylvania 5000 would become Pennsylvania6-5000. This simple change added 80,000 new numbers to existing exchanges. Exchange names helped foster a sense of place, and community, in the same way that cities do. For over 30 years exchange names were published in phone directories and had become common use worldwide.

Area codes were being used up faster by the early 1960's than was predicted in 1947 when the area code scheme was finalized as part of the North American Numbering Plan (NANP). As a result, exchange names were continually being reassigned causing confusion and aggravation in communities throughout major cities in the country. During the early 1970's, as exchange names were phased out and 1-800 toll free numbers introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks. In recent years, the shortage of seven letter names used as a mnemonic device led to the strategy for obtaining telephone numbers that correspond to eight and nine letter names. In recent years, two new toll free exchanges (1-888, 1-877) were added because of the saturation of 1-800 numbers. Exchange names are but one example of name space.

Similarly, postal codes were developed to provide a hierarchical description for locating a post office. In June 1962, the Presidential appointed Advisory Board of the Post Office Department, after a study of its overall mechanization problems, made several primary recommendations. One was that the Department give priority to the development of a coding system, called the ZIP (Zoning Improvement Plan) Code, a five-digit code assigned to every address throughout the country. The first digit designated a broad geographical area of the United States, ranging from zero for the Northeast to nine for the far West. This was followed by two digits that more closely pinpointed population concentrations and those sectional centers accessible to common transportation networks. The final two digits designated small post offices or postal zones in larger zoned cities.

Introduced in 1983, the ZIP+4 code added a hyphen and four digits to the existing five-digit ZIP Code. The first five numbers continued to identify an area of the country and delivery office to which mail is directed. The sixth and seventh numbers denote a delivery sector, which may be several blocks, a group of streets, a group of post office boxes, several office buildings, a single high-rise office building, a large apartment building, or a small geographic area. The last two numbers denote a delivery segment, which might be one floor of an office building, one side of a street between intersecting streets, specific departments in a firm, or a group of post office boxes. Postal codes serves as another example of name space. A recent area of worldwide concern is the allocation of name space on the Internet.

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide data and a client computer may display or process it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

HTTP provides a method for users to obtain data objects from various hosts acting as servers on the Internet. User requests for data objects are made by means of a HTTP request, such as a GET request. A GET request is comprised of the GET request keyword, the full path of the data object, the name of the data object, and a HTTP protocol version, such as "HTTP/1.0". In the following GET request, a request is being made for the data object with a path name of "/example/" and a name of "file.html":

GET /example/file.html HTTP-Version

Processing of a GET request entails the establishing of an TCP/IP connection with the server named in the GET request and receipt from the server of the data object specified. After receiving and interpreting a request message, a server responds in the form of a HTTP RESPONSE message. Response messages begin with a status line comprising a protocol version followed by a numeric Status Code and an associated textual Reason Phrase. Space characters separate these elements. The format of a status line is as follows:

Status-Line=HTTP-Version Status-Code Reason-Phrase

The status line begins with a protocol version and status code, e.g., "HTTP/1.0 200". The status code element is a three-digit integer result code of the attempt to understand and satisfy a prior request message. The reason phrase is intended to give a short textual description of the status code. The first digit of the status code defines the class of response. There are five categories for the first digit. 1XX is an information response. It is not currently used. 2XX is a successful response, indicating that the action was successfully received, understood and accepted. 3XX is a redirection response, indicating that further action must be taken in order to complete the request. 4XX is a client error response. This indicates a bad syntax in the request. Finally, 5XX is a server error. This indicates that the server failed to fulfill an apparently valid request.

Web browsers, such as Microsoft Internet Explorer (MSIE), Netscape Navigator, and NeoPlanet provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side web browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which can be used as a query to access a database server and generate an HTML web page with customized data results as output that is passed back to the client browser for display.

There are many network access devices and program products that primarily serve as a navigation tool allowing a user to request network resources from resource identifiers. Navigating to a different network resource could happen as a result of external automation, internal automation from a script, the user clicking a hyperlink or typing in the address bar or location field of web browser, for example. All too often, such navigation tools can not always successfully access a network resource from an identifier for many reasons. Some reasons may include: domain name can not be translated into an IP address, invalid syntax, access denied, payment required, request forbidden, object not found, method is not allowed, no response acceptable to client found, proxy authentication required, server timed out waiting for request, user should resubmit with more info, resource is no longer available, server refused to accept request without a length, precondition given in request failed, network resource identifier is too long, unsupported media type, retry after doing the appropriate action, internal server error, server does not support the functionality required to fulfill the request, error response received from gateway, temporarily overloaded, timed out waiting for gateway, attempt to redirect the navigation failed, and HTTP version not supported. In any event, a status message is usually displayed indicating that the network resource request has failed.

A network resource identifier such as a Uniform Resource Identifier (URI) is a compact string of characters for identifying an abstract or physical resource. URIs are the generic set of all names and addresses that refer to objects on the Internet. A URI can be further classified as a locator, a name, or both. A Uniform Resource Name (URN) refers to the subset of URI that are required to remain globally unique and persistent even when the resource ceases to exist or becomes unavailable. A Uniform Resource Locator (URL) refers to the subset of URI that identify resources via a representation of their primary access mechanism (e.g., their network "location"), rather than identifying the resource by name or by some other attribute(s) of that resource.

A URL is the address of a file accessible on the Internet. The URL contains the name of the protocol required to access the resource, a domain name or IP address that identifies a specific computer on the Internet, and a hierarchical description of a file location on the computer. In addition, the last (optional) part of the URL may be a "query string" preceded by "?" or a "fragment identifier" preceded by "#". The fragment identifier indicates a particular position within the specified file. For example the URL "http://www.example.com:80/index.html#appendix", where "http" is the scheme or protocol, "www.example.com" is the host server name or Fully Qualified Domain Name (FQDN), "80" is the port connection for the HTTP server request, "index.html" is the filename located on the server, and "appendix" is the identifier to display a specific portion of the HTML file called "index". The URL "http://www.example.com" also retrieves an HTML file called "index" on the HTTP server called "example.com". By default, when either a port or filename is omitted upon accessing a HTTP server via a URL, the client browser interprets the request by connecting via port 80, and retrieving the HTML file called "index".

Because an Internet address is a relatively long string of numbers (e.g., 31.41.59.26) that is difficult to remember, Internet users rely on domain names, memorable and sometimes catchy words corresponding to these numbers, in order to use e-mail and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Application programs that use the DNS, such as mailers, mail servers, Web clients, Web servers, Web caches, IRC clients, FTP clients, distributed file systems, distributed databases, and almost all other applications on TCP/IP rely on the resolver library.

Resolvers query the DNS by directing queries at name servers, which contain parts of the distributed database that is accessed by using the DNS protocols to translate domain names into IP addresses needed for transmission of information across the network. The function of translating a domain name into an IP address is known as name resolution. Name resolution is performed by a distributed system of name servers having resolvers to fulfill the resource request of the client by the successive hierarchical querying of the resource records from zone files.

The Berkeley Internet Name Domain (BIND) implements an Internet name server for the UNIX operating system. The BIND includes a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

At the core of Netscape client products lies the Netscape Network Library (NETL1B). A necessity of any network based client browser application is to send and receive data over a connection. This is accomplished in NETLIB by making a call to NET_GetURL( ). In order to resolve host names, NETLIB uses a standard DNS lookup mechanism. NET_FindAddress( ) makes the gethostbyname( ) call to lookup the IP address for the specified host from a DNS database stored on a DNS server, and is called from NET_BeginConnect( ). If a numeric IP address is passed into NET_FindAddress( ), it is passed directly into the gethostbyname( ) call which returns a success when an IP address is passed in. NET_FindAddress( ) is actually called repeatedly until it returns success or failure. Similarly, MSIE browser include objects such as WebBrowser Object and InternetExplorer Object, which contains events, methods, and properties. One event, called the Navigate Event navigates to a resource identified by a URL.

A domain name includes two parts: a host and a domain. Technically, the letters to the right of the "dot" (e.g., tlda.com) are referred to as Top Level Domains (TLDs), while hosts, computers with assigned IP addresses that are listed in specific TLD registries are known as second-level domains (SLDs). For the domain name "tlda.com", ".com" is the TLD, and "tlda" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "my.tlda.com", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

There are proposed solutions for revamping ".us" in order to create a more viable use for the United States TLD. On Aug. 3, 1998, a request for comments was printed in the federal register by the National Telecommunications and Information Administration (NTIA) for public opinion on the enhancement of the ".us" Domain Space. At present, the Internet Assigned Numbers Authority (IANA) administers ".us" as a locality-based hierarchy in which second-level domain space is allocated to states and US territories. This name space is further subdivided into localities. General registration under localities is performed on an exclusive basis by private firms that have requested delegation from IANA. The ".us" name space has typically been used by branches of state and local governments, although some commercial names have been assigned. Where registration for a locality has not been delegated, the IANA itself serves as the registrar.

Some in the Internet community have suggested that the pressure for unique identifiers in ".com" could be relieved with commercial use of the ".us" space. Commercial users and trademark holders, however, find the current locality-based system too cumbersome and complicated for commercial use. Expanded use of the ".us" TLD could alleviate some of the pressure for new generic TLDs and reduce conflicts between American companies and others competing for the same domain name. Clearly, there is much opportunity for enhancing the ".us" domain space, and the ".us" domain could be expanded in many ways without displacing the current geopolitical structure. Over the next few months, the U.S. government will work with the private sector, along with state and local governments, to determine how best to make the ".US" domain more attractive to commercial users.

The Commercial Internet eXchange Association (CIX) is a non-profit, trade association of network service providers promoting and encouraging the development of the public data communications internetworking services industry, in both national and international markets. CIX has also been lobbying for better use of the ".us" system. According to a draft from CIX in March 1998—in response to a White House "Green Paper" released the previous month on the proposed rule for "Improvement of Technical Management of Internet Names and Addresses"—CIX states concerns that ".us" is not widely used for commercial purposes. Indeed, sites employing this domain may not be frequently visited. It is widely acknowledged that the ".us" domain suffers from structural deficiencies and requires extensive reform. The lack of a commercially viable name space for the U.S. contributes directly to the demand for ".com" SLDs and the alleged critical shortage of gTLDs. Therefore, reform of the ".us" may help alleviate the need for gTLDs and be more consistent with international practices of using ccTLDs, at least in the short and medium term.

The DNS is operated by a Network Information Center (NIC) in each country to act as authority for administering the respective ccTLD zone file portion of the DNS database. The Internet Network Information Center (InterNIC) previously administered by the National Science Foundation (NSF), was formed to preside as Registry and have authority over the gTLD zone files. In 1993, InterNIC was privatized and Network Solutions Inc. (NSI), now VeriSign Global Registry Services (VeriSign GRS), was also chosen as Registrar to perform the registration and propagation of these key gTLDs, under a five-year cooperative agreement with the NSF.

Every request to resolve a domain name by locating a particular host on the Internet must necessarily, by default, refer to the root zone file on the NSI root nameservers in order to be directed to the appropriate nameserver containing the SLD names registered under the particular TLD indicated in the host's request. Accordingly, unless and until a TLD root nameserver, is referred to in the root zone file, that nameserver will not be globally recognized on the Internet and the names serviced thereby will not be universally resolvable.

In an effort to shift the overseeing of the Internet out of government hands and into the private sector, NSI's original extension to the cooperative agreement was extended six months to have then expired Sep. 30, 1998. Most recently, NSI and officials from the Department of Commerce's NTIA have agreed to a two-year extension of their Cooperative Agreement through Sep. 30, 2000. Included in the extension are provisions to transfer relevant US Government authority over some domain name system functions to a new non-profit corporation.

Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by IANA and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

ICANN, NTIA, and NSI agreed to a migration to a shared registration system (SRS) in a phased approach beginning Mar. 31, 1999 with full implementation by Jun. 1, 1999. NSI has implemented a SRS to support multiple licensed, accredited registrars offering registration services. NSI and other domain name registrars function as retailers of domain name registration services through NSI's SRS. NSI will also continue in its role as the registry or wholesaler of ".com", ".net", and ".org" domain name registrations. To date, more than 24,000,000 domain names, or SLDs, in ".com", ".net", ".org", and ".edu" have been registered.

The Internet domain name registration market is lucrative and rapidly growing. The demand over the past year for domain names or SLDs has exceeded 1,000,000 new registrations monthly. InterNIC also registers 3LDs, but the number of registrations is little in comparison to SLDs. The most common use of 3LDs is for the designation of DNS servers, e-mail servers, or other specialized computer functions whereas the primary use for SLDs are for accessing web sites and brand name recognition. Furthermore, the arbitrarily limited number of TLDs has created a severe shortage of desirable domain names in the ".com" registry, leading to substantial pent-up demand for alternative domain name resources.

Experimental registry systems offering name registration services in an alternative set of exclusive domains such as ".space" or ".love" developed as early as January 1996. Although visible to only a fraction of Internet users, alternative DNS systems such as the Name.Space, AlterNIC, and eDNS registries have contributed to the community's dialogue on the evolution of DNS administration. Competition argues that TLDs have become an issue of free speech and should not be restricted to the current limited set of gTLDs and ccTLDs.

Customers registering second-level domains in alternative TLDs cannot be reached by other Internet users because these domains, which are not listed in the root zone file, cannot be resolved by other Internet DNS name servers. Only if competitors individually negotiated with each of the scores of thousands of name server operators on the global Internet, something that is a physical and financial impossibility, for inclusion of alternative TLDs would there be any possibility that its domain names could be universally resolvable. As a result, competition has been unable to offer a commercially viable registration service in its TLDs, and has been unable to effectively compete in the domain name market. In March 2001, by partnering with several large ISPs to modify their nameservers, New.Net, Inc. opened their doors to serve as the most effective demonstration of how alternative TLDs are attempting to succeed in a fragmented market driven system.

The following excerpt is provided in, "Informational RFC (Request for Comment) 2826: IAB Technical Comment on the Unique DNS Root", Internet Architecture Board, May 2000, "http://www.faqs.org/rfcs/rfc2826.html". To remain a global network, the Internet requires the existence of a globally unique public name space. The DNS name space is a hierarchical name space derived from a single, globally unique root. This is a technical constraint inherent in the design of the DNS. Therefore it is not technically feasible for there to be more than one root in the public DNS. That one root must be supported by a set of coordinated root servers administered by a unique naming authority. Under agreements among ICANN, the U.S. Government, and NSI, ICANN (through IANA, now absorbed into ICANN), sends documentation for needed changes to the root zone file to the U.S. Department of Commerce, which directs Network Solutions to implement them by editing the authoritative root zone file.

A supplemental memo to RFC 2826 is provided in Simon Higgs, "Informational Internet Draft: Root Zone Definitions", Higgs Communications, May 2001, "http://www.ietf.org/internet-drafts/draft-higgs-root-defs-01.txt". Within this memo, definitions are applied in an attempt to make other roots such as alternative or enhanced roots inclusive as part of a single, globally unique root implying that the single root comprises a plurality of root components distributed across many zone files. In another draft provided in Simon Higgs, "Informational Internet Draft: Alternative Roots and the Virtual Inclusive Root", May 29, 2001, "http://www.ietf.org/internet-drafts/draft-higgs-virtual-root-00.txt", proposes a solution to the problem of duplicate colliding top level domains by identifying the virtual inclusive root (VIR), in compliance with the IAB's RFC 2826. Though the VIR is the sum of the consensus between all root zones on the public Internet, the VIR cannot support conflicting TLDs.

There is a particular increase in articles and publications emphasizing the importance of name space and the perceived shortage of ".com" names. References have been made that NASA is seeking authorization for ".mars" as an extension of terrestrial geography. Speaking on the opening day of the annual Internet Society (ISOC) conference in Geneva on Jul. 22, 1998, Vint Cerf, a founding President of ISOC, said the domain name debate should also encompass ".earth" or ".mars" because that's where real-time science data is going to travel from in the not-too-distant future. He said, "The idea is to take the interplanetary Internet design and make it a part of the infrastructure of the Mars mission."

Ironically that same day, an on-line Wired News article reports that Netword LLC has sued Centraal Corp. for patent infringement on its Internet keyword system. The system uses plain English instead of URLs to retrieve Web addresses. The technology lets companies and site owners register simple keywords that browsers can use to access Web sites. "Chevy," for example, could be used as an alias to replace the lengthier Web address "http://www.chevrolet.com". The system works using a client browser plug-in. U.S. Pat. No. 5,764,906 issued on Jun. 9, 1998, by Edelstein et al. and assigned to Netword LLC, entitled, "Universal electronic resource denotation, request and delivery system" is a system that works by users guessing a short mnemonic alias without the user being required to know the Web page's URL.

There is another cited patent that relies on a translation database to retrieve URLs and access resources. U.S. Pat. No. 5,812,776 issued on Sep. 22, 1998 by Gifford, entitled, "Method of providing internet pages by mapping telephone number provided by client to URL and returning the same in a redirect command by server" allows a user to access a hypertext page by providing a conventional telephone number or other descriptor. The server maps such a telephone number or descriptor to a target page identifier using a translation database and automatically directs the client to retrieve the desired page.

Furthermore, WIPO Patent Application WO09922488A2 published on May 6, 1999 by Osaku, et al., entitled, "Method and system for accessing information on a network" discloses methods and systems for accessing a network URL through a pre-assigned simplified network address, correlating to the URL, and for displaying the home page having the URL as its address. U.S. Pat. No. 6,151,624 issued on Nov. 21, 2000 by Teare, et al., entitled, "Navigating network resources using metadata" discloses mechanisms for associating metadata with network resources, and for locating the network resources in a language-independent manner. The metadata may include a natural language name of the network resource, its location, its language, its region or intended audience, and other descriptive information.

In recent years there has been an increased convergence of emerging resource discovery providers including services such as Common Name Resolution Protocol (CNRP), Unified Resolution and Discovery Protocol (URDP), and Universal Directory, Discovery and Integration (UDDI) to name a few. In all cases such resource discovery services function as a layer on top of the DNS by intercepting an identifier before DNS resolution. To date, there are no known services that harmonize resource discovery services during DNS resolution.

In response to industry debate regarding how to modernize and extend the DNS to better support the Internet of the future, Teare submitted a white paper on Jul. 12, 2001 to the National Academies Computer Science and Telecommunications Board. The sub-committee, mandated by the US Congress, is examining Internet Navigation and the Domain Name System. The paper proposes a new naming and identity system for the Internet that would enable applications to access resources and information across multiple networks. The system would include DNS, Keyword-based namespaces, URL's and other namespaces. It would be based on a new unified, standards-based discovery and resolution layer capable of supporting multiple naming services, and directory services. The paper acknowledges that the DNS should remain essentially unchanged, with a single root, and that the proposed system would add new functionality on top of the DNS. Though the white paper proposes a promising vision of resource discovery unification, it still remains unclear as to how this proposed new layer will communicate seamlessly with the DNS, a common problem shared by the increased proposal of other similar resource discovery services.

Internet users all over the world whose native language is represented in character sets other than US-ASCII, and several popular Internet applications support international character sets to make these applications more widely useful. For example, international character sets are supported in today's electronic mail and web browser applications. However, they are not supported in the global DNS. More recently, technology has been developed to use international character sets as an alias for a domain name called a multilingual domain name (MDN) or international domain name (IDN). A native language name may be followed by a TLD or by a native language representation of a resolvable TLD to form a MDN.

U.S. Pat. No. 6,182,148 issued on Jan. 30, 2001 by Tout, entitled, "Method and system for internationalizing domain names" discloses a method and system which allows domain names to be entered in any language without having to modify the existing Internet domain name servers. When a user enters a domain name including non-English characters into an internet program, a domain name transformer intercepts the domain name prior to reaching the resolver. The domain name is converted to a standard format which can represent all language character sets, such as UNICODE. The UNICODE string is then transformed to be in RFC1035 compliant format. Redirector information is then appended to the compliant string which identifies the delegation of authoritative root servers and/or domain name servers responsible for the domain name. The compliant domain string is then resolved by the authoritative domain name server just as any English domain name.

There are further examples of how aliases may be used for requesting, identifying, and locating network resources. U.S. Pat. No. 6,195,707 issued on Feb. 27, 2001 by Minh, entitled, "Apparatus for implementing universal resource locator (URL) aliases in a web browser and method therefor" discloses a method of universal resource locator (URL) alias implementation. The method includes the step of associating a user defined URL alias with a URL, wherein the URL alias is operable for accessing a web page corresponding to the URL. For example, the web browser may be configured to access a corresponding URL if the character set does not begin with "http," as a default measure. Though the '707 patent discloses how an alias may be used to access a URL, a URL alias is detected by determining that the scheme or protocol of the URL is an alias. In effect, alias detection relies upon the presence of some kind of protocol or scheme with no consideration given to methods of aliasing without relying upon protocol detection.

URLs are used in media and written in documents or typed within e-mail, and data files, etc. as a means to make reference to accessible online content that helps express the context of the ideas one wishes to communicate. URLs are generally written in an abbreviated manner as partial URLs or domain names (e.g., "http://www.example.com" is the URL, "www.example.com" is the FQDN, and "example.com" is the domain name). During the early stages of commercialization on the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com".

The "www" in "www.example.com" has become the de facto standard for web server software to connect with hosts on the World Wide Web portion of the Internet. However, in an effort to shorten the URL length both in advertising and as a means of input, a DNS resource record has been used to create aliases for the actual FQDN. The CNAME Record are sometimes called "aliases" but are technically referred to as "Canonical Name" (CNAME) entries. These records enable the use of pointing more than one domain name to a single host. Using canonical names makes it easy to host both an FTP server and a Web server on the same machine. The CNAME record "example.com. IN CNAME www.example.com." enables a domain name to become an alias of a FQDN. This alias allows resolvers to process input such as "http://example.com" to resolve to a web server at the URI "http://www.example.com".

As explained in P. Mockapetris, "Informational RFC (Request for Comment) 1034: DOMAIN NAMES—CONCEPTS AND FACILITIES", Internet Engineering Task Force (IETF), November 1987, "http://www.faqs.org/rfcs/rfc1034.html". the principal activity of name servers is to answer standard queries. Both the query and its response are carried in a standard message format. A domain name identifies a node. Each node has a set of resource information, which may be empty. The set of resource information associated with a particular name is composed of separate resource records (RRs). The order of RRs in a set is not significant, and need not be preserved by name servers, resolvers, or other parts of the DNS.

RRs with owner names starting with the label "*" are called wildcard resource records. Wildcard RRs can be thought of as instructions for synthesizing RRs. When the appropriate conditions are met, the name server creates RRs with an owner name equal to the query name and content taken from the wildcard RRs. The only example of wildcard RR usage in RFC 1034 is that of e-mail aliasing. Recently, ccTLD registries have used wildcard RRs to redirect a resolvable domain name back to the registrar component of the registry to perform registration requests. Performing this technique in a gTLD zone file would cause conflict enabling the Registry to bypass competition among multiple registrars in this very public component of the Internet's underlying technology. As a result a wildcard RR has never been used in a gTLD zone file. Furthermore, due to the global public nature with respect to the root zone file of the single, authoritative root DNS server or any other root DNS server for that matter, a wildcard resource record never been used in a root zone file.

The main use of a web browser location field is for resolving URLs to locate and access resources. Entering a URL in the location field of a web browser serves as a means to access a network resource corresponding to that URL. Because the location field is essential for accessing resources, the design of such location fields have rivaled much competition and innovation between existing web browser products from companies such as Netscape and Microsoft. Improvements to better track and organize sites of URLs that users have visited such as Bookmark folders, URL history, and the personal tool bar are all examples of functionality designed to help users navigate. Other improvements include spell checking and an autocomplete feature from the URL history as text is entered into the location field.

URLs can be removed or made temporarily unavailable for numerous reasons. When a file is removed from a directory, the URL that represents the file location no longer exists and therefore can not be found. It is quite common for users to modify a URL by deleting the file portion as an attempt to access the default "index.html" file from the same directory path. For instance, the URL "http://example.com/first/second/file.html" is not found, leaving the user to remove "file.html" to try to access the modified URL, "http://example.com/first/second". If the modified URL is still not found, then the user manually repeats such steps with the hope that some level of access to the computer resource is successful.

Another location field improvement includes a reverse autocomplete feature to help automate the process of systematically attempting to access a related resource similar to that of the original requested resource. U.S. Pat. No. 6,041,324 issued on Mar. 21, 2000 by Earl, et al., entitled, "System and method for identifying valid portion of computer resource identifier" discloses a method for receiving and validating user input for a computer resource entered into a computing system or network, and distinguishing valid and invalid portions of the user input. The most specific portion of the invalid resource identifier is removed from the invalid resource identifier to create a modified resource identifier, wherein the modified resource identifier is used to attempt to access a higher level computer resource. The fields corresponding to the most specific portion of the resource identifier are removed until the modified resource identifier proves to be a valid resource identifier which can access a computer resource.

The '324 patent treats all input determined to be invalid as an error or mistake without consideration to the benefits of intentionally receiving invalid input for the purpose of resource location. Though the '324 patent distinguishes a valid resource identifier from within an invalid resource identifier entered by the user, no consideration is given to further using the invalid portion of the resource identifier for other purposes such as navigation. The '324 patent treats the invalid identifier as if it was at one time valid.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus """ is a key factor in determining what services are used. Depending on context, the detection of only a "." delimiter implies a domain name for name resolution services whereas the detection of only a """ delimiter implies a search request for directory services and the like.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?% s". The % s is filled in with information regarding the search terms.

RealNames Corporation provides a registry of registered keywords and phrases as an alternate means of resource location. In March 200, Microsoft in alliance with RealNames has configured MSIE AutoSearch feature to bypass DNS resolution and redirect input having only """ delimiters such as keywords and phrases to a RealNames resolver/server in an attempt to find any registered keywords or phrases that match the search input to be used as an alternative navigational tool. If the Keyword has not been bought from a RealNames Registry or one of its Registrars, it is assumed that the user is searching instead of navigating and the input is further processed as a search request from the autosearch. There has never been any provision to perform a Keyword registration request or any identifier registration request from the autosearch. MSIE browser may redirect unresolvable input having only "." delimiters to the autosearch feature, but is configured to prompt the client browser to display an error message. Such input has never been further processed by the autosearch or routed to another naming service provider for further processing.

U.S. patent application Ser. No. 09/525,350 filed Mar. 15, 2000, by Schneider, entitled "Method, product, and apparatus for requesting a network resource" teaches how a registration request may be processed (particularly from an autosearch) in response to determining that a network resource can not be located from an input identifier having a valid domain. U.S. patent application Ser. No. 09/532,500 filed Mar. 21, 2000, by Schneider, entitled "Fictitious domain name method, product, and apparatus", teaches how a valid URI may be constructed, resolved, and accessed (particularly from an autosearch) in response to determining that an input identifier includes a domain name that is not valid (e.g., domain name is fictitious). Both applications teach how input having only "." delimiters can be processed from an autosearch by performing a URI resolution request and/or registration request in response to a failed DNS resolution request.

In addition, U.S. Provisional Application Ser. No. 60/157,075 filed Oct. 1, 1999, by Schneider, entitled "Method and apparatus for integrating resource location and registration services of valid and fictitious domain names" and U.S. patent application Ser. No. 09/653,100 filed Aug. 31, 2000, by Schneider, entitled "Method, product, and apparatus for processing a data request", teach how such resolution and registration methods of valid and fictitious identifiers including multilingual domain names can be integrated into a unified product, apparatus, and system. In effect, the autosearch feature has never been used for further processing of any kind in response to determining that a domain name is unresolvable.

Aside from processing search requests and keyword resolution requests instead of or before processing a DNS resolution request, there has been no known public disclosure of how the autosearch can be used to process request types in response to a failed DNS resolution request until a VeriSign press release, "VeriSign Announces Breakthrough in Web Navigation For Tens of Millions of Users Worldwide", Jun. 20, 2001, "http://corporate.verisign.com/news/2001/pr_20010620.html", which announces that "Internet users can now reach Web site destinations by typing domain names with characters used in their own languages into their Microsoft Internet Explorer 5.0 or higher browser software." Using technology from RealNames Corporation, Microsoft modified a search function of MSIE to enable the International Domain Names to work without the use of special plug-ins or client software. This was followed by an Internet draft provided in Yves Arrouye, "IDN Resolution in Windows Internet Explorer 5.0 and Above", Jul. 3, 2001, "http://www.ietf.org/internet-drafts/draft-arrouye-idn-ie5-resolution-00.txt", describes how internationalized domain names (IDNs) are being resolved in MSIE. The document focuses on the different steps that are taken after a user enters an IDN in the address bar of IE, up to when the relevant Web page is displayed in the user's browser. Though all input identifiers having only a "." delimiter have only recently been configured to pass from the autosearch to a RealNames keyword resolver, the only further processing currently implemented is limited to that of IDN resolution only with the display of an error message for all other input.

An Internet draft provided in M. Duerst, "Internationalization of Domain Names", University of Zurich, December 1996, "http://www.w3.org/lnternational/1996/draft-duerst-dns-i18n-00.txt" introduces the concept of a zero level domain (ZLD) and has served as the foundation for IDN research, development, and commercialization. The domain name system uses the domain "in-addr.arpa" to convert Internet addresses back to domain names. One way to view this is to say that "in-addr.arpa" forms the root of a separate hierarchy. This hierarchy has been made part of the main domain name hierarchy just for implementation convenience. While syntactically, "in-addr.arpa" is a second level domain (SLD), functionally it is a zero level domain (ZLD) in the same way as the "." is a ZLD. A new ZLD is proposed for building the root of a new domain branch, and an encoding of the Universal Character Set (UCS) [ISO10646] into the limited character set of domain names.

An Internet draft provided in Mealling, et al, "Informational RFC (Request for Comment) 2168: Resolution of Uniform Resource Identifiers using the Domain Name System", Internet Engineering Task Force (IETF), June 1997, http://www.faqs.org/rfcs/rfc2168.html, shows how a resolver discovery service (RDS) can be implemented by a new DNS Resource Record, NAPTR (Naming Authority PoinTeR), that provides rules for mapping parts of URIs to domain names. By changing the mapping rules, the host that is contacted to resolve a URI can change, resulting in a more robust URL handling over longer time periods, and form the foundation for URN resolution.

The ".arpa" domain has recently been designated to be used for Internet-infrastructure purposes. This TLD is managed by IANA in cooperation with the Internet technical community under the guidance of the Internet Architecture Board (IAB). More generally, this domain name undertakes a role as a limited use domain for Internet infrastructure applications, by providing a name root for the mapping of particular protocol values to names of service entities.

Another Internet draft provided in Mealling, "URI Resolution using the Dynamic Delegation Discovery System (DDDS)", VeriSign, Inc., February 2001, "http://www.ietf.org/internet-drafts/draft-ietf-urn-uri-res-ddds-03.txt", provides a solution to allow for shortcutting for URN resolution. In the specification generic URI resolution starts by inserting rules for known URI schemes into the 'uri.arpa' registry, which serves as a ZLD. For the 'URN:' URI scheme, one of the rules found in 'uri.arpa' would be for the 'urn' URI scheme. This rule would simply delegate to the 'urn.arpa' zone which also serves as a ZLD for additional NAPTRs based on the URN namespace. URNs can now serve as a new domain branch by appending these new ZLDs to perform DNS resolution from a URN.

A "card.arpa" ZLD is proposed in D. Eastlake 3rd, "ISO 7812/7816 Numbers and the Domain Name System (DNS)", Motorola, February 2001, "http://www.ietf.org/internet-drafts/draft-eastlake-card-map-08.txt" by showing how the DNS as an important element in locating card related facilities on the Internet by mapping ISO 7812 and ISO 7816 number systems into domain names.

Another example of how a ZLD may be used is explained in, P. Falstrom, "Informational RFC (Request for Comment) 2916: E.164 number and DNS", Cisco Systems Inc., September 2000, "http://www.faqs.org/rfcs/rfc2916.html" by showing how DNS can be used for identifying available services connected to a single E.164 phone number. Through transformation of E.164 numbers (ENUM) into DNS names and the use of existing DNS services like delegation through NS records, and use of NAPTR records in DNS, available services for a specific domain name can be discovered in a decentralized way with distributed management of the different levels in the lookup process. The domain "e164.arpa", which serves as a ZLD is being populated in order to provide the infrastructure in DNS for storage of E.164 numbers.

For example, the E.164 number "+1-216-555-1212" can be translated into the "2.1.2.1.5.5.5.6.1.2.1.e164.arpa" domain having a zone that includes NAPTR resource records to help determine which resource to access in response to the ENUM request, however it remains the onus of industry to adapt how, where, and when this transformation takes place. Currently, there are no known tools to adapt the web browser or similar network navigation device to be ENUM enabled. Though the E.164 identifier holds great promise, the expression of the identifier is based on an international standard that may be awkward and unintuitive for quick adaptation by the public. Similar identifiers that represent ENUM may be adapted by the public more readily. There has been evidence over the years of a quicker adoption to informally express a phone number in a syntax similar to an IP address such as "216.555.1212", for example.

Identifiers may exist across multiple namespaces, all with different ownership and rules, and different naming authorities. As shown, there is a recent convergence of attempting to map identifiers across multiple namespaces to access network resources via the DNS. The most common technique for mapping such identifiers is to automatically and transparently transform the identifier in a user's applications before a DNS query is sent. This method does not make any change to the DNS nor require separate DNS name servers. Other examples are proposals which have suggested that modifications are made to the DNS servers to accommodate international domain names, for example. While the proposed solution could work, it requires major changes to the Internet as it exists today. Domain name servers around the globe, which number in the hundreds of thousands, would have to be changed or updated.

An emerging economy of names has created a politically controlled TLD space due to the technical constraint of the DNS having a single authoritative root. Though alternative roots have surfaced to provide alternative TLDs, such services are criticized by supporters of the single root that such implementations disrupt DNS stability and fragment the Internet. However, the same critics encourage competition under the assumption that all such competition will inevitably threaten the stability of the DNS. There has long been an unfulfilled need for processing domain names having TLDs that are not resolvable by a single authoritative public root. Though alternative root servers have been deployed to recognize alternative TLDs, there has been little incentive by industry to move in this direction for concern that using such domain names would confuse the public, fragment the Internet, etc. Now that conventional namespace solutions have been traversed and exhausted, industry is only first beginning to attempt and expand domain namespace by offering proposed solutions with identifiers having only the "." delimiter. It is an object of the present invention to provide a way to use ".anything" in any language without using alternative roots and without fragmenting the single, authoritative root.

Due to the perceived shortage of TLDs, the struggle to add new TLDs has enabled industry to overlook solutions for extending the use of the current domain name space. Such art clearly demonstrates that there is a need for a system to foster better use of domain name space.

Accordingly, in light of the above, there is a strong need in the art for a system and method for enhancing how domain name space can be more extensively used on a network such as the Internet.

SUMMARY OF INVENTION

The present invention provides know-how for new and creative purchasing strategies of domain names from countries around the globe. The invention enables users to create and distribute through at least one media source indicia such as a fictitious domain name (FDN) having a Top Level Domain Alias (TLDA) or a fictitious multilingual domain name (FMDN) having a Multilingual Top Level Domain Alias (MTLDA) for use in advertising in connection with a valid URI that can be calculated and/or generated from such indicia. The present invention takes advantage of the reverse hierarchy of the DNS to create a mapping between trademarks and domain names. The invention enables the creative use of FDNs and FMDNs to emulate real domain names (RDNs). The present invention helps a user to enter less input while navigating online information more precisely in less steps. The invention enables a domain name holder such as an entity or individual to license subdomains for redirection or storage. The present invention allows the possibility for unlikely parties to exchange commerce through licensing and/or partnering.

The present invention serves as a control point for an entity to track demographics, accounting data, or display targeted advertising to a user. The invention measures response rate per media to determine market share and effectiveness of targeted advertising. The present invention assures that the tracking of all TLDA redirection activity is logged and accounted for particularly when it pertains to the distribution of revenues to all parties involved. The invention does not have to rely upon any kind of translation database or registry to a resolvable URI from a FDN.

The present invention allows all of domain name space to be used instead of using only real domain name or valid domain name space. The invention provides a class of FDNs called Real MDNs (RMDNs) and FMDNs. The present invention uses a class of FDNs called Numerical Domain Names (NDNs) to process ENUM, SSN, ISBN, UPC, and credit card FDN identifiers through the DNS. The invention enables for quicker adaptation of the ENUM standard by enabling incomplete ENUM FDNs to be received to save time processing an E.164 identifier. The present invention enables ISBN and UPC FDNs in particular to be redirected to vertical e-commerce marketplace allowing FDNs to be used for ordering books, goods, and products, etc. The invention provides new use by enabling the location field of a network navigation device to also function as a calculator.

The present invention takes advantage of extending the use of postal and zip codes for locating resources. The present invention allows for port aliasing that is used for TLD redirection and querying of identifiers and URNs. The invention allows a registrant to register in any combination, a resolvable TLD, a method of resolution including a template, a PUR1 as a suffix, prefix or both, a search string, an address corresponding to a prefix or suffix delimiter, or component data for the purpose of generating a resolvable URI from a TLDA. The present invention eliminates the extra step of accessing a resource and then searching from such resource by processing a TLDA as a search request in the form "SLD.TLDA" to simultaneously access and search the resource. The invention further allows for immediate personalized results based on providing geographic or other identifiers as the TLDA search term. The present invention provides URI redirection from HLDs and SLDs to vertical market directory services, which can be endorsed, branded, and sponsored by organizations that serve such markets. The invention allows for new information spaces to be created as a result of reorganizing how TLDA name space is distributed to SLD holders.

The present invention provides a definable ranking or hierarchy by enabling registrants to favor resolution methods that may provide a strategic buying advantage or gain broader appeal for the distribution of the registered name as indicia/trademark. The invention allows SLD holders across different TLDs to register TLDA names and emulate a shared SLD name space reducing the likelihood of trademark disputes. The present invention allows for the automatic reception of indicia such as FDNs via print or machine readable code by any means such as but not limited to optical and magnetic data reading input devices to process such indicia and generate at least one valid URI for accessing resources in a network. The invention enables generated available TLDA names to be temporarily reserved which are targeted and personalized for distribution to potential users based on having some knowledge of geographic, demographic, or psychographic data about such potential users. The present invention enables query results to be used as survey data to promote statistics of what TLDAs may become prospective TLDs in the future, sales leads to contact companies and provide personalized demonstration of how TLDA names can be used for advertising, branding, market segmentation, and product differentiation.

The invention provides a distributed cache for minimizing bandwidth of server requests across the backbone of the Internet. The present invention allows for the extended use of registered names by submitting the registered TLDA name on behalf of the registrant if so desired to reserve such a name at a future date for newly approved TLDs of the DNS. The invention can use the MSIE autosearch feature for the purposes of FDN processing either before and/or after a DNS query in addition to the purpose of searching in lieu of making browser modifications resulting in the savings of distribution costs for software updates.

The present invention enables fictitious domain name resolution either before, during, and/or after a DNS query. The invention enables all identifiers having a TLDA resolvable through the DNS. The present invention enables any namespace to be transformed into a FDN for DNS resolution processing including reiterative and/or recursive identifier transformations across multiple namespaces. The present invention enables the smallest possible modification to the DNS to achieve immediate ubiquity to FDN usage on the Internet without having to change MSIE autosearch or add new client resolvers. The invention enables the single authoritative root to process all HLDs as resolvable enabling the DNS to become all inclusive leaving alternative roots no choice but to create a system of virtually exclusive roots instead of VIRs. The present invention enables a new infrastructure domain such as "tlda.arpa" to be used as a Primary Virtual Zero Level Domain (PVZLD) for brokering FDN requests across multiple namespaces to namespace providers who manage Secondary Virtual Zero Level Domains (SV-ZLD).

In general, in accordance with the present invention a method includes the steps of determining that an identifier includes a fictitious domain name (FDN) and requesting a network resource from at least a portion of the identifier.

In accordance with an aspect of the present invention a method for processing a network resource from a first identifier having an unresolvable domain name includes the steps of determining whether the domain name is fictitious, processing a registration request from at least a portion of the first identifier in response to determining that the domain name is not fictitious, generating a second identifier in response to determining that the domain name is fictitious, and requesting the network resource from the second identifier.

In accordance with another aspect of the present invention a method includes the steps of determining whether a first identifier includes a domain name, determining whether the domain name is fictitious, determining whether the first identifier is resolvable in response to determining that the domain name is not fictitious or in response to determining that the first identifier does not include the domain name, requesting a network resource from the first identifier in response to determining that the first identifier is resolvable, generating a second identifier in response to determining that the domain name is fictitious or in response to determining that the first identifier is not resolvable, and requesting the network resource from the second identifier.

In accordance with yet another aspect of the present invention a method includes the steps of selecting a first domain name having a resolvable top level domain, generating a second domain name having a top level domain alias from the first domain name, and distributing the second domain name through at least one media source.

In accordance with still yet another aspect of the present invention a method includes the steps of determining that a fictitious domain name (FDN) is available for registration, registering the FDN, and determining whether to pre-register the FDN as a prospective real domain name.

In accordance with another aspect of the present invention a method includes the steps of determining that a fictitious multilingual domain name (FMDN) is available for registration, registering the FMDN, and determining whether to pre-register the FMDN as a prospective real multilingual domain name.

In accordance with yet another aspect of the present invention a method for locating a network resource from an identifier having a domain name includes the steps of determining whether the domain name is fictitious, resolving the identifier in response to determining that the domain name is not fictitious, generating a resolvable identifier in response to determining that the domain name is fictitious, and resolving the generated identifier.

In accordance with another aspect of the present invention a method for locating a network resource from a first identifier having a fictitious domain name includes the steps of generating a resolvable second identifier having a real domain name corresponding to at least a portion of the first identifier, and resolving the second identifier.

In accordance with an aspect of the present invention a DNS server includes a root zone file and a resource record adapted to resolve a DNS query including a domain name having a top level domain alias (TLDA).

In accordance with another aspect of the present invention a network navigation device includes a navigation component that attempts to complete a navigation request from an identifier and a search component adapted to generate a non-search request from at least a portion of the identifier in response to the navigation component that can not complete the navigation request.

In accordance with yet another aspect of the present invention a network navigation device includes a navigation component that receives a navigation request having an identifier, a search component that intercepts the identifier, the search component adapted to determine that the identifier includes a fictitious domain name (FDN) and generate a search request from at least a portion of the identifier having the FDN.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 10*b* presents an exemplary table in accordance with the present invention illustrating a simplified data structure of postal code information.

FIG. 13 is a table of generated URI equivalents to input in accordance with the present invention.

FIG. 15*a* presents an exemplary table in accordance with the present invention illustrating a simplified data structure for component data and PUR1s.

FIG. 15*b* is an illustration of method number and associated rankings in accordance with the present invention.

FIG. 20*b* is an illustration of correspondence that may be sent to a potential registrant in accordance with the present invention.

FIG. 23*b* presents an exemplary table in accordance with the present invention of a root zone file having a wildcard resource record.

DETAILED DESCRIPTION

Figure 1A:
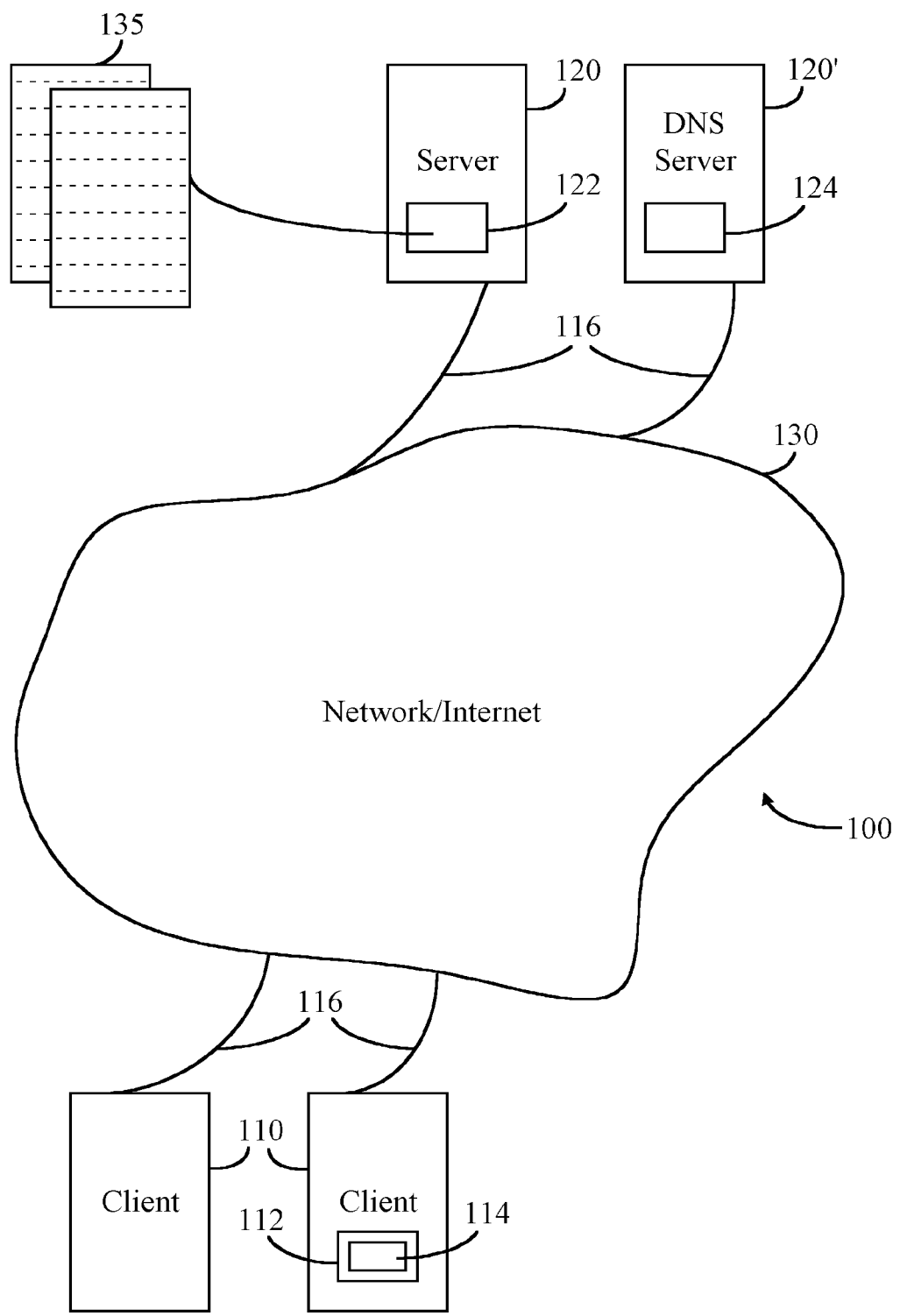
FIG. 1a is a block diagram of an exemplary distributed computer system in accordance with the present invention.

The present invention will now be described with reference to the drawings, wherein like reference numerals are used to refer to like elements throughout.

FIG. 1*a* illustrates an exemplary system for providing a distributed computer system 100 in accordance with one aspect of the present invention and may include client computers or any network access apparatus 110 connected to server computers 120 via a network 130. The distributed system 100 includes client computers or any network access apparatus 110 connected to server computers 120 via a network 130. The network 130 may use Internet communications protocols (IP) to allow the clients 110 to communicate with the servers 120. The communication device of a network access apparatus 110 may include a transceiver, a modem, a network interface card, or other interface devices to communicate with the electronic network 130. The network access apparatus 110 may be operationally coupled to and/or include a Global Positioning System (GPS) receiver. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a peer-to-peer network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network navigation device, a network television, an internet television, a set top box, a web-enabled telephone, an internet appliance, a portable wireless device, a television receiver, a game player, a video recorder, and/or an audio component, for example.

Each client 110 typically includes one or more processors 144, memories 146, and input/output devices 148. An input device may be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130.

DNS is a distributed database 124 that holds mapping information in resource records. The DNS provides these resource records (from zone files) in response to queries it receives from programs called resolvers on individual computers throughout the Internet. The distributed database 124 is implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 (zone files) for all of the hosts in the Internet. Instead, the mappings 124 are distributed across many name servers 120'.

Although the client computers 110 are shown separate from the server computers 120, it should be understood that a single computer can perform the client and server roles. Those skilled in the art will appreciate that the computer environment 100 shown in FIG. 1*a* is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 132. The pages 132 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 132. The browser programs 112 enable users to enter addresses of specific Web pages 132 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

Figure 1B:
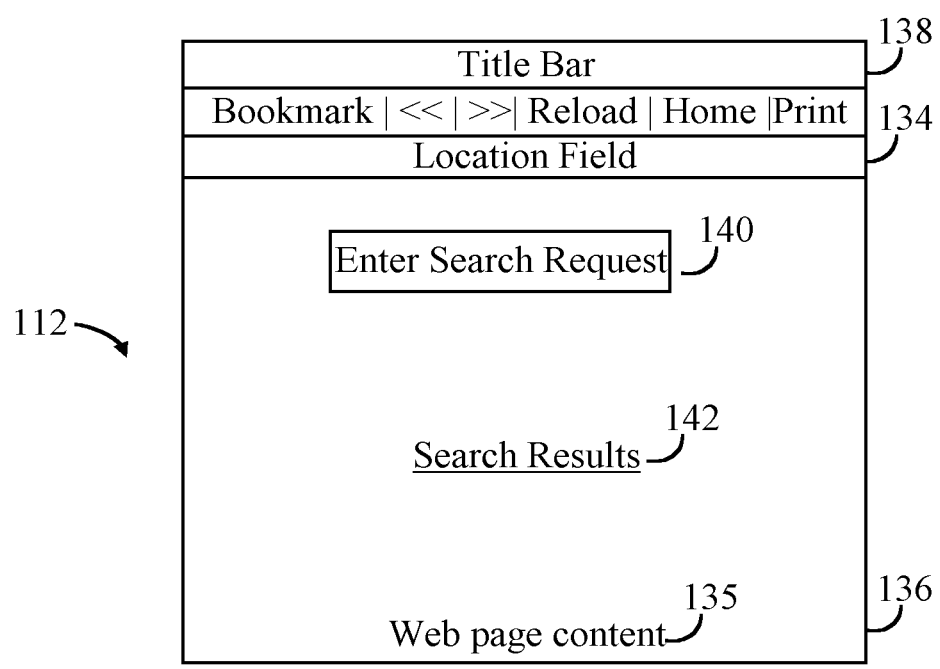
FIG. 1b is a diagram depicting the location field in a conventional web browser.

FIG. 1b more specifically illustrates an exemplary selection of common operative components of a web browser program 112. The web browser 112 enables a user to access a particular web page 132 by typing the URL for the web page 132 in the location field 134. The web page 132 content corresponding to the URL from the location field 134 may be displayed within the client area of the web browser display window 136, for example. Title information from the web page 132 may be displayed in the title bar 138 of the web browser 112. The web page 132 content may further include a user interface element such as that of an input text box 140 for inputting search requests and, in turn, search results having identifiers 142 such as a hyperlink or URL.

Figure 1C:
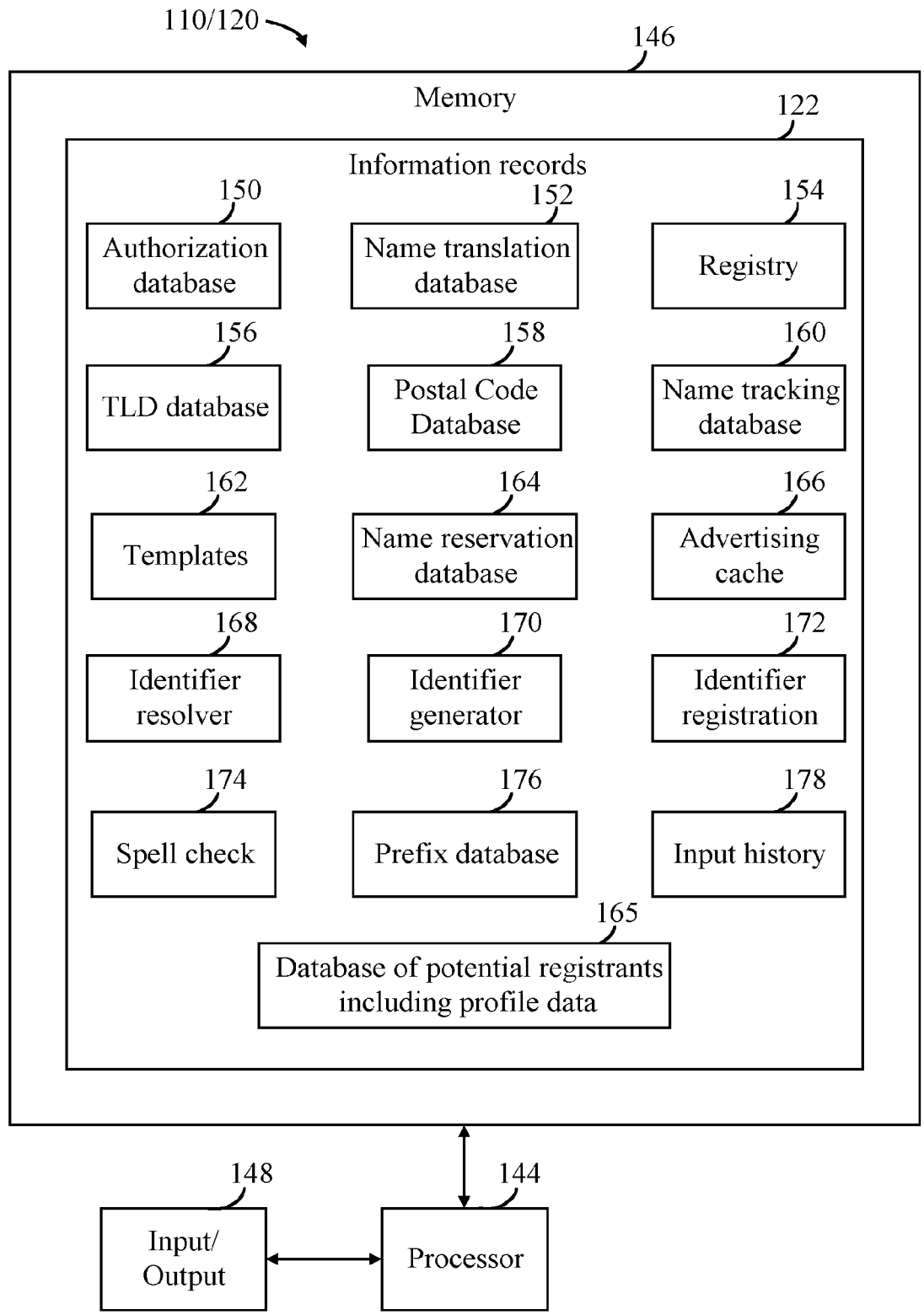
FIG. 1c is a block diagram illustrating exemplary information records stored in memory in accordance with the present invention.

FIG. 1c illustrates a block diagram of a storage device such as memory 146 in operative association with a processor 144. The processor 144 is operatively coupled to input/output devices 148 in a client 110 and/or server 120 computing system. Stored in memory 146 may be programs, scripts, and information records 122 having any combination of exemplary content such as lists, files, and databases. Such records may include for example: authorization information 150, name translation information 152, registry information 154, resolvable TLD information 156 (including the representation of TLDs in other languages/character sets), postal code information 158, name tracking information 160, autosearch template information 162 (e.g., including namespace templates, redirection templates, prefix templates, identifier generation templates, identifier registration templates, resolver selection templates, resolution method templates, calculator templates, numerical identifier templates, and the like), name reservation information 164, advertising (cache) information 166, information 165 of potential registrants including profile (geographic, demographic, and psychographic) data, identifier resolver 168, identifier generator 170, identifier registration 172, spell check 174, prefix database 176, and input history 178. These information records 122 are further introduced and may be discussed in more detail throughout the disclosure of this invention.

Figure 1D:
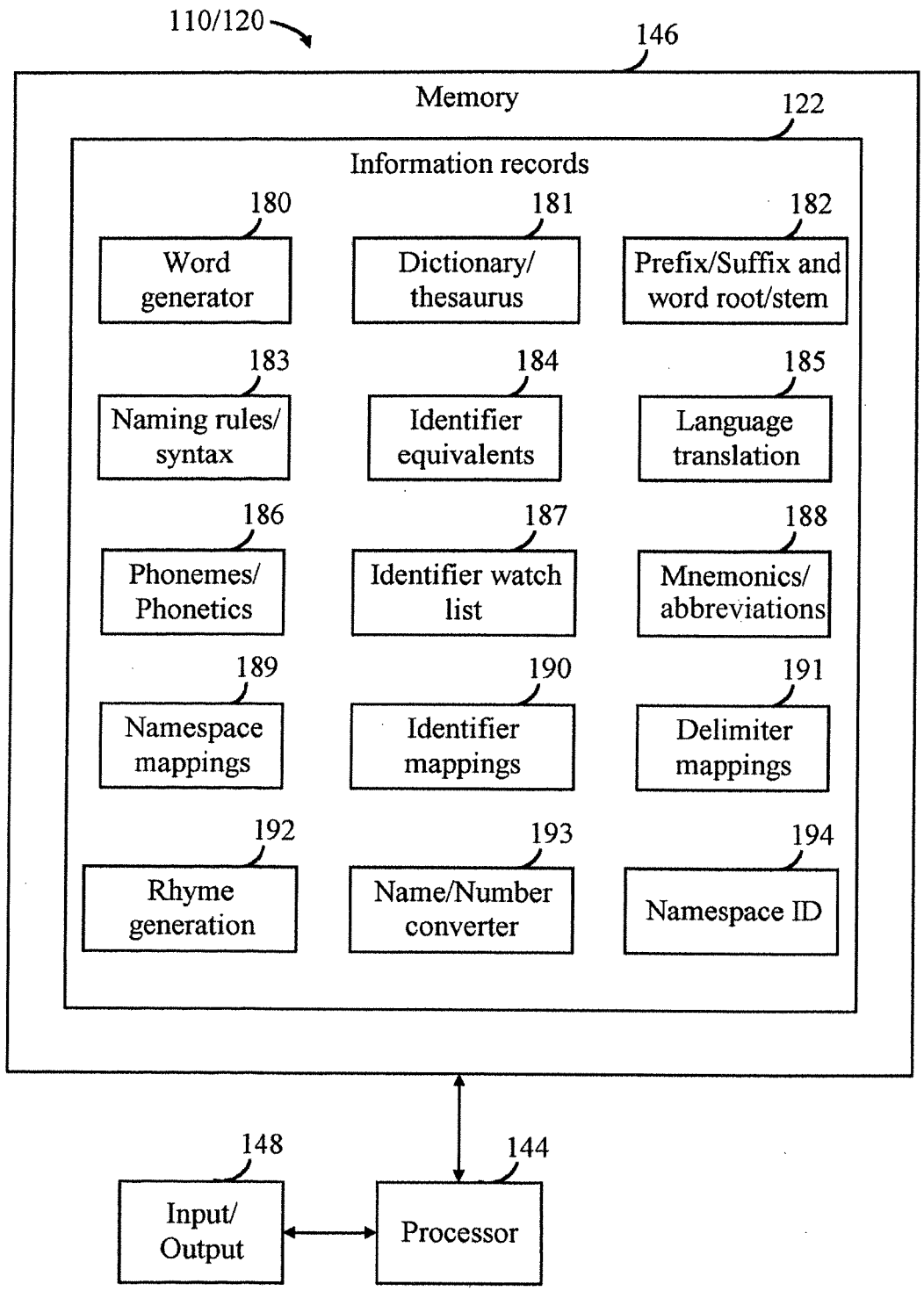
FIG. 1d is another block diagram illustrating exemplary information records stored in memory in accordance with the present invention.

FIG. 1d illustrates a block diagram of a storage device such as memory 146 in operative association with a processor 144. The processor 144 is operatively coupled to input/output devices 148 in a client 110 and/or server 120 computing system. Stored in memory 146 may be programs, scripts, and information records 122 having any combination of exemplary content such as lists, files, and databases. Such records may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and namespace ID 194. These information records 122 can be used in operative association in any combination with the identifier resolver 168, identifier generator 170, and identifier registration 172 as well as considered component data and stored in the registry 154 and/or translation database 154 and may be further introduced and discussed in more detail throughout the disclosure of the present invention.

Figure 2A:
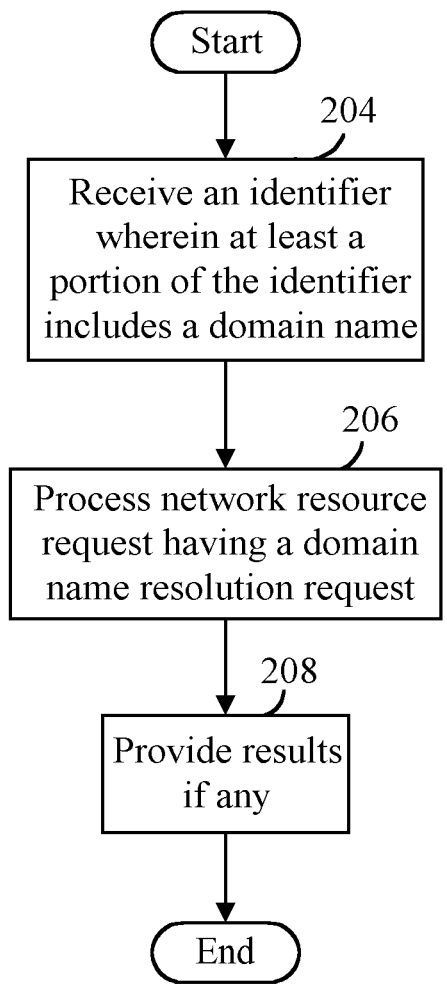
FIG. 2a is a top level flowchart illustrating the steps of an exemplary prior art system for processing a network resource request.

FIG. 2a is a top level flowchart illustrating the steps of an exemplary prior art system for processing a network resource request. An identifier is received in step 204 wherein at least a portion of the identifier includes a domain name. The identifier can be received from internal automation, external automation, activation of a hyperlink, network resource redirection, and input such as a user interface element. Inputting the identifier into a user interface element may include the step of inputting the identifier into one of a browser location field, text box, command line, speech to text interface, optical recognition interface, and magnetic recognition interface. A user interface element may include one of a web page, hyperlink, message box, prompt, and the like. A network resource request may then be processed in step 206 from the received identifier the resource request adapted to perform a domain name resolution request. Result may then be presented/provided in step 208 from processing (step 206) the network resource request.

Figure 2B:
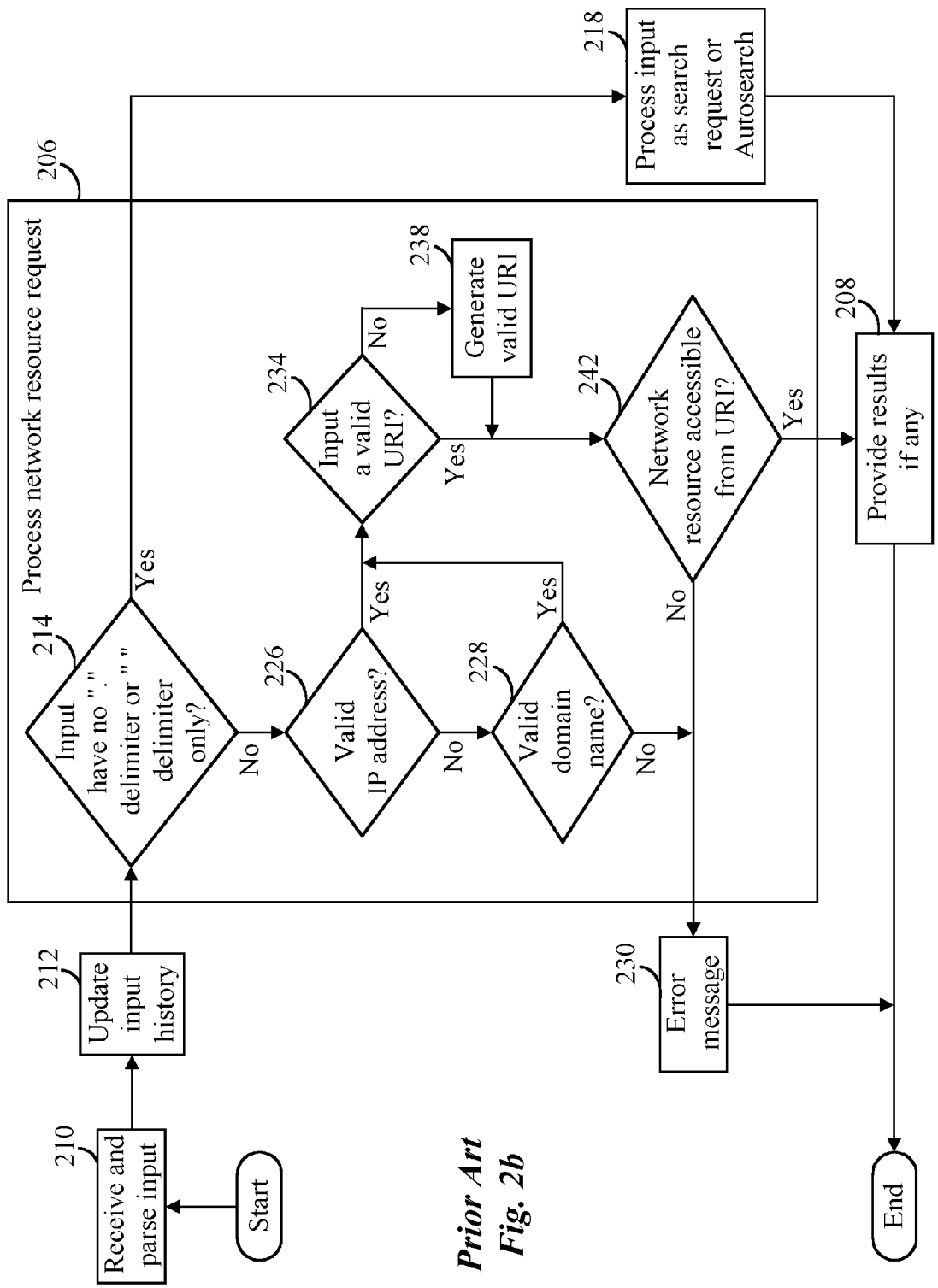
FIG. 2b is a top level flowchart illustrating the steps of an exemplary prior art system for accessing a network resource from a navigation or resource location request.

FIG. 2b is a top level flowchart illustrating the steps of an exemplary prior art system for accessing a network resource from a navigation or resource location request. A device such as a network access apparatus 110, servlet, applet, stand-alone executable program, or user interface element such as a text box object, command line, speech to text interface, location field 134 of a web browser 112, may receive and parse input such as text or voice in step 210 and input history is updated in step 212. Tests are then performed to determine how to process (step 206) the network resource request from the received input 210. For instance, when it is determined in step 214 that input 210 has no "." delimiters or """" delimiters only, it becomes clear that there is no domain name or IP address present and input 210 may be processed as a search request (e.g., AutoSearch feature) in step 218. Results if any, may then be provided (e.g., notified, accessed, and/or displayed) in step 208. When the presence of the "." delimiter is determined in step 214, the input may include either an IP address or a domain name (e.g., input includes one or more "." delimiters only). When it is determined in step 226 that input does not include a valid IP address and determined in step 228 that input does not include a valid domain name, an error message may be displayed in step 230.

When input includes a valid IP address (step 226) or when input includes a valid domain name (step 228), it may then be further determined in step 234 whether input 210 includes a valid URI. If there is no valid URI, then a valid URI may be generated in step 238 from input 210. For instance, if a scheme/protocol is missing, the web browser may add the prefix "http://" to the text or another scheme prefix. A valid URI includes either a valid IP address or a real domain name (RDN). A RDN is a valid domain name having a resolvable TLD. After performing input validity tests, the steps of domain name resolvability may be performed. When a network resource from a received (step 234) or generated (step 238) valid URI is determined accessible in step 242, then results, if any, may then be provided in step 208. However, when a network resource corresponding to a URI is determined not accessible in step 242, an error message may be displayed in step 230.

One example of such a prior art system is when a domain name (e.g., "example.com") is received from a network navigation device having a search function such as the location field 134 of a web browser program 112 like the MSIE browser. The MSIE browser generates a URI (e.g., "http://www.example.com") from the domain name. If the domain name is resolvable (e.g., the domain name is successfully translated into its corresponding IP address) then the web browser 112 attempts to access content from a web server 120 corresponding to the URI. If the domain name is not resolvable, then input 210 may be passed and the following URI is generated:

"http://auto.search.msn.com/response.asp?MT=example.com&srch=3&prov=&utf8"

The "." is a delimiter of the DNS system whereas the "" is a delimiter of plain text language. When a keyword search is provided as input, (e.g., "search example") it may be determined that DNS name resolution is unnecessary and input 210 may be immediately redirected to the Microsoft Network (MSN) AutoSearch feature. In effect, all input that can not be successfully resolved/located/accessed may be redirected to the server at "auto.search.msn.com" and processed accordingly as either an error message or search request. The Netscape Navigator browser program does not provide additional processing when a domain name is not resolvable, and instead, displays the following error message: "Browser is unable to locate the server: example.com The server does not have a DNS entry. Check the server name in the Location (URL) and try again."

Figure 2C:
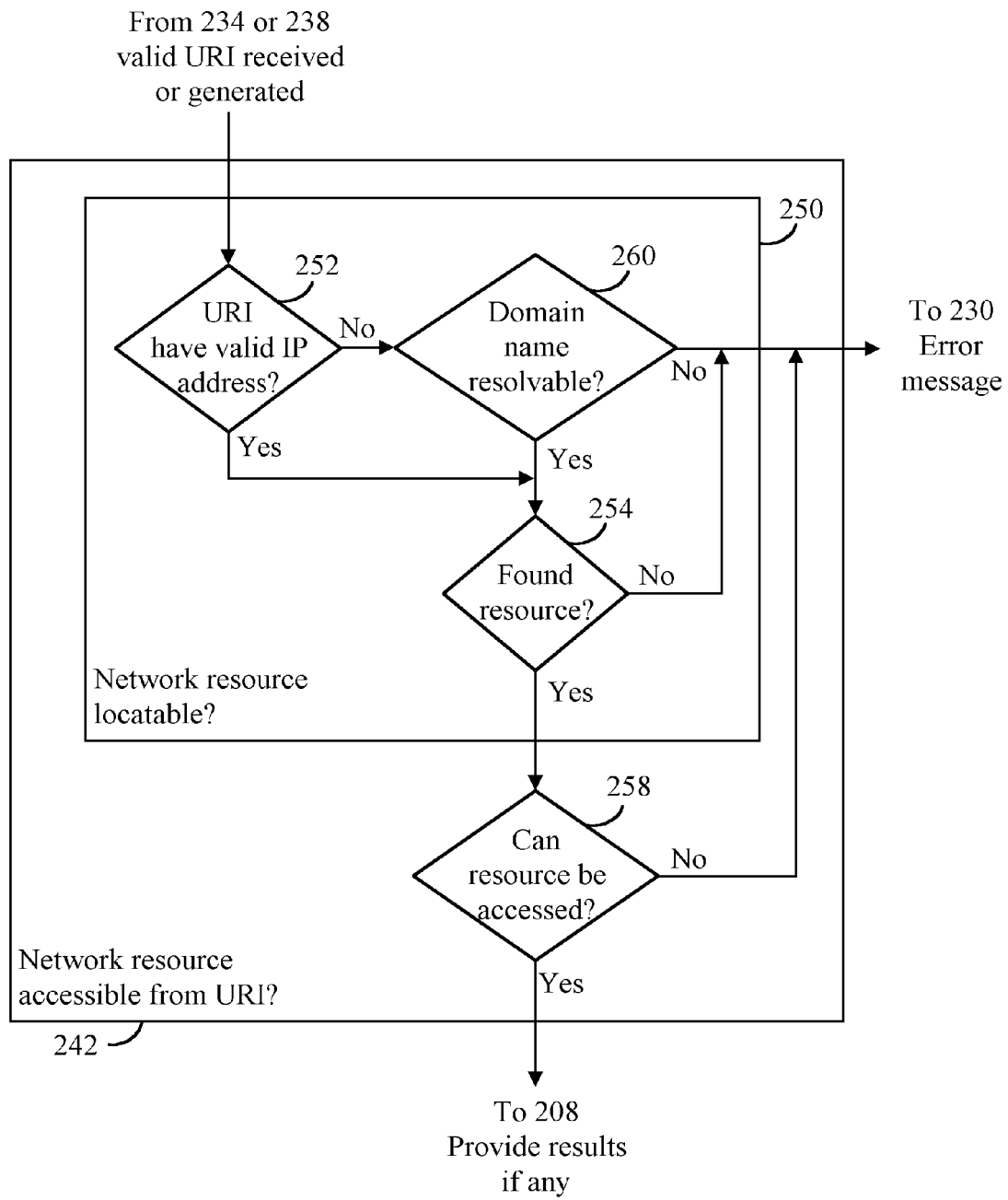
FIG. 2c more specifically illustrates steps that are performed for determining whether a network resource is accessible from a URI.

FIG. 2c more specifically illustrates steps that are performed for determining whether a network resource is accessible (step 242) from the URI. It is first determined in step 250 whether a network resource can be located from the received (step 234) or generated (step 238) valid URI. When the URI is determined in step 252 to not include a valid IP address, and instead includes a domain name, it is then determined in step 260 whether the domain name is resolvable. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html".

When the domain name is determined resolvable (step 260) or when the URI includes a valid IP address (step 252), it is further determined in step 254 whether a network resource such as a web page or web server can be located or found from the URI. If so, then the network resource can be located (step 250) and it is determined in step 258 whether the network resource can be accessed. When content, for example, can be accessed from the web server (network resource) then the network resource is accessible from URI (step 242) and results, if any, may then be provided in step 208. When the domain name is determined not resolvable (step 260) or when the resource can not be found (step 254) or when the resource can not be accessed (step 258) then an error message is displayed in step 230.

MSIE browser may redirect such input to the autosearch feature, but is configured to prompt the client browser to display an error message. The domain name that is not valid or not resolvable has never been further processed by the autosearch or routed to another naming service/resolution provider or registration provider for further processing. For example, such input is not routed to a RealNames server and/or resolver for domain name resolution or registration services of any kind.

Figure 2D:
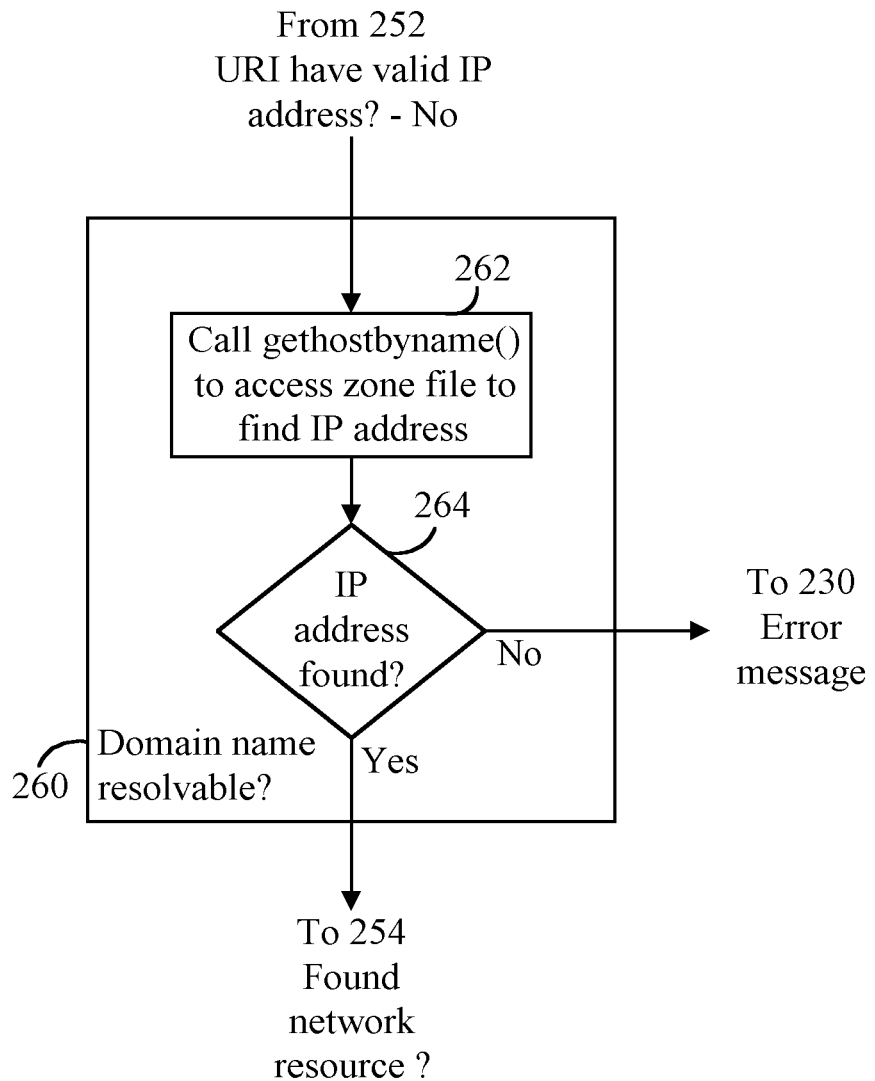
FIG. 2d is a flowchart illustrating the steps of an exemplary prior art system for determining domain name resolvability.

FIG. 2d is a flowchart illustrating the steps of an exemplary prior art system for determining domain name resolvability. Specific steps for the determination of domain name resolvability (step 260) include issuing a function call in step 262 from a resource navigation system such as the web browser 112 to gethostbyname( ) from the resolver library 114 to translate the domain name into its corresponding IP address from the DNS database 124 (zone file) of a DNS server system 120'. When gethostbyname( ) returns a NULL pointer in step 262, then it is determined in step 264 that no IP address is found and an error message is displayed in step 230. However, when an IP address is found in step 264, then a request is submitted to find (step 254) and access the network resource located at the IP address.

In a hierarchical naming system such as the DNS, a domain label may represent a domain level such as the highest level domain (HLD). A HLD that is determined not resolvable is referred to as a Top Level Domain Alias (TLDA) whereas a resolvable HLD is referred to as a Top Level Domain (TLD). A TLD/HLD is resolvable when such a domain is included in the single authoritative root of the DNS. This is to be distinguished from alternative TLDs and those TLDs considered resolvable in an alternative root or virtual inclusive root and the like. Of course as reflected in U.S. Provisional Application Ser. No. 60/125,531 filed Mar. 22, 1999 and its corresponding conversion patent application, alias detection is by no means limited to HLDs but is applicable across any domain level. For instance, a non-resolvable SLD is called a SLDA and a non-resolvable 3LD is called a 3LDA and so on.

RFC 1035 compliant domain names also called valid domain names (VDNs) offered by traditional domain name registries are restricted to a limited 7 bit ASCII character set: A to Z, a to z, 0 to 9, and hyphen. In addition, the maximum character length of any domain level is 63 octets/characters. Any domain name that is not valid (e.g., SLD is greater than 63 characters, characters other than that of A to Z, a to z, 0 to 9, and hyphen, and/or non-ASCII character sets used to represent multilingual/international domain names) or any domain name having a domain alias such as a TLDA is called a fictitious domain name (FDN). For example, a VDN having a TLDA is a FDN. FDN may also be called an imaginary domain name (iDN) whereas a VDN having a resolvable TLD may also be called a real domain name (RDN).

A FDN may also be called a domain name alias (DNA), partial domain name (PDN), or relative domain name (rDN). Domain names that include at least one character/symbol from any character set other than a 7-bit ASCII set are FDNs that can more specifically be called multilingual domain names (MDNs) or international/internationalized domain names (IDNs). MDNs/IDNs include either a resolvable TLD or a representation of a resolvable TLD. This class of TLDs are called Multilingual TLDs (MTLDs) or International TLDs (ITLDs). Furthermore MDNs/IDNs can also be referred to as a real MDN (RMDN) or real IDN (RIDN) respectively. As will be shown MDNs/IDNs may not be able to translate/canonically map to a real domain name in one step and may first transform into a FDN and then a RDN. For instance, a MDN can have a Multilingual TLDA (MTLDA), which is a domain that maps to a TLDA instead of a TLD. Such MDNs and IDNs are called Fictitious MDNs (FMDNs) and Fictitious IDNs (FIDNs) respectively.

Though a RMDN/RIDN is a specific class of FDN, to date, the HLD of a RMDN/RIDN has been limited to the set of resolvable TLDs or the representation of the set of resolvable TLDs in non-ASCII character sets. There is yet a more specific class of FDNs called Hybrid Domain Names (HDNs). HDNs have a mixture of languages or character sets within a single domain name. For instance, the SLD of a domain name comprises a non-ASCII character set but includes an ASCII gTLD or ccTLD such as the representation of some MDNs/

IDNs. A HDN includes a non-ASCII character in at least one domain level and the limited 7-bit ASCII characters in at least one other domain level.

Domain level is a term of reference with respect to differentiating concatenated labels of a FDN or FMDN from one another and does not mean that FDNs or FMDNs are limited to having a hierarchical structure. In fact, in most cases FDNs and FMDNs are flat with no hierarchy or structure. FDNs and FMDNs can also be called fictitious domain identifiers (FDIs) and when applied to the DNS are represented by a character string having at least one delimiter such as the "." delimiter. A URN, which is a resource name identifier, may or may not be hierarchical and is usually represented by a character string having at least one delimiter such as the ":" delimiter. In most cases, a URN can be represented by a FDN, enabling name resolution through the DNS, autosearch feature, or keyword resolver.

For the purposes of illustration the use of TLDs, further includes the plurality of domains that do not represent a hostname. For instance, there are Generic Second Level Domains (gSLDs) that are lower level to ccTLDs (e.g., ".com.au", ".net.au" are generic zones within the Australian domain) and for the purposes of simplifying discussion are considered TLDs. For example, the input "example.44106.us" is received and it is determined that ".us" is resolvable. The list of resolvable TLDs further includes state level subdomains (e.g., ".oh.us", ".ca.us", ".ny.us" etc.) to assure ccTLD resolvability. Therefore when a ccTLD such as ll.USll is detected, it may further be determined whether ".44106" is resolvable with respect to ".us" where the HLD in this case is defined as ".44106.us" and upon lookup determined to be not resolvable and therefore processed as a TLDA.

Input such as text or a character string may be comprised of at least one symbol having at least one domain. In most cases, the character string is comprised of a plurality of symbols separated by at least one delimited symbol. Delimiters are determined from a list of reserved symbols of a given character set. The character set is comprised of a symbol space used to generate at least one character string. A single character set such as UNICODE may represent many character sets and/or many languages. The delimiter is what creates a plurality of domains. Each domain comprises at least one symbol. The minimum length of a character string having a plurality of domains is three.

Different reserved symbols may be used as equivalents for generating different character strings that yield the same destination (e.g., A.B=A B=A/B=A!B, etc.). A character string having only one domain most commonly functions as a label or search term (e.g., "a" or "apple" etc.), however a character string having a plurality of domains functions as a domain name (e.g., "a.com" or "sunday.comics"). In some cases, the character string is also equivalent to a URI (e.g., "http://example.com/index.htm") or a domain name with a prefix delimiter (e.g., "$name.game").

Figure 2E:
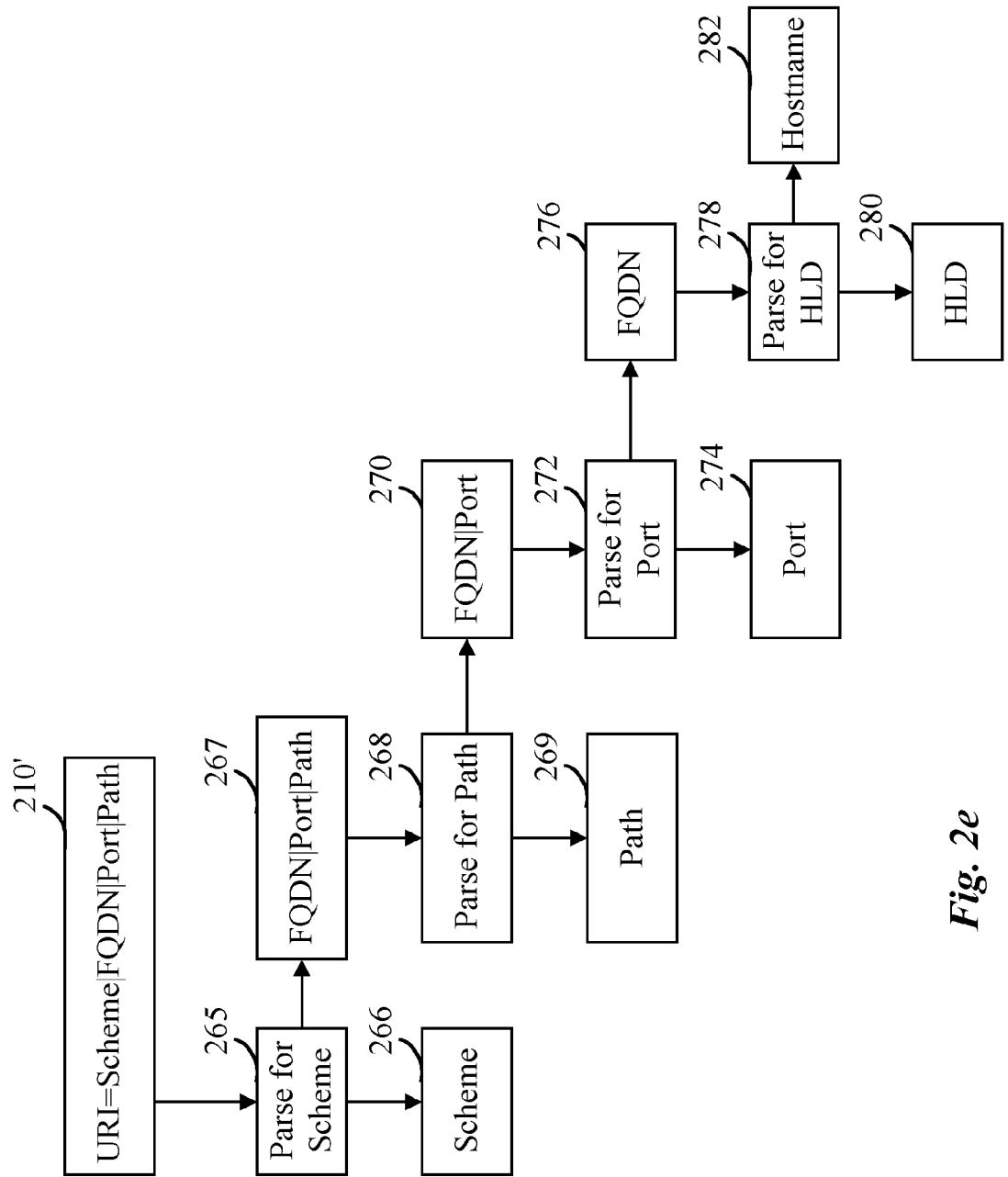
FIG. 2e is a flowchart illustrating the steps performed for parsing a data components including a HLD from an URI in accordance with the present invention.

FIG. 2e is a flowchart illustrating the steps performed for parsing a data components including a HLD from an URI in accordance with the present invention. When input 210 includes a domain name, resolvability may be determined by parsing a HLD from input 210. A URI 210' including a scheme, Fully Qualified Domain Name (FQDN), port, and path is parsed. The scheme 266 is parsed in step 265 from the URI 210' leaving the FQDN, port, and path 267. The path 269 is parsed in step 268 from the FQDN, port, and path 267 leaving the FQDN and port 270. The port 274 is parsed in step 272 from the FQDN and port 270 leaving the FQDN 276. The HLD 280 is parsed in step 278 from the FQDN 276 leaving a hostname 282. FIG. 2e depicts one of many parsing schemes that may be applied when parsing input in step 210.

Figure 2F:
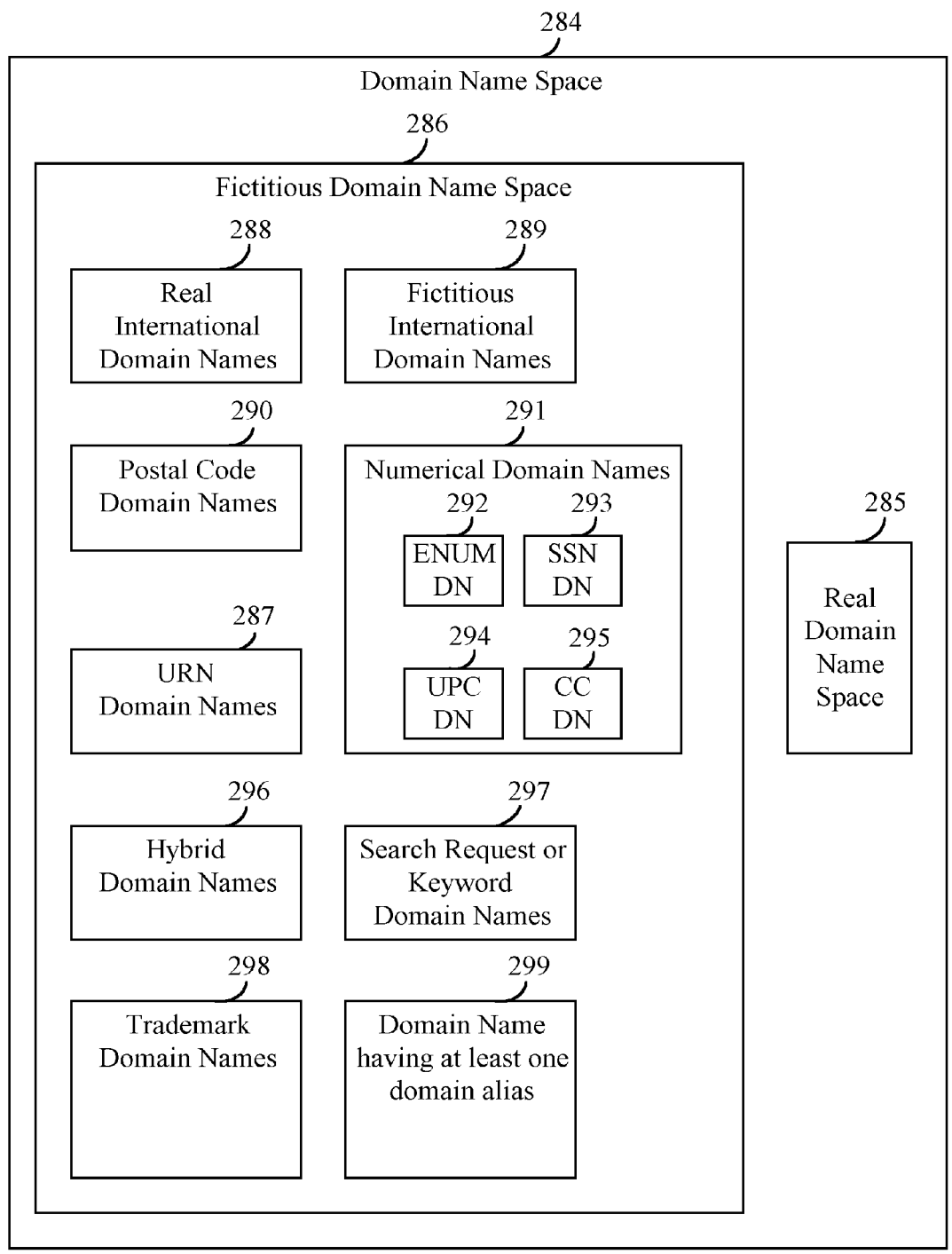
FIG. 2f is a top level block diagram illustrating components of domain name space in accordance with the present invention.

FIG. 2f is a top level block diagram illustrating components of domain name space in accordance with the present invention. InterNIC describes domain name space 284 as the sum total of domain names that currently represent networks and computers, as well as all of the possible domain names--not yet in use--which may potentially represent networks and computers. This means that real domain name space 285 is only a part of the total domain name space 284. This definition of name space also includes the space of domain names that do not exist as of yet. Fictitious domain name space 286 is by far orders of magnitude greater than the space of real domain names 285 within the total domain name space 284. Other spaces within fictitious domain name space 286 can include URN FDNs 287 (e.g., urn.isbn.03141-5926-5), Real International Domain Names (RIDNs) 288, Fictitious International Domain Names (FIDNs) 289, Postal Code FDNs 290, Numeric Domain Names (NDNs) 291 such as ENUM FDNs 292 (e.g., 216.555.1212), Social Security Number (SSN) FDNs 293 (e.g., 123.45.6789), UPC FDNs 294 (e.g., 12345.67890), Credit Card Number FDNs 295 (e.g., 4128.1234.4433.3221), and other numerical domain names such as (not shown) ISBN FDNs and the like, Hybrid Domain Names (HDNs) 296, Keyword (or search request) Domain Names (KDNs) 297, Trademark Domain Names (TDNs) 298, and Domain Alias Domain Names (DADNs) 299 such as a VDN or FDN having a TLDA, SLDA, or 3LDA to name a few.

Though not illustrated in this top level block diagram, VDNs and FDNs are by no means mutually exclusive spaces. For instance, the NDN "216.555.1212" is a VDN in the sense that numbers are syntactically valid and are RFC 1035 compliant but at the same time the HLD ".1 21 2" is not a resolvable TLD and therefore is a TLDA making the NDN a FDN as well. However, RDNs and FDNs are mutually exclusive spaces. Domain name space is the union of RDN space 285 and FDN space 286.

Figure 2G:
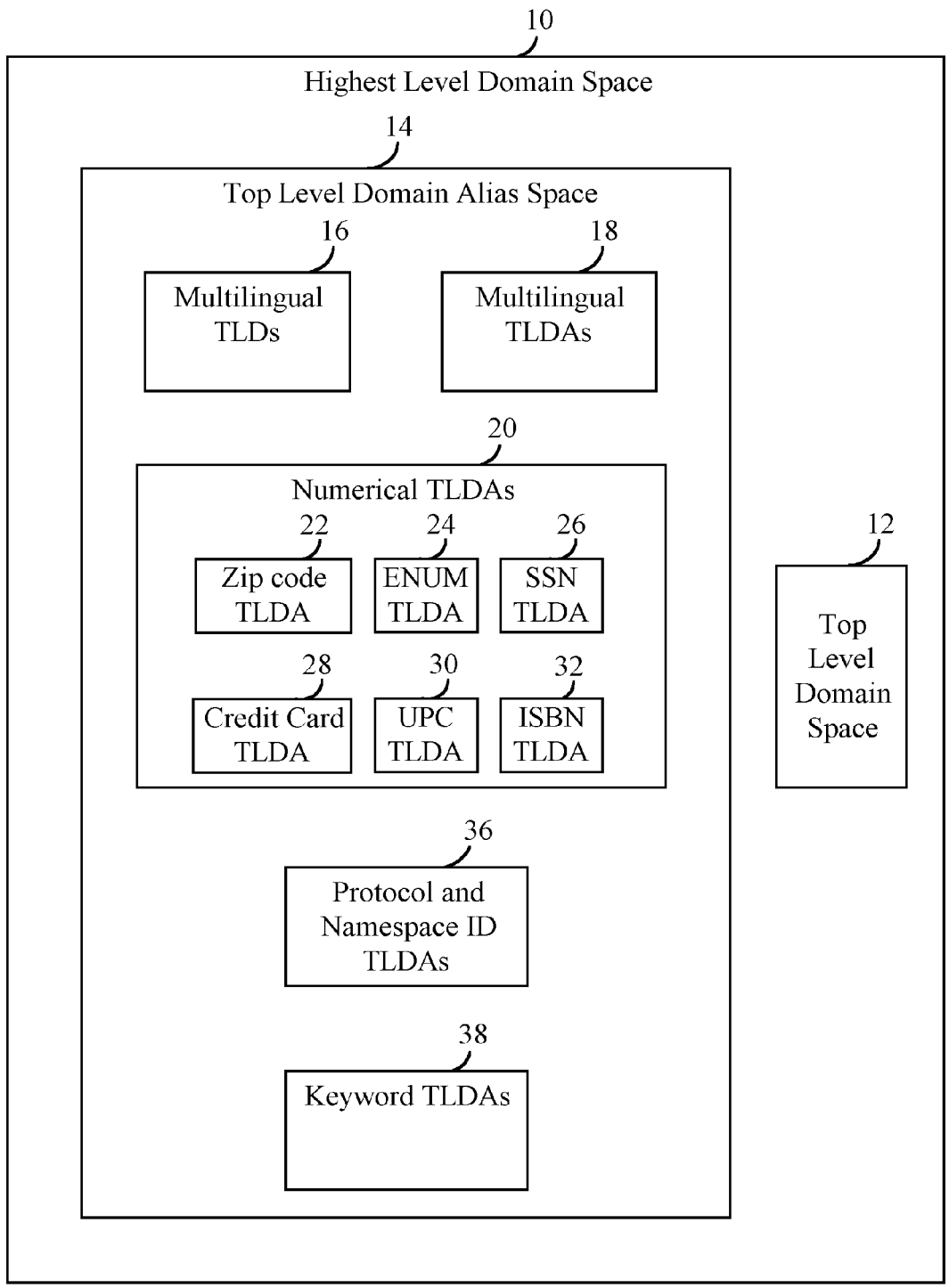
FIG. 2g is a top level block diagram illustrating components of a highest level domain (HLD) space in accordance with the present invention.

FIG. 2g is a top level block diagram illustrating components of a highest level domain (HLD) space in accordance with the present invention. A HLD space 10 includes a TLD space 12 having the set of resolvable TLDs and a TLDA space 14. TLD space 12 and TLDA space 14 are mutually exclusive spaces. HLD space 10 is the union of TLD space 12 and TLDA space 14. TLDA space 14 is by far orders of magnitude greater than TLD space 12. Other spaces within TLDA space 14 can include MTLDs 16, MTLDAs 18, numerical TLDAs 20 such as zip code TLDAs 22, ENUM TLDAs 24, SSN TLDAs 26, credit card TLDAs 28, UPC TLDAs 30, ISBN TLDAs 32 and the like, protocol and namespace ID TLDAs 36, and keyword TLDAs 38 to name a few.

Identifiers such as the Numerical identifiers as discussed in conjunction with FIGS. 2f and 2g is by no means limited to the above illustrations. Numerical identifiers may also include identifiers having such as but not limited to Inter Deposit Digital Number (IDDN), International Standard Book Number (ISBN), International Standard Technical Report Number (ISRN), International Standard Serial Number (ISSN), European Article Number (EAN), Universal Product Code (UPC), Standard Address Number (SAN), International Standard Audiovisual Number (ISAN), International Standard Music Number (ISMN), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), Manufacturer Identification Number (MIN), Standard Industrial Classification (SIC), Standard Occupational Classification (SOC), Stock Keeping Unit number (SKU), Dunn and Bradstreet Number (DUNS), SEC file number, patent number, trademark number, serial number, charter number, policy number, certification number, reference number, invoice number, transaction number, validation number, account number, merchant number, authorization number, driver license number, license plate number, broadcast frequency number, ZIP code, ICQ number, date, time, integer, and number, etc.

Several mechanisms may be employed for processing fictitious domain names. A mechanism for detecting and/or intercepting a FDN may occur in any combination either before, during, and/or after name resolution (e.g., querying the DNS for a corresponding IP address). For instance, the FDN can be detected at a network layer in the user system before DNS resolution or detected server side after DNS resolution by adapting MSIE autosearch feature to respond to failed domain name resolution requests. Techniques for FDN processing during DNS resolution are discussed in conjunction with FIGS. 23a and 23b.

Figures 2H, 2I:
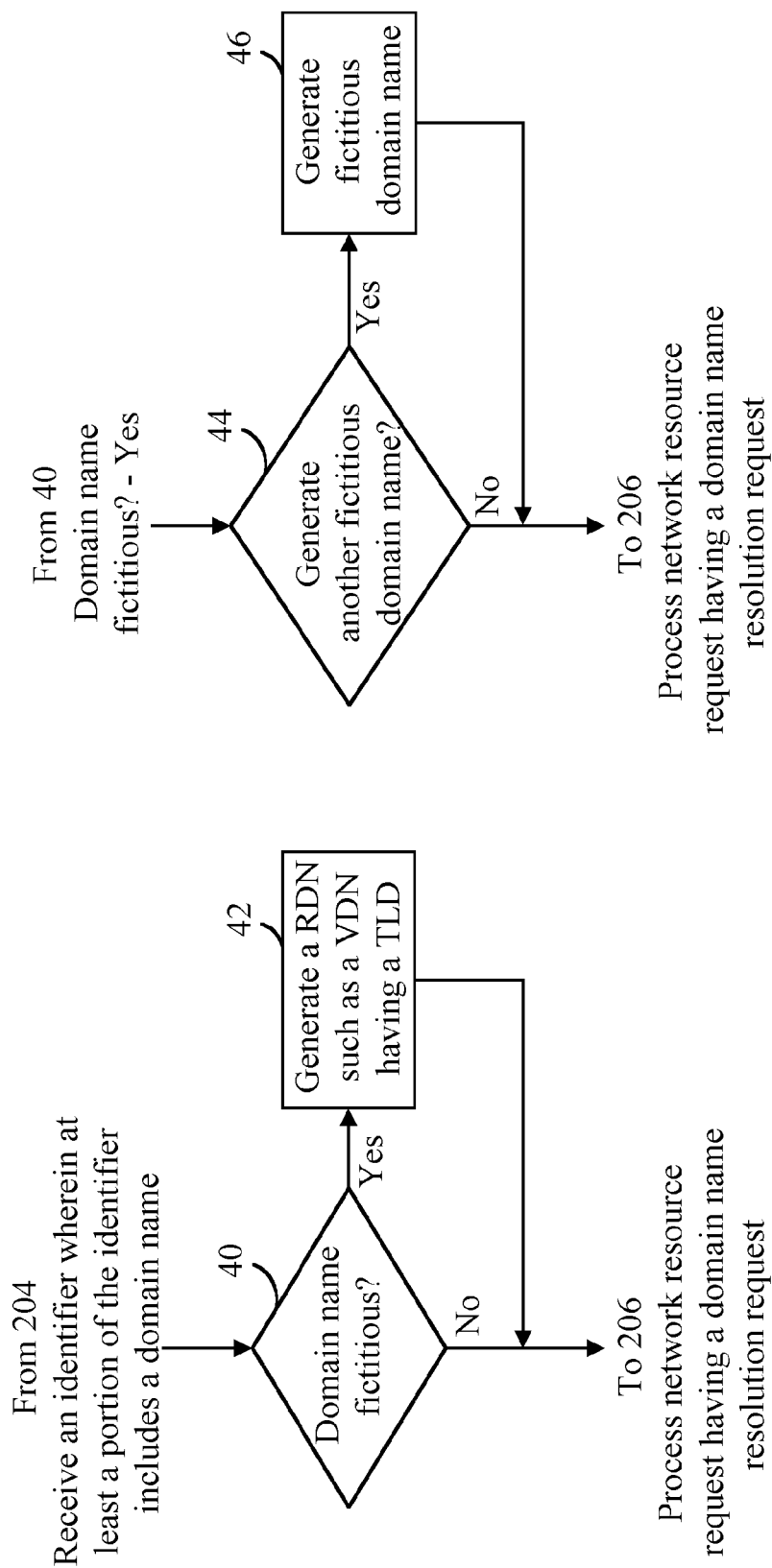
FIG. 2h is a top level flow chart illustrating the steps performed before processing a network resource request having a domain name resolution request in accordance with the present invention.
FIG. 2*i* is a top level flow chart illustrating the steps performed of processing a network resource request from a detected FDN in accordance with the present invention.

FIG. 2h is a top level flow chart illustrating the steps performed before processing a network resource request having a domain name resolution request. When an identifier having a domain name is received (step 204), it is determined in step 40 whether the domain name is fictitious. If the domain name is not fictitious, a network resource request is processed from the identifier including processing a domain name resolution request from the domain name. However, when the domain name is determined (step 40) to be fictitious then a RDN such as a VDN having a resolvable TLD is generated in step 42 and a network resource request is processed (step 206) with the RDN.

FIG. 2i is a top level flow chart illustrating the steps performed of processing a network resource request from a detected FDN. When it is determined (step 40) that the domain name is a FDN then it may be determined in step 44 whether another FDN may be generated from the previous FDN. If not, then a network resource request is processed (step 206) having the FDN. When another FDN is determined to be generated, then another FDN is generated in step 46 from the previous FDN and a network resource request is processed (step 206) with the generated FDN. For instance, multilingual domain names may be canonically equivalent to a FDN first rather than a RDN and require one or more iterations/recursions to inevitably generate a VDN having a TLD.

Figure 2J:
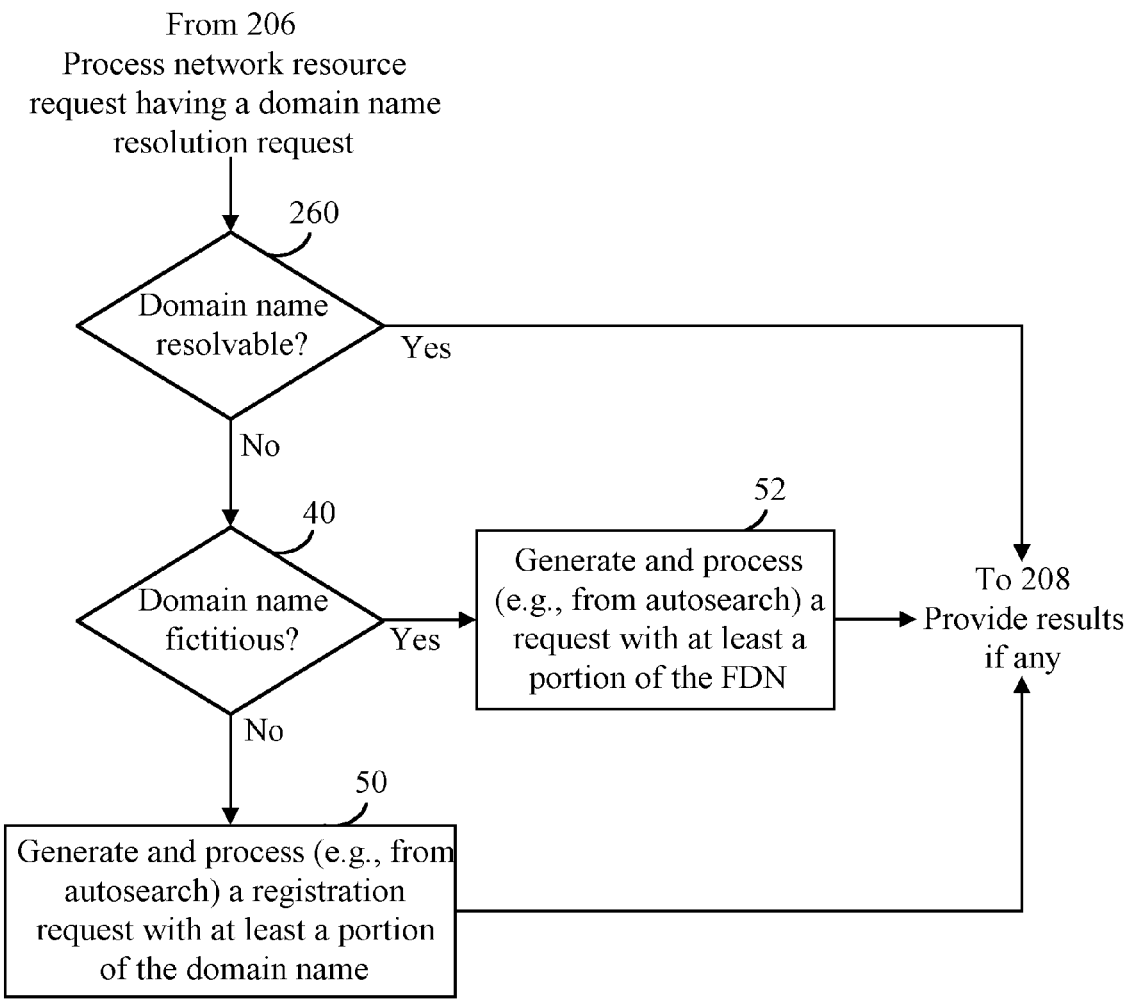
FIG. 2*j* is a top level flow chart illustrating the steps performed for processing a domain name that is determined unresolvable in accordance with the present invention.

FIG. 2j is a top level flow chart illustrating the steps performed for processing a domain name that is determined unresolvable. When it is determined in step 260 that the domain name is resolvable while processing (step 206) a network resource request from an identifier having a domain name, the request continues processing and results if any are provided in step 208. When it is determined the domain name is determined (step 260) unresolvable (e.g., can not find IP address from DNS query), then is it determined in step 40 whether the domain name is fictitious. When the domain name is determined not fictitious, a registration request with at least a portion of the identifier and/or domain name can be generated and processed in step 50. However, when a FDN is detected (step 40), a request having at least a portion of the domain name is generated and processed in step 52 such that the request is not a keyword search request or keyword resolution request. In a preferred aspect of the present invention, the generated requests (step 50, 52) can be processed from the autosearch. Results if any may then be provided from either of the processed generated requests.

Figure 3A:
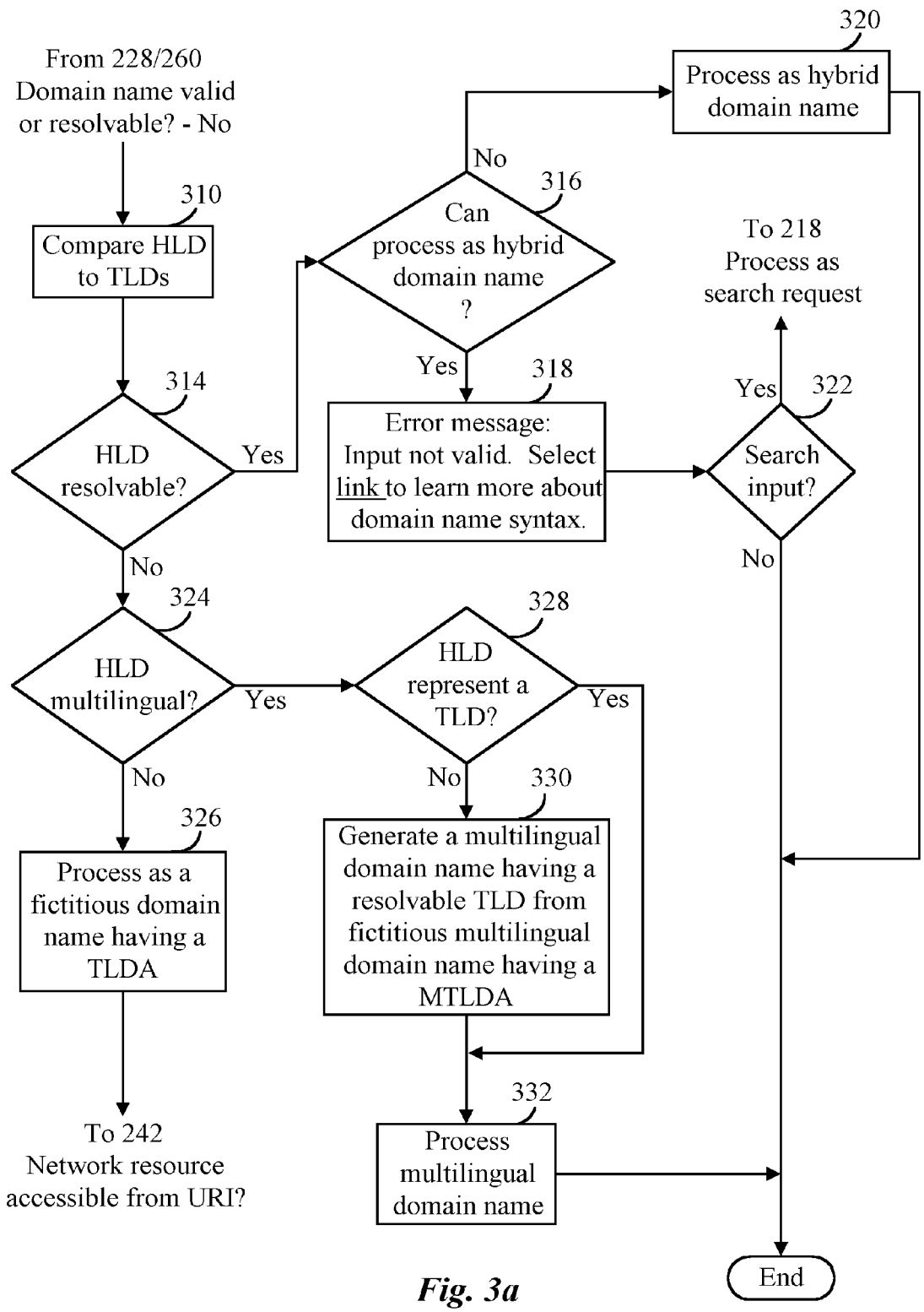
FIG. 3*a* is a top-level flowchart illustrating the steps performed for determining HLD resolvability in a preferred embodiment of the present invention.

FIG. 3a is a flow chart illustrating the steps performed for processing a network resource request from an identifier having a domain name that is determined not valid and/or unresolvable. Rather than displaying an error message in step 230 in response to input 210 having a domain name determined (step 260) to be not resolvable or (step 228) not valid (e.g., fictitious domain name), in a preferred aspect of the present invention, the HLD 280 of the domain name is compared in step 310 to a list of resolvable TLDs 156 to determine HLD 280 resolvability in step 314. The resolvable TLDs may be consulted from a client side or server side list, a peer-to-peer list, root zone file cache, the authoritative root, or from any file that is standalone or in operative association with any point on the network. HLD resolvability can be determined either before, during, or after DNS resolution. For instance, a template from autosearch can be configured to determine HLD resolvability. Furthermore, such a list of resolvable TLDs 156 may also include identifiers which represent the same list of resolvable TLDs in other character sets/languages thereby further distinguishing between a resolvable MTLD and a MTLDA.

If the HLD 280 is determined in step 314 to be resolvable, it is then determined in step 316 whether the domain name can be processed as a hybrid domain name. If so, then the domain name is a hybrid domain name and processed accordingly in step 320. However when a hybrid domain name can not be processed (step 316) then a more specific error message 318 may be displayed stating "Domain name is not valid. Select link to learn more about proper domain name syntax". Upon display, it may further be determined in step 322 whether received input 210 is processed as a search request in step 218. When this is the case, a search request is processed and results, if any, may then be presented, notified, accessed, and/or displayed in step 208.

When the HLD 280 is determined (step 314) to be not resolvable, then the HLD 280 is a TLDA. The HLD may represent another domain level other than that of a TLD. For instance, the HLD may actually represent a SLD, 3LD or 4LD, etc. It may then be further determined in step 324 whether the HLD 280 is multilingual. Any character set that includes characters other than A-Z, a-z, 0-9, and the "-" character may be considered multilingual characters. When the HLD 280 is determined to not be multilingual then it is determined that input 210 includes a non-multilingual fictitious domain name, and the FDN may be further processed in step 326. After TLDA processing in step 326, the step of URI resolvability/accessibility may be determined in step 242.

However when the HLD 280 is determined (step 324) to be multilingual, it may be further determined in step 328 whether the multilingual HLD represents a resolvable TLD in another language or character set. When the multilingual HLD represents a resolvable TLD (step 328) then it is determined that input 210 includes a MDN. If not, then it is determined that the HLD 280 is a multilingual top level domain alias (MTLDA) and it is also determined that input 210 includes a fictitious multilingual domain name (FMDN). The same teachings of processing a FDN having a TLDA (step 326) may be applied to those skilled in the art for processing a FMDN having a MTLDA. A RMDN such as a valid MDN having a resolvable TLD (or a representation of a resolvable TLD) may then be generated in step 330 from the FMDN having a MTLDA. The detected RMDN or generated RMDN may then be processed in step 334 and a RDN such as a valid domain name (VDN) having a TLD may then be generated from the RMDN and processed by the DNS for further domain name resolution.

A TLDA is a specific form of aliasing subsidiary to the broader process of Domain Aliasing (DA). Whenever a TLDA is detected, all other parsed domains and subdomains may also possibly be aliases. Each domain or subdomain may be considered a data element or component data that may function as an alias whenever a TLDA or like domain level is detected. Translation databases may be used to register and process other forms of domain aliasing (as will be discussed) in addition to TLDA processing. The same teachings of processing a FDN having a TLDA (step 326) may be applied to those skilled in the art for processing a FMDN having a MTLDA.

Figure 3B:
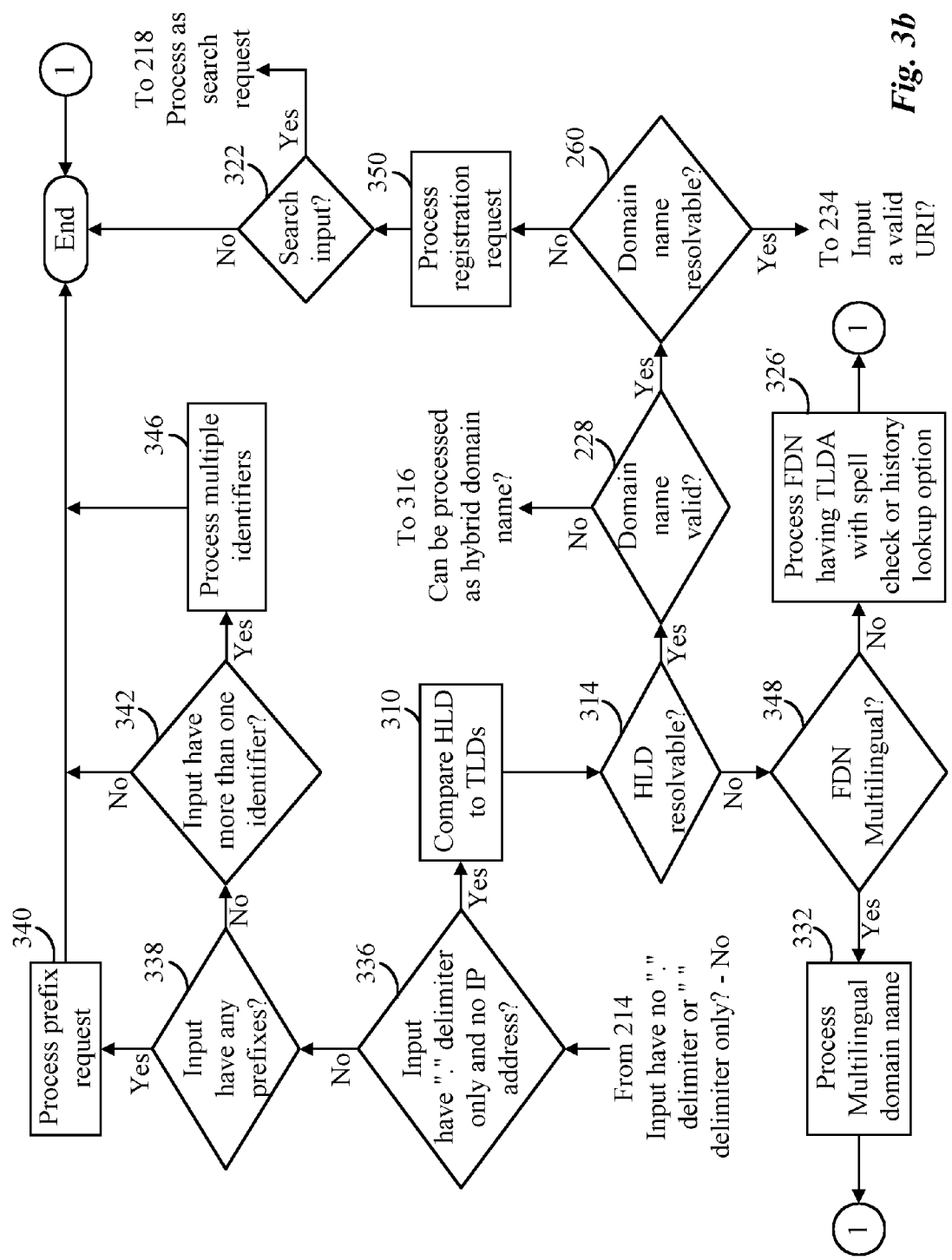
FIG. 3*b* is a flowchart illustrating the steps performed for integrating a multitude of services in response to receiving one or more resource identifiers in accordance with the present invention.

FIG. 3b is a flowchart illustrating the steps performed for integrating a multitude of services in response to receiving resource identifiers. When it is determined in step 214 that input 210 does not include no "." delimiters or "" delimiters only then it may be further determined in step 336 whether input includes 11.11 delimiters only and no IP address. If not, then it may be determined in step 338 whether input 210 includes any prefixes. When a prefix is detected while consulting a prefix database 176, then a prefix request may be processed in step 340. When it is determined (step 338) that there are no prefixes then it may be determined in step 342 whether input 210 includes more than one identifier. If so, then the plurality of identifiers may be processed in step 346.

A domain name may be considered an object having many properties or attributes, methods, and events. For instance, a domain name may be bought, sold, leased, escrowed, transferred, edited, auctioned, listed, locked, trademarked, dialed, e-mailed, registered, back-ordered, and resolved or the like. A domain name may be considered a global network identifier and such properties/attributes and/or methods may be considered a request type (e.g., prefix request) or can have yet further uses as stored metadata. All such attributes may be used as prefixes for determining how a domain name is processed during any request type. Steps for processing prefixes and/or a plurality of identifiers is explained in U.S. patent application Ser. No. 09/598,134 filed Jun. 21, 2000, by Schneider, entitled "Method and apparatus for integrating resolution services, registration services, and search services". Prefixes (e.g., prefix database 176) may include functions such as edit, handle, list, status, history, watch, renew, transfer, escrow, consolidate, auction, bid, value, buy, sell, lease, generate, who is, expire, registrar, tools, redirect, lock, email, webhost, incorporate, trademark, geo, and/or dial. An additional prefix may include a back-ordering function to compete for registering a domain name when it becomes available.

When it is determined in step 336 that input 210 includes "." delimiters only and no IP address then the HLD is compared in step 310 to a list of resolvable TLDs or TLD cache 156 to determine HLD resolvability in step 314. When the HLD is determined in step 314 to be not resolvable, then the HLD is a TLDA, the domain name is a FDN, and it may be further determined in step 348 whether the FDN is a real multilingual domain name RMDN. If so, then input 210 may be processed in step 332 as a RMDN. Whenever a TLDA is detected, the domain name is determined fictitious and the step of consulting a registry 152, spell checker 174, and/or input generator 170, input history 178 may be employed to assist with identifier generation/selection and data request processing in general.

MDN/IDN processing is explained, for example, when accessing IETF Internationalized Domain Name Internet Drafts from the URL: "http://www.ietf.org/ids.by.wg/idn.html". For instance, IDN input is prepared for encoding by performing mapping, normalizing, and excluding procedures. Encoding may be processed in formats such as Differential Unicode Domain Encoding (DUDE), which provides a simple and efficient ASCII-Compatible Encoding (ACE) of Unicode for use with IDNs, for example. Teachings from such standards and protocols may be readily applied in accordance with the present invention by those of ordinary skill in the art.

When no MDN is detected, then input 210 is further processed in step 326' as a FDN with the option of employing spell check 174 or input/generator history 178 lookup. If the HLD is determined (step 334) to be resolvable, then it may be determined in step 228 whether the domain name is valid. When it is determined (step 228) that the detected domain name is not valid then it is determined in step 316 whether the domain name can be processed as a hybrid domain name. However, when it is determined (step 228) that the detected domain name is valid, then it may be determined in step 260 whether the domain name is resolvable (discussed in conjunction with FIG. 2c). When the detected valid domain name is resolvable, it may then be further determined in step 234 whether input 210 includes a valid URI, etc. However, when the detected domain name is determined (step 260) to be not resolvable, then the domain name may be processed in step 350 as a registration request. After processing a registration request it may be further determined in step 322 whether received input 210 is processed as a search request in step 218.

Figure 3C:
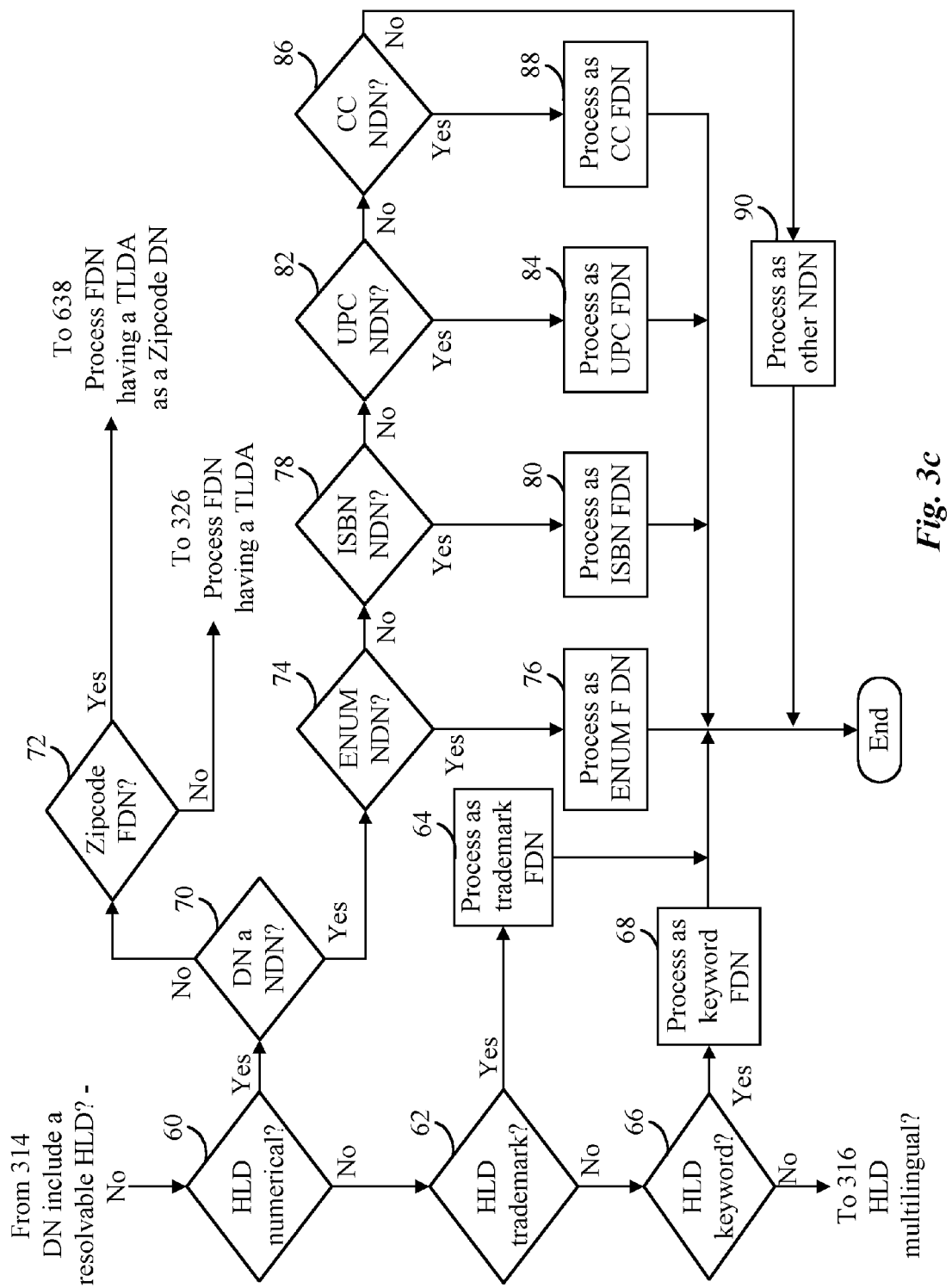
FIG. 3*c* is a flowchart illustrating the steps performed for processing different TLDAs in accordance with the present invention.

FIG. 3c is a flowchart illustrating the steps performed for processing different TLDAs in a preferred embodiment of the present invention. When it is determined that a domain name having a HLD is unresolvable (step 314), it is determined in step 60 whether the HLD is numerical. When the HLD is not numerical it is then determined in step 62 whether the HLD is related to a trademark, brand, service and the like. If so, then the domain name is processed in step 64 as a trademark FDN. For example, a branded SLDA, TLDA, MTLDA and the like may be used to represent a trademarked good/service such as "toyota.celica" or "celica.toyota". Some techniques for resolving trademark FDNs are shown later. When the HLD is not related to a trademark, brand, service and the like, it is determined in step 66 whether the HLD is a keyword, if so then the domain name is processed in step 68 as a keyword FDN. For instance, a keyword SLDA, TLDA, MTLDA, and the like may be used as a search request or in some similar manner. Techniques for resolving keyword FDNs are shown later. When the HLD is not related to a keyword, it is further determined in step 316 whether the HLD is multilingual.

When the HLD is determined numerical in step 60 then it is further determined in step 70 whether the domain name is a numerical domain name (NDN). When the domain name is not a NDN then it can be determined in step 72 whether the domain name is a zipcode domain name. If so, a FDN having a TLDA is processed in step 638 as a zipcode domain name (discussed in conjunction with FIG. 6). If the domain name is not a zipcode domain name then the domain name is processed in step 326 as a FDN having a TLDA.

When the domain name is determined in step 70 to be a NDN, then it can further be determined in step 74 whether the NDN is an ENUM FDN. If so, the NDN is processed in step 76 as an ENUM domain name. When an ENUM domain name is not detected, it can be determined in step 78 whether the NDN is an ISBN domain name. If so, the NDN is processed in step 80 as an ISBN domain name. When an ISBN domain name is not detected, it can be determined in step 82 whether the NDN is an UPC domain name. If so, the NDN is processed in step 84 as a UPC domain name. When a UPC domain name is not detected, it can be determined in step 86 whether the NDN is a credit card (CC) domain name. If so, the NDN is processed in step 88 as a credit card domain name. When a credit card domain name is not detected, the domain name can be processed in step 90 for other NDN types.

For example an ISBN autosearch template can be constructed to parse an ISBN number from the ISBN NDN and construct a URI. A network resource corresponding to the constructed URI may provide a vertical marketplace of competing booksellers that provide value added services corresponding to the detected ISBN material. Templates similar to the ISBN template may be constructed for each NDN type. For instance a UPC template may be constructed to parse the UPC from the UPC NDN and construct a URI. A network resource corresponding to the constructed URI may provide a vertical marketplace for vendors to compete for providing value added services corresponding to the detected UPC good/service.

In effect, when a network navigation device having a search function can not successfully access a network resource corresponding to an identifier, it may be determined that the identifier has attributes in addition to navigating and searching such as e-commerce. The search function of the network navigation device can be adapted to perform an e-commerce request in response to such detected identifiers. In another example, ENUM NDN can be modified to include an account number for pre-paid calling cards and the like by so doing, pre-paid calls can be made from the navigation device via a telephone connection request.

Though the E.164 identifier holds great promise, the expression of the identifier is based on an international standard that may be awkward and unintuitive for quick adaptation by the public. Similar identifiers that represent ENUM may be adapted by the public more readily. There has been increasing evidence in recent years of a quicker way to informally express a phone number in a syntax similar to an IP address such as the ENUM FDN "216.555.1212", for example. The search function of a network navigation device such as the autosearch feature can be configured to detect the ENUM FDN either before and/or after DNS resolution. For instance, the FDN "1.216.555.1212" can be received as input and translated into its corresponding ENUM domain name without requiring changes to the DNS or a client device. Furthermore, a default local area code can be configured in the general features 745 of configuration settings to help further simplify the use of ENUM in a network navigation device such as MSIE. When the default area code is set to "216" and the ENUM FDN "555.1212" has been received the resulting real domain name 12.1.2.1.5.5.5.6.1.2.1.e164.arpa" can be constructed by combining the local area code with the ENUM FDN identifier.

Though ISBN, ENUM, UPC and like NDN identifiers are discussed, the autosearch has never been adapted to perform these request types with actual ISBN, UPC, and ENUM identifiers before DNS resolution. For instance, in a search function such as the autosearch, a autosearch template may be configured to process different namespaces either before and/or after DNS resolution. When a E.164 number such as "+1-216-555-1212" is provided, an ENUM namespace autosearch template can be accessed before or instead of a DNS resolution request. Such a template is configured to transform the input into "164.arpa" related domain name. Similar templates can be constructed for other numeric identifiers such as ISBN, UPC, credit card, etc. as discussed above.

Figure 3D:
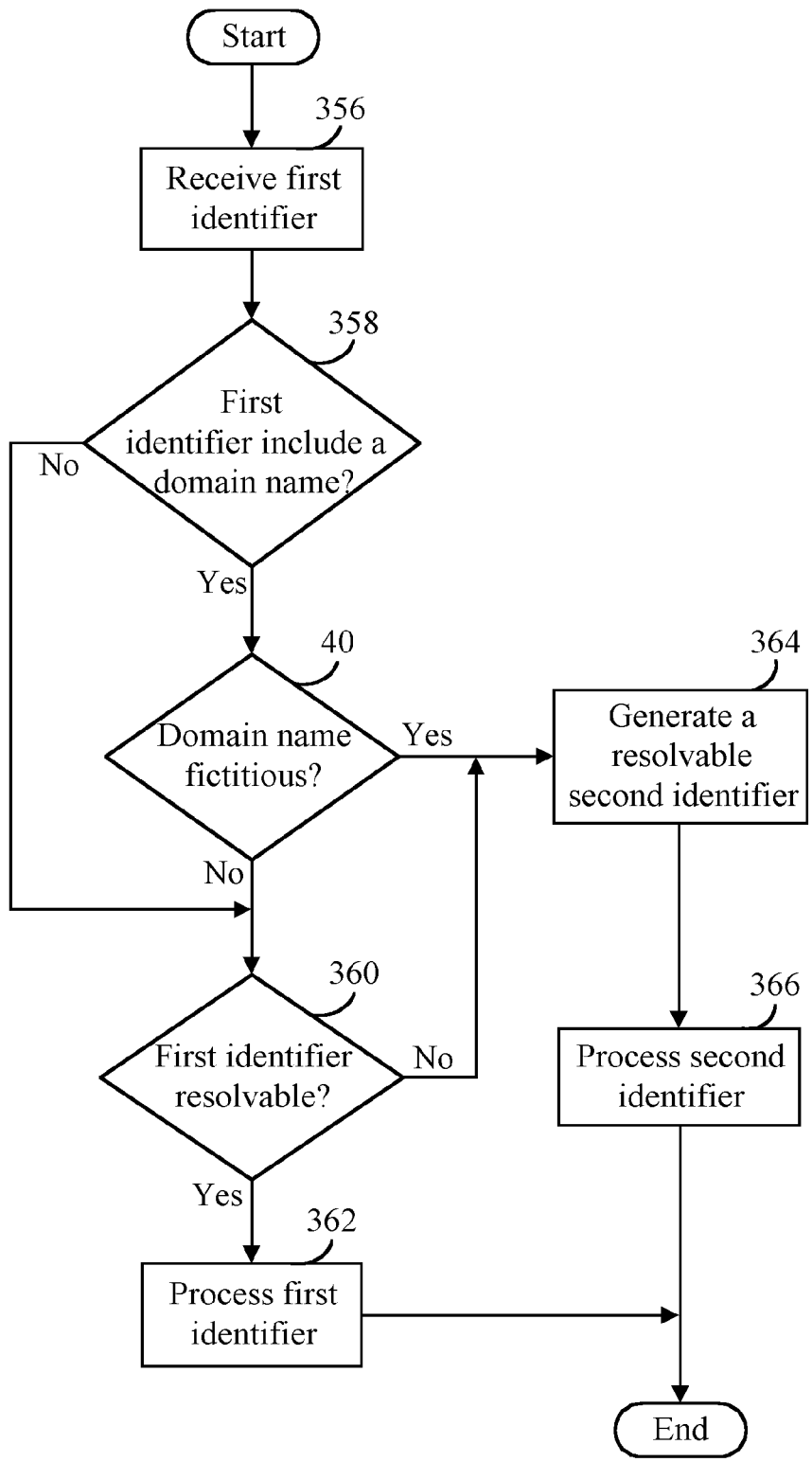
FIG. 3*d* is a top-level flowchart illustrating the steps performed for resolving a received identifier in accordance with the present invention.

FIG. 3d is a top-level flowchart illustrating the steps performed for resolving a received identifier. When a first identifier is received in step 356, it is determined in step 358 whether the first identifier includes a domain name. When the first identifier includes a domain name, it may then be determined in step 40 whether the domain name is fictitious. If the first identifier does not include a domain name (step 358) or the domain name is not fictitious (step 40) then it may be further determined in step 360 whether the first identifier is resolvable. If so, then the first identifier may be processed in step 362. However, when the domain name is fictitious (step 40) or when the first identifier is not resolvable (step 360) then a resolvable second identifier may be generated in step 364. The generated second identifier may then be processed in step 366.

Figure 3E:
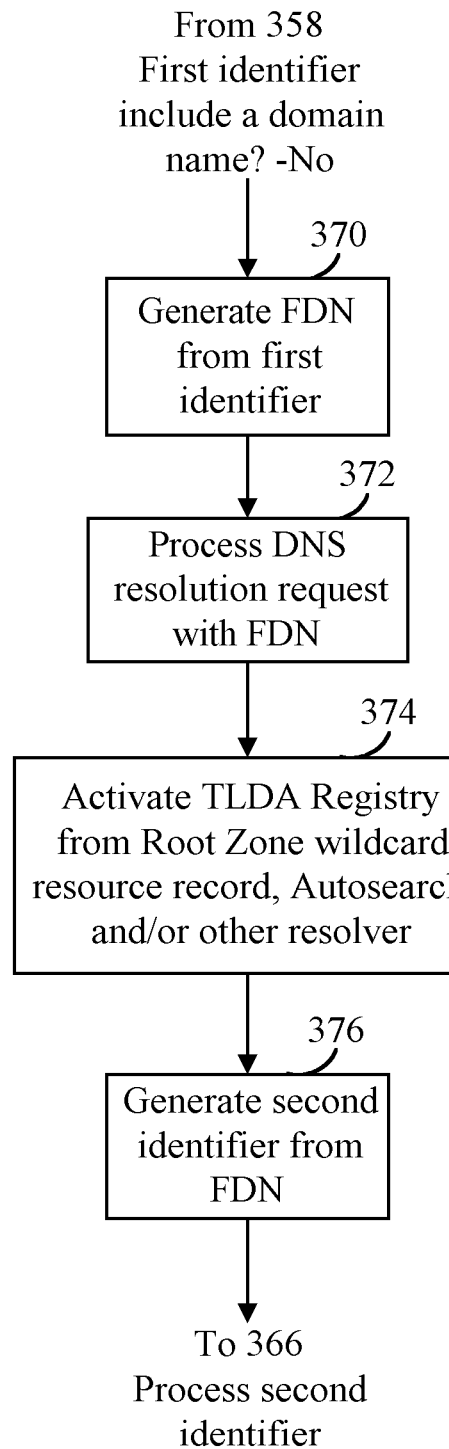
FIG. 3*e* is a top level flowchart illustrating the steps performed for processing an identifier that does not include a domain name in accordance with the present invention.

FIG. 3e is a top level flowchart illustrating the steps performed for processing identifiers that does not include a domain name. In an aspect of the present invention, identifiers in non-DNS naming systems may use either FDNs and/or the DNS to access network resources or construct other identifiers such as a FDN, RDN, and the same or other non-DNS naming systems. When it is determined (step 358) that a first identifier does not include a domain name, a FDN can be generated in step 370 from the first identifier. A DNS resolution request having the FDN may be processed in step 372. A TLDA registry may then be accessed from either a root zone wildcard resource record (discussed in conjunction with FIG. 23*a* and FIG. 23*b*) and/or from an autosearch in step 374 (including redirection from any other namespace and/or identifier resolver 168). A second identifier may then be generated in step 376 from the FDN and then processed (step 366).

Figure 3F:
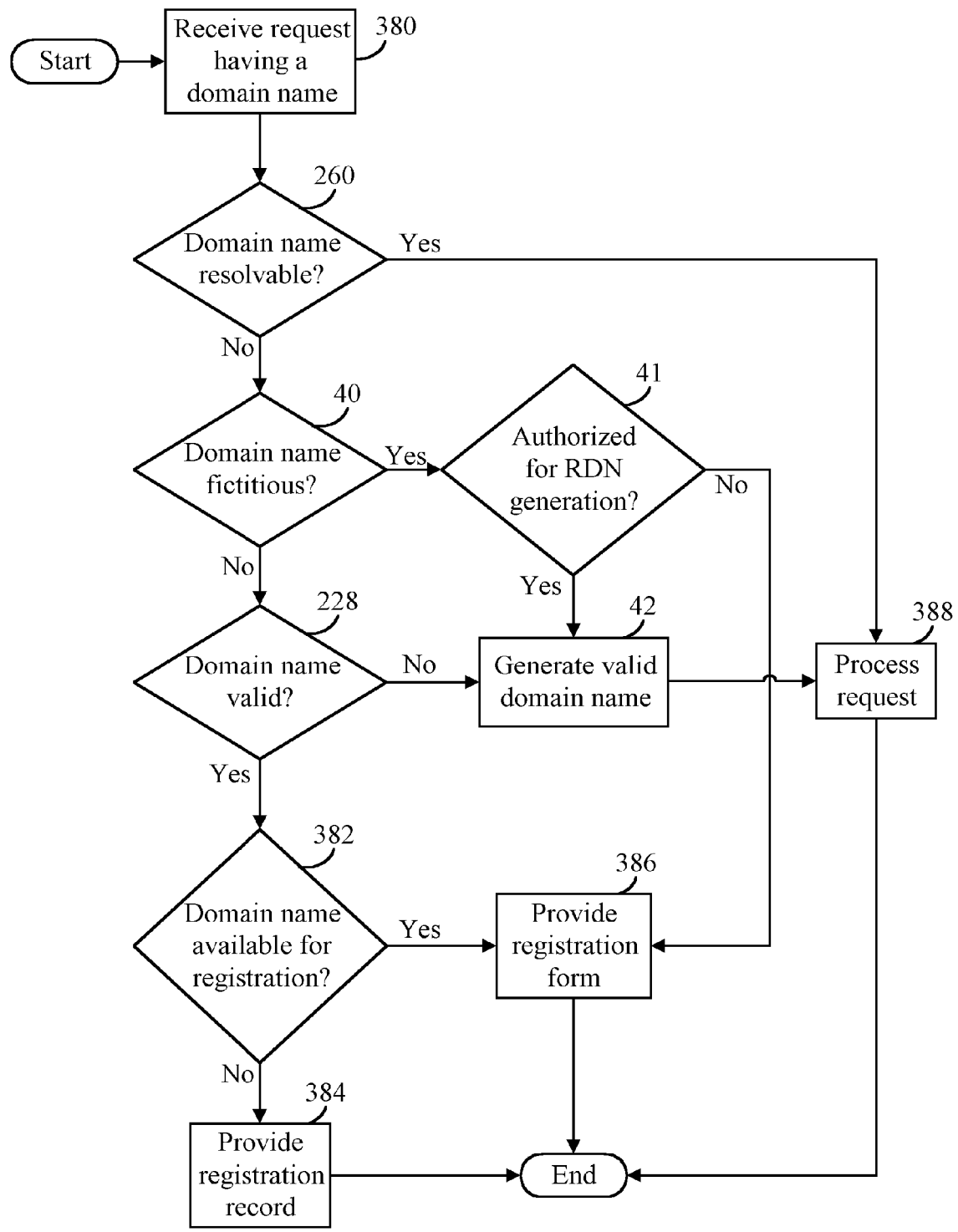
FIG. 3*f* is a top level flowchart illustrating the steps performed for processing a request having a domain name in accordance with the present invention.

FIG. 3f is a top level flowchart illustrating the steps performed for processing a request having a domain name. When a request having a domain name is received in step 380 it determined whether the domain name is resolvable (step 260). When the domain name is determined not resolvable, it is determined in step 40 whether the domain name is fictitious. When the domain name is a FDN it is then determined in step 41 whether the FDN is authorized for RDN generation. When the domain name is determined to be not fictitious, it is determined in step 228 whether the domain name is valid. When the domain name is determined not valid or when it is determined (step 41) that the FDN is authorized for RDN generation, a real domain name can be generated in step 42. After a RDN is generated or when the domain name is determined (step 260) resolvable, the received request (step 380) can be processed in step 388.

However when it is determined in step 228 that the domain is valid, it is determined in step 382 whether the domain name is available for registration. When the domain name is determined (step 382) not available for registration a registration record is provided in step 384 such as a record from a corresponding WHOIS database. However, when the domain name is determined available or when FDN is not authorized for RDN generation (step 41), then such information is presented accordingly, and a registration form is provided in step 386 prompting the user to register the domain name. Specification of the WHOIS protocol is provided in K. Harrenstien, M. Stahl, and E. Feinler, "Informational RFC (Request for Comment) 954: NICNAME/WHOIS".

Furthermore, additional identifiers across multiple naming systems can be (not shown) contemporaneously generated by an identifier generator 170 that can be associated to at least a portion of the domain name and determined whether such generated identifiers are available for registration. As discussed in U.S. patent application Ser. No. 09/682,133 filed Jul. 25, 2001, by Schneider, entitled "Method, product, and apparatus for requesting a network resource", an identifier generation 170 and registration form 172 template may be retrieved for the purpose of generating several identifiers across several naming systems. A registration form 172 may be provided in response to determining the availability of registration for all such generated identifiers.

To date, the autosearch feature has been used to further process search requests only and has not been used in conjunction with processing any other request type. When an autosearch is activated in response to a request having an identifier, at least one request is constructed and processed having at least a portion of the identifier wherein the request is any request other than that of a keyword search request or keyword resolution request. Some request types may include a command request, non-keyword resolution request, non-keyword search request, redirection request, identifier registration request, e-commerce request, back-order request, subscription request, navigation request, dialing request, messaging request, conferencing request, vendor request, service request, login request, status request, authorization request, reference request, etc.

Figure 4A:
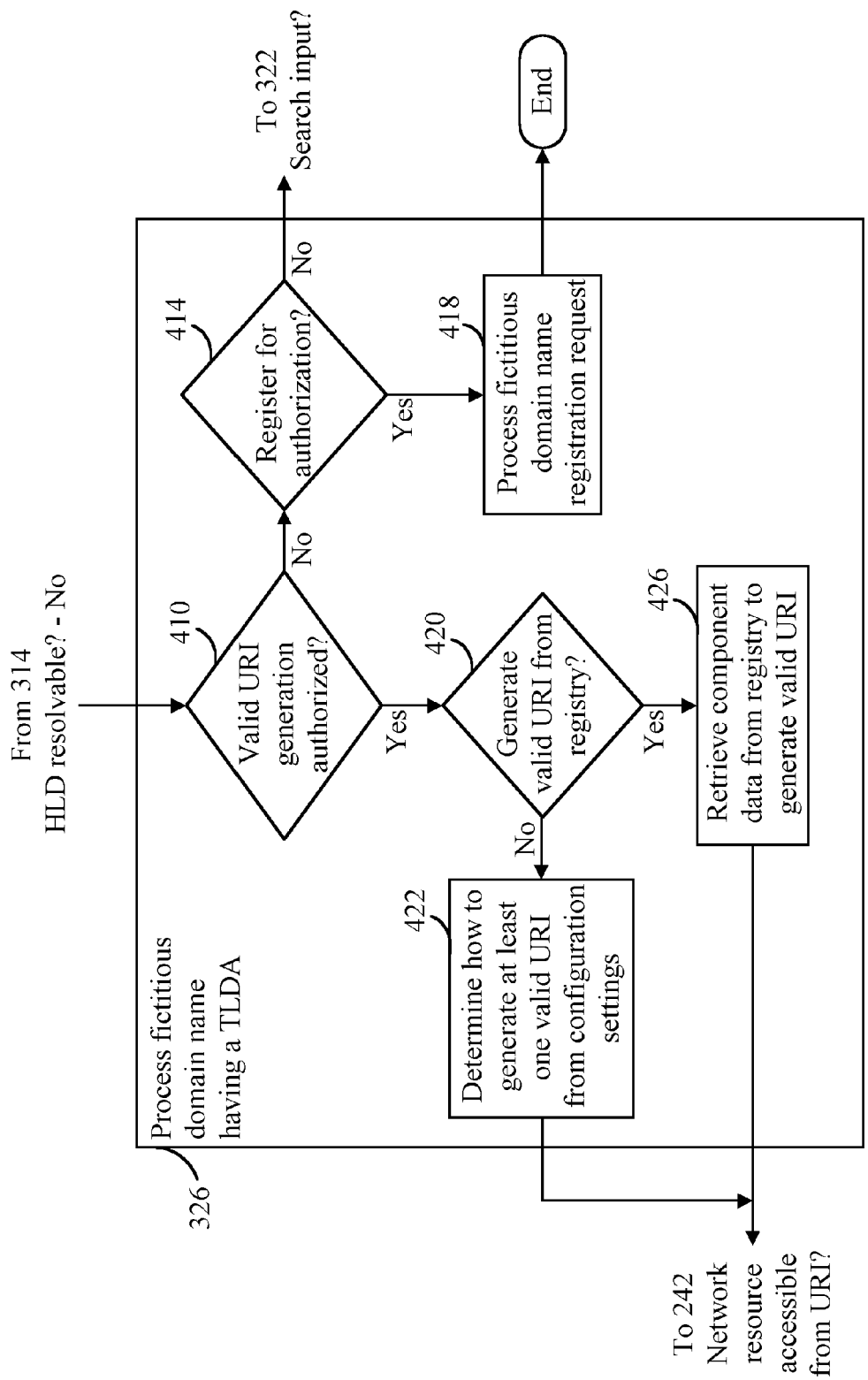
FIG. 4*a* is a flowchart illustrating the steps performed for processing a fictitious domain name having a TLDA in accordance with the present invention.

Referring now to FIG. 4a, specific steps for processing a fictitious domain name having a TLDA are shown (step 326). First, it is determined in step 410 whether valid URI generation is authorized (authorization techniques will be discussed in conjunction with FIG. 4b) in response to receiving the FDN having a TLDA. When it is determined in step 410 that there is no authorization for URI generation, it may then be determined in step 414 whether a user may register the FDN for authorization (registration techniques will be discussed in conjunction with FIG. 17). When it is determined in step 414 that no registration for authorization is requested, it may be further determined in step 322 whether received input 210 is processed as a search request in step 218. When this is the case, a search request may be constructed from the identifier (e.g., domain name) and processed in step 218 and results if any, are then presented in step 208. However, when registration for authorization is requested in step 414, the FDN may then be processed in step 418 as a registration request.

Figure 7:
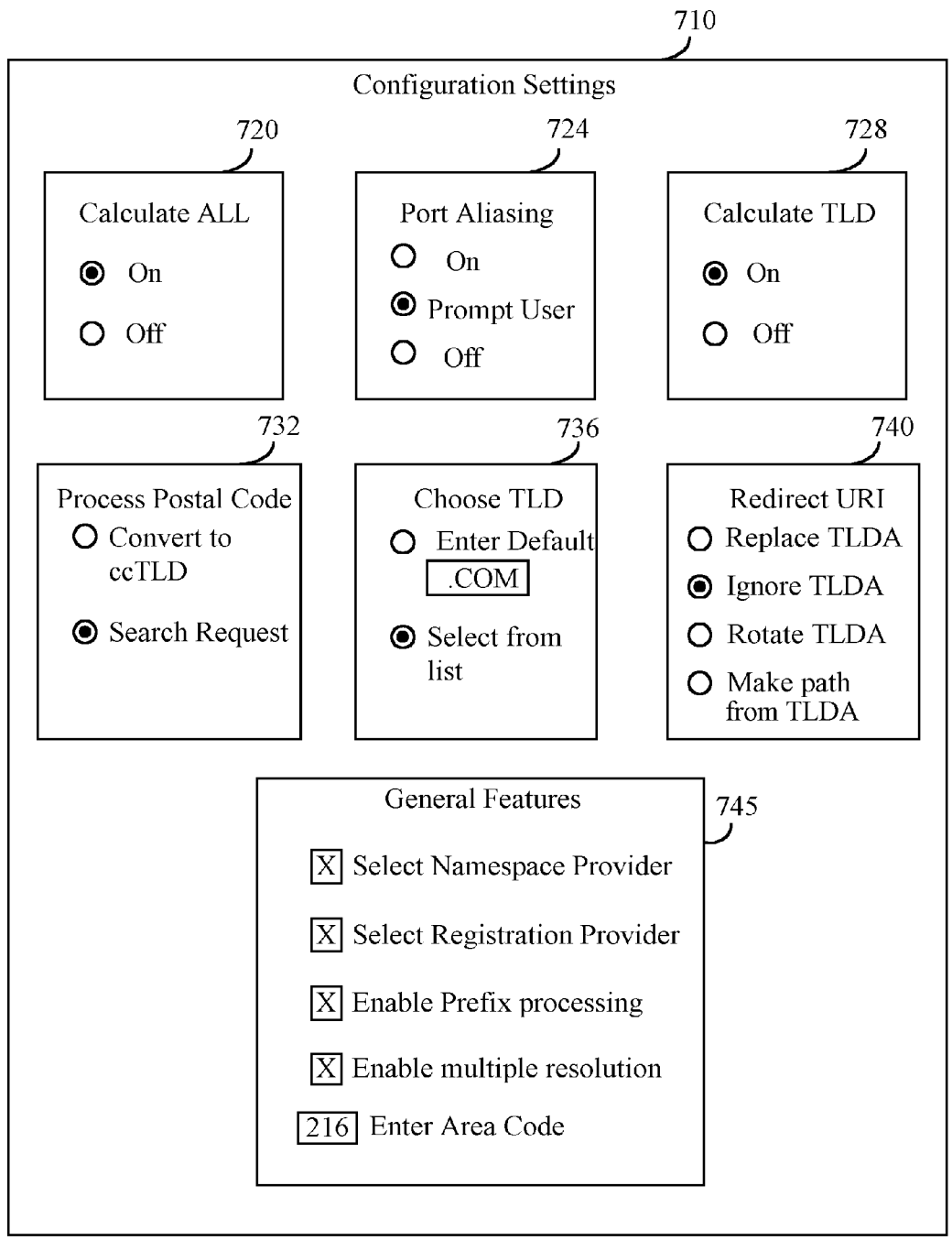
FIG. 7 is a diagram depicting an exemplary configuration settings interface in accordance with the present invention.

When it is determined in step 410 that there is authorization for URI generation, it may further be determined in step 420 whether a valid URI having a TLD is generated by accessing a registry 154 (discussed in conjunction with FIG. 14) or accessing configuration settings 710 (discussed in conjunction with FIG. 7). When it is determined in step 420 that the registry 154 is accessed, then registry component data may be retrieved in step 426 to generate a valid URI having a resolvable TLD. However, when it is determined in step 420 that configuration settings 710 are accessed, then configuration settings may be retrieved to determine how to generate at least one valid URI in step 422. After processing (step 422 or step 426), the step of network resource accessibility from the generated URI may be determined in step 242. The same teachings of URI generation (step 422 and step 426) may be applied to those skilled in the art for generating (step 330) a real MDN having a resolvable TLD from a fictitious MDN having a MTLDA.

Figures 4B, 4C:
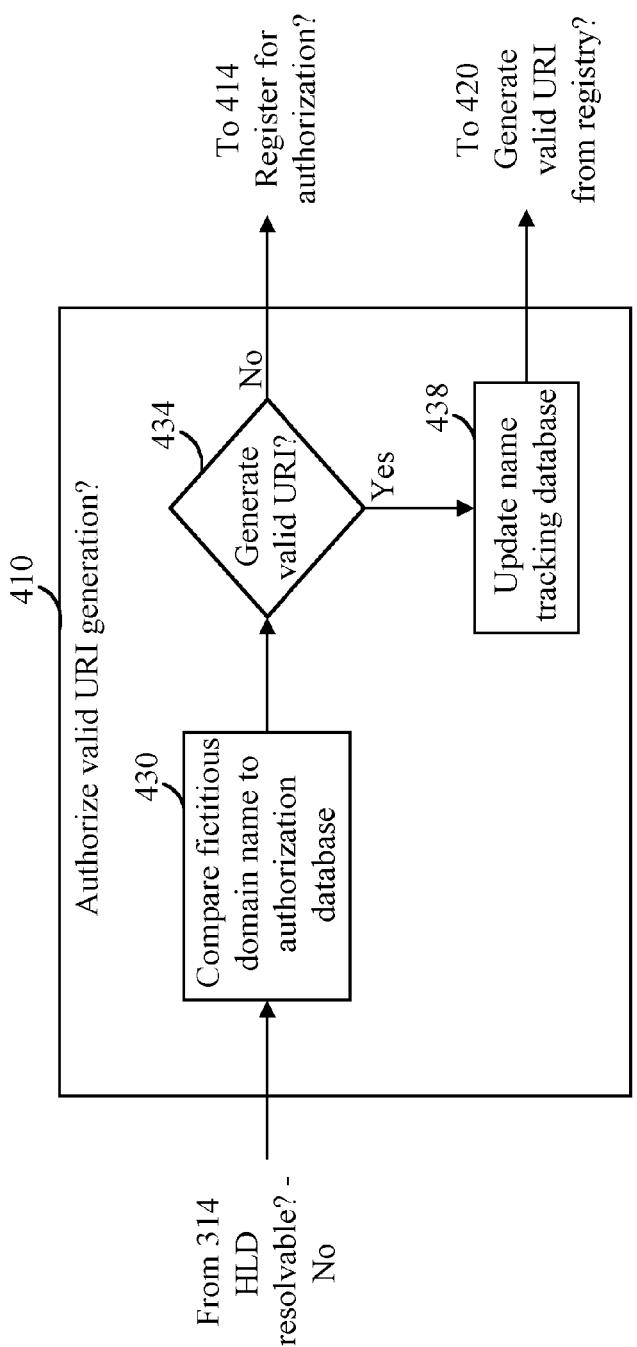
FIG. 4*b* is a flowchart illustrating the steps performed for determining authorization of URI generation in accordance with the present invention.
FIG. 4*c* presents an exemplary table in accordance with the present invention illustrating a simplified data structure for name tracking information.

Turning now to FIG. 4b, specific steps for determining authorization for URI generation are shown (step 410). The fictitious domain name may be compared in step 430 to an authorization database 150. An authorization database 150 can be constructed with as little as one data field having a list or data records of all registered fictitious domain names that are authorized. The authorization database 150 can function as a "GO L1ST" to determine for the presence of the requested fictitious domain name. When a fictitious domain name is found in the "GO L1ST" then URI generation is authorized. The authorization database 150 may be combined with other databases such as translation databases 152, tracking databases 160, or the registry 154. Such databases will be discussed in more detail throughout this disclosure. When there is no match in step 430, then a URI is not generated and determination of registration may be resumed in step 414. However, when there is a match in step 430, then a URI is generated in step 434 and a name tracking database 160 is updated in step 438. After the name tracking database 160 update, step 420 may be resumed to determine how to generate at least one valid URI having a resolvable TLD. URIs can be generated in operative association with an identifier generator 170.

FIG. 4c illustrates a simplified data structure of the name tracking database 160. The name tracking database 160 may be updated in step 438 with information such as name, IP address, date/time, and number of hits. The invention may also be configured by those skilled in the art to update the name tracking database 160 when input history is updated in step 212.

There are numerous methods as will be discussed throughout the present invention for generating a valid URI having a RDN, from input having a FDN. In most cases, a selected resolvable TLD is combined with a fictitious domain name having a TLDA or a portion thereof. For instance, the method of recursive truncation (discussed in conjunction with FIG. 12) may be used to generate the valid URI, "http://united.st" from the input "united.states" where ".states" is a TLDA and ".st" (the truncation of ".states") is a resolvable ccTLD (abbreviation for the country Sao Tome and Principe).

To generate a new URI, the parsed components (as illustrated in FIG. 2b) may be concatenated with a resolvable TLD. For example a fictitious URI (FUR1) such as "http://united.states" is parsed, where "http" is the scheme 266, there is no path 269 or port 274, the hostname 282 is "united", and the HLD 280 is "states". The HLD is determined in step 310 to be a TLDA, which is then modified by recursive truncation to yield the resolvable TLD "st". The parsed components; scheme 262, hostname 282, and TLD may then be concatenated with the "." delimiter to generate in step 422 a new URI"http://united.st". Another example, "http://united.stores"would also yield "http://united.st". Truncation enables a correspondence between abbreviations and names or words. This method yields know-how for new and creative purchasing strategies of domain names from countries around the globe.

When a fictitious telephone number such as '1-800-AUTOMOBILE' is advertised and a telephone used as a means to contact the advertiser, the telephone will connect the call when the caller 'dials' 1-800-AUTOMOB regardless whether the caller has finished dialing the word AUTOMOBILE. Until now, there is no such method, device, or system to allow for the interpretation of fictitious URIs or domain names to be used as indicia in a similar manner. Recursive truncation becomes an inventive step to allow the location field 134 of a web browser 112 or command line of a device to function in the analogous manner of 'dialing' a telephone.

Though "" and united.states"united.stores" etc. may be resolved as "http://united.st" there are other methods of URI generation to create uniqueness from the use of a TLDA. For instance, the parsed components; scheme, TLDA, hostname, and TLD may be concatenated to generate "http://states.united.st" or "http://stores.united.st" etc. By rotating the TLDA from the HLD to the lowest level domain (LLD) uniqueness can be mapped. Other methods of concatenation may be used by those skilled in the art of string manipulation to generate URIs such as "http://united.st/states" or "http://united.st/ ates" to provide an infinite one-to-one mapping between a TLDA and a resolvable URI. Though a plurality of URIs may be generated, the URIs generally have in common the same SLD which is assigned to a unique entity such as a corporation or individual. Therefore the domain name holder of "united.st" may use redundancy to create uniqueness regardless of which generated URI is used. For instance, "http://united.st", "http://states.united.st", "http://united.st/ates" etc. may all be redirected to another URI such as "http://www.anywhere.com" to create a unique destination for the fictitious domain name "united.states". Since generated URIs are calculated from fictitious domain names this invention does not have to rely upon any kind of database or registry to make such conversion from fictitious domain name to valid URI.

Another example is the resolution of a numerical TLDA. For instance, an entity who has registered the domain name "212.com" may create subdomains to yield domain names such as "555.1212.com" or "800.555.1212.com". By so doing, the entity may lease out server space to subscribers who would like to associate their telephone number with a URI. There are roughly 200 area codes in the U.S., within each area code on average are about 10 prefixes which yields a targeted marketing list for an entity to call 2,000 telephone numbers to offer such services. Now consider received input such as the NDN "1.800.555.1212". The input is parsed and it is determined that "1212" is a TLDA which is then rotated and replaced with a default TLD yielding "212.1.800.555.com". Under this new system, an entity who has registered the domain name "555.com" can in effect yield a targeted marketing list of 10,000 numbers per area code for the entity to call 2,000,000 telephone numbers to offer such services. The use of TLDA rotation yields a shorter input creating a larger market group by a factor of 1,000.

A URI as a data structure has within it the concatenation of two separate name spaces. The first is the DNS which represents a hierarchical string of domains separated by the "." delimiter which is read from right to left. The second is a path which represents a hierarchical string of directories separated by the "/" delimiter which is read from left to right (e.g., http://third.second.first.com/first/second/third/file.html). The "." is not a delimiter in the directory path name space but rather functions as a valid label character. For instance, "http://example.company" does not include a RDN making a network resource corresponding to the URI in accessible, but "http://example.com/example.company/index.htm" is a valid URI. This fact enables further utilization of TLDA redirection. Input determined to have a TLDA, may all be redirected to the same domain name/web server.

When input is of the form "SLD.TLDA", a new domain name may be generated by adding a predetermined or registered RDN to yield results, for example, in the form of "SLD.TLDA.RDN", "RDN/SLD.TLDA", "RDN/TLDA/SLD", and "RDN/SLD/TLDA". For instance, "top.stories" may be redirected to "http://tlda.com/top.stories/index.htm" (of the form "RDN/SLD.TLDA") which may be further redirected to "http://stories.top.com/index.htm" which may yet be further redirected to a final destination of "http://anywhere.com". By centralizing all TLDA requests to the same domain name/web server assures that the tracking of all TLDA redirection activity is logged and accounted for, particularly when it pertains to the distribution of revenues to all parties involved. Another example of centralizing all TLDA requests to the same domain name is by redirecting "top.stories" to "http://top.stories.tlda.com" (of the form "SLD.TLDA.RDN") or "http://tlda.com/stories/top" (of the form "RDN/TLDA/SLD").

With the exception of the DNS, most naming systems are interpreted from left to right. A telephone number, a zip code, an IP address, an odometer, and a directory path to name a few, are all data structures that represent descending levels of hierarchy. Trademarks can be considered a hierarchical system that is interpreted from left to right. Trademarks are used to identify a specific brand of product or service. The first part of the name specifies a particular company's version of a product or service. The second part of the name specifies the kind of product or service (e.g., AMAZON Books, KINKO'S Copies, BAYER Aspirin, IVORY soap etc.).

The domain name holder of "example.com" may further differentiate products and services at the "example.com" web site. For instance, "news at the "example.com" web site may be published at the URI "http://example.com/news" or published at the URI "http://news.example.com". In the latter, the web browser accesses a subdomain called "news" from the web server, "example.com". The subdomain "news" may be another server that is connected to and can only be accessed through "example.com". In general, most categories, products, and services have been independently coordinated from computer to computer in a similar manner, but yet it remains non-intuitive for a user to navigate directly to such a desired product or service. Typically, a user will first access the "example.com" web site and then click on a hyperlink called "news" requiring the user to take two steps to obtain desired results.

Advantage can be taken of the reverse hierarchy of the DNS to create a correspondence or mapping between trademarks and domain names. A RDN may take the form of "SLD.TLD" such as "yahoo.com". From prior examples it is shown that the FDN of the form "SLD.TLDA" such as "yahoo.mail" (has 10 characters) is generated from the RDN of the form "TLDA.SLD.TLD" such as "mail.yahoo.com" (has 14 characters). This is the web address for accessing YAHOO mail. By using (as a trademark) the FDN "yahoo.mail" instead, a user can intuitively navigate (to a specific part of a web site) directly to a desired (result) product or service in one step (rather than two steps), while inputting 4 less characters. By using this system, companies that have invested in branding their ".com" identity can now advertise, for example, indicia such as "microsoft.office" (as a trademark), in addition to, "microsoft.com" for name branding, product differentiation, and helping customers streamline access to information.

Because FDNs are not web addresses but rather fictitious indicia, unlike RDNs, FDNs may be trademarked enabling a method for potentially increasing the registration of trademarks. For example, individuals and organizations may register a trade or service mark on a state, federal, or country level in the form of SLD.TLDA to gain first use rights of a FDN. Due to the emergence of WAP (wireless application protocol), FDNs (as trademarks) will become increasingly useful to the portable wireless device market. Users of handheld network access devices (e.g., palm pilot, phone browser, pager, etc.) will benefit by entering less input while navigating information more precisely in less steps.

Now consider a company that owns the trademark AMAZON Bread. Amazon.com is in the book business and not the bread business. Opportunity arises for both companies to cooperate. AMAZON Bread can pay licensing fees to AMAZON Books in exchange for web space at URI "http://bread.amazon.com/index.htm" or by redirecting this URI to a destination operated by AMAZON Bread such as "http://amazonbread.net". With over twenty million ".com"

registrations, it in effect creates the possibility for unlikely parties to exchange commerce through licensing or partnering.

There is yet another method of URI generation to consider. Take the "SLD.TLDA", "top.stories" and calculate from it a domain name to yield the form of "SLD.TLDA.TLD", "top.stories.com". An issue is created with respect to the TLDA rotation method, which yields "stories.top.com". Both URI generation methods allow for the domain name holders of "top.com" and "stories.com" to form a cooperation by using both "stories.top.com" and "top.stories.com" to redirect to the same web address. By so doing, uniqueness of resolution is assured adding value to all parties involved.

Currently, when a word such as "top" is entered in the location field 134 of any web browser, the absence of a TLD is detected by the browser and a default TLD is concatenated to yield "http://top.com". However, when only part of a 3LD (e.g., "top.stories.com") is entered such as "top.stories", there are no such browsers or devices that have the ability to recognize the absence of a TLD. This indicates that such browsers or devices assume that "stories" is a TLD without confirming its resolvability, before performing a resource location request, and in turn, errors upon resolution. This fact demonstrates that no such inventive step for determining HLD resolvability yet exists (prior to DNS resolution) and has remain overlooked. There has not yet been a need to determine HLD resolvability because virtually all domain names registered to date have only two domain levels. Adding a TLD to create a domain name having a 3LD still remains unobvious to those skilled in the art. Only recently, as business partnerships and portal sites have grown, 3LDs are becoming more commonly used as a distinct address such as "infoseek.go.com" or "hotbot.lycos.com". Certainly, the increase in 3LDs over the next few years will necessitate such solutions as presented in this invention.

Figure 5:
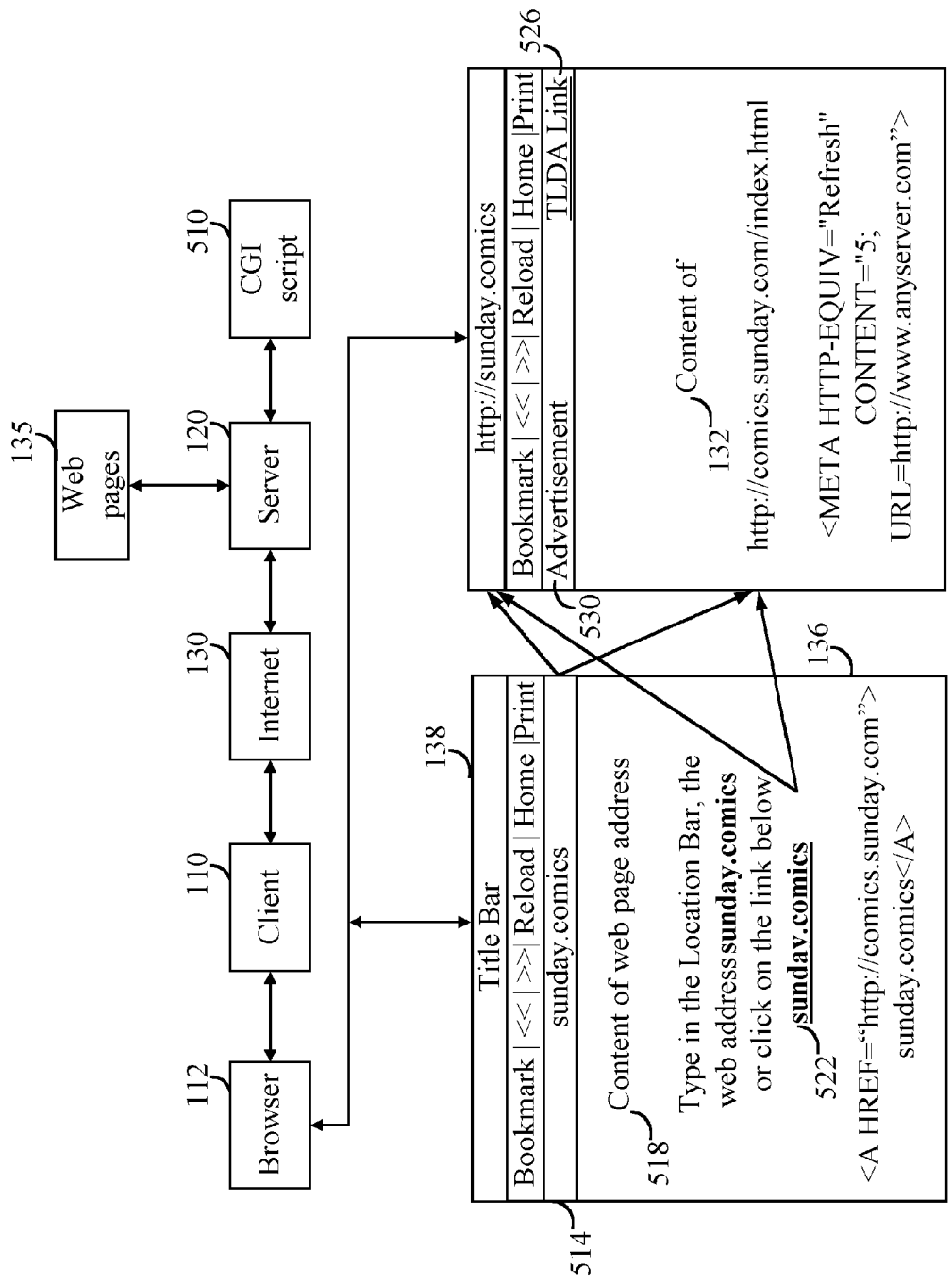
FIG. 5 is an illustration of how a web page can emulate domain name space in accordance with the present invention.

FIG. 5 is an illustration of how a web page can emulate domain name space in accordance with the present invention. A client 110 web browser 112 having a first displayed 136 web page is used to connect to a server 120 via the Internet 130 that executes a CGI script 510. The location field 134 of the web browser 112 is suppressed and the web page 136 displays at least two frames. The first frame is the web based location field 514 and the second frame 518 is used to display the contents 132 of a web address. An input device (e.g., keyboard, mouse, pen light, touch screen, scanner, or microphone, etc.) of a client computer or network access apparatus 110 may be used to receive an input web address such as a domain name or URI 210' either directly from a hyperlink 522 in the displayed 136 web page, or from the web based location field 514 of the displayed 136 web page. The acceptance of input 210 from an input device causes the web browser 112 to generate a HTTP GET request.

The web browser 112 forwards the request to a server 120, which processes the request by executing a CGI script 512 to determine resolvability. The CGI script 512 may then perform a registry lookup, access configuration settings, authorize and determine URI generation. URI is generated and the requested web page 132 is sent to the web browser 112. The content 132 accessed from a network resource corresponding to the URI may be displayed in the second frame 518 of the displayed 136 web page. The URI having a TLDA is generated by the CGI script 512 and displayed in the title bar 140 of the displayed 136 web page and the web based location field 514 of the first frame may either persist by displaying input 210 or cleared out for entering the next web address. Furthermore, the first frame may further include a hyperlink 526 to a TLDA directory service and related context sensitive advertising 530 retrieved from an advertising cache 166 as will be discussed.

The displayed 136 web page may include an HTML <META> tag as a means to further redirect to another URI after a specified period of time to allow for comprehension of content, accounting or statistical processing on the server side, and to display advertising wherein the content of such advertisements 530 may be context sensitive with respect to the TLDA name. For instance, "sunday.comics" is entered and resolved through the TLDA Rotation method yielding "http://comics.sunday.com". There is included in the page source a <META> tag with a ten second delay during which time an advertisement may be retrieved from an advertising cache 166 and displayed for MARVEL comics before the page is redirected to another web address. The context of the name is analyzed to match and display related advertising banners that exist in an advertising cache stored on either the client or server side.

When the displayed 136 web page is minimized, the content of the title bar 140 displays the fictitious URI "http://sunday.comics" in the taskbar of an operating system (OS) but yet the content of the web page is retrieved from "http://comics.sunday.com" with no immediate visible identification of the URI for the page source. When a network resource from the generated RDN is requested, content from the network resource corresponding to either the FDN or generated RDN is received. The generated RDN includes one of a predetermined RDN and at least a portion of the FDN. By so doing, persistence is maintained so that a fictitious domain name (FDN) appears to have the same properties as a real domain name (RDN), thereby achieving domain name space emulation.

The hyperlink 522 may be written as an HTML anchored reference tag that has a label. Web page development tools may include a program or script to create hyperlinks to URIs that were calculated from indicia such as fictitious domain name labels. This illustrates how another aspect of name space is emulated. The case when the label is underlined in a web page as a hyperlink having a destination that can be calculated from that label. For instance, "sunday.comics" is entered and a script may create an HTML anchored hyperlink that can be pasted into a HTML file for web page development.

<A HREF="http://comics.sunday.com">sunday.comics</A>

An HTML web page may already exist and the program may automatically parse and modify the web page for all hyperlinks by creating "SLD.TLDA" reference labels in association to such links for the purposes of displaying underlined "SLD.TLDA" labels to the user and keep name space emulation of the web page consistent. This inventive aspect is not limited to HTML but can be applied to other tagging systems including SGML, XML, etc. Emulation may further be applied to a plurality of e-mail and news applications by having scripts orchestrate a system of insertions and deletions or make use of a mail or news proxy server for altering header information such that the appearance of "SLD.TLDA" name space is emulated when sending and receiving e-mail.

Though the above aspect demonstrates how name space is emulated through a web based version 514 of a location field. The same teachings may be applied to those skilled in the art by providing a text box object as input that can be located anywhere and on any web page including a text box that is embedded or part of an on-line advertisement. The text box object may be used in a stand-alone application and stored on magnetic and/or optical media that is either non-volatile, writable, removable, or portable. The text box object may be incorporated as an applet or servlet and embedded in other applications. The text box may be integrated in the task bar or any part of the GUI's OS, or the OS bypassed and overlaid as a graphic on a display device based on modifications to a video card and/or it's associated firmware or software drivers. The command line text box may further be overlaid as an interactive graphical object in other embodiments such as Internet television, cable television, digital television, or interactive television through an Internet appliance or set top box.

Figure 6:
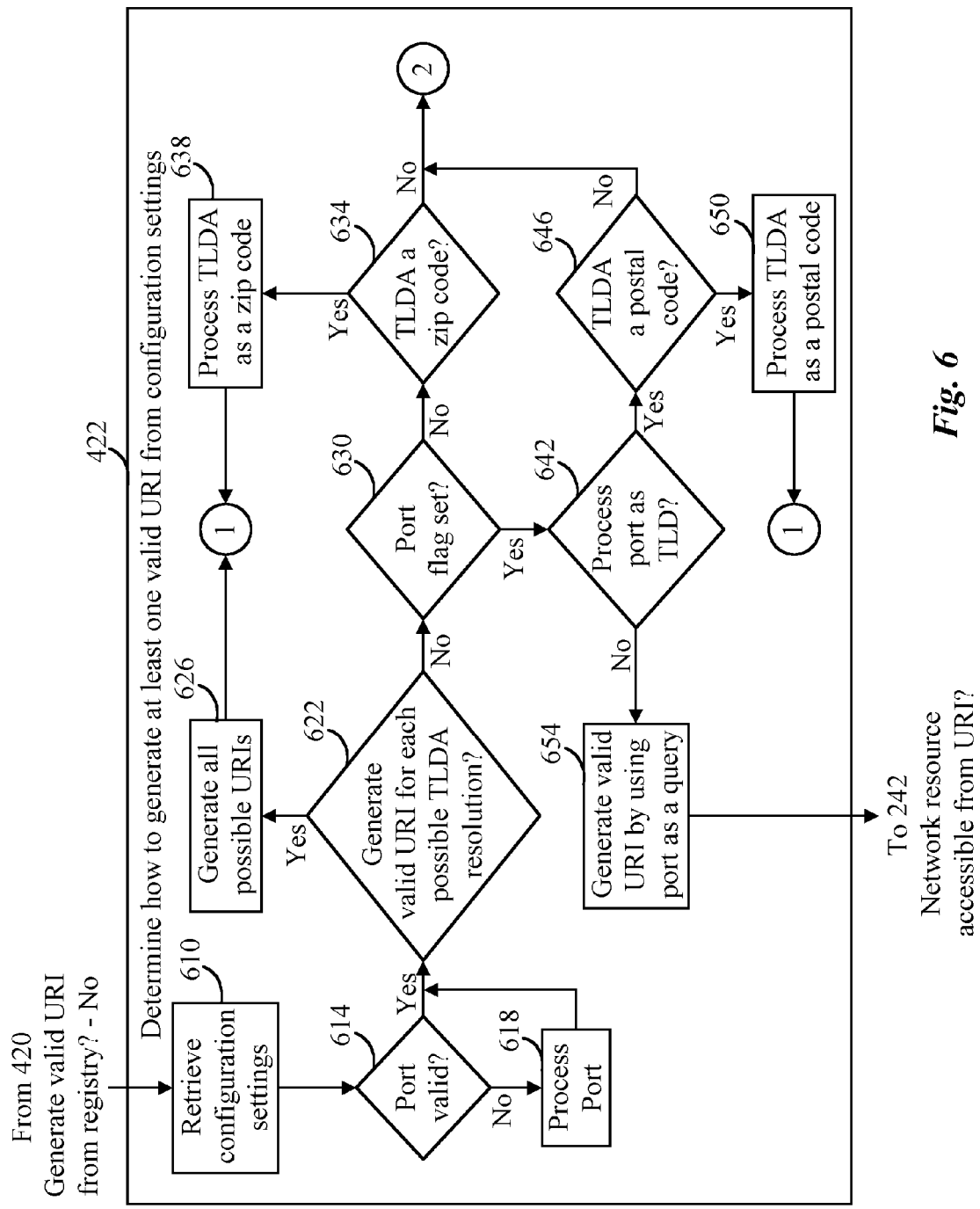
FIG. 6 is a flowchart illustrating the steps performed for determining how to generate at least one valid URI having a resolvable TLD from configuration settings in accordance with the present invention.

Referring now to FIG. 6, specific steps for determining how to generate at least one valid URI having a resolvable TLD from configuration settings are shown (step 422). Configuration settings 710 may be retrieved in step 610. Port validity may be determined in step 614 for input 210 having a port 274. When the port 274 is determined not valid in step 614 then the port may be processed in step 618 (discussed in conjunction with FIG. 8). However, when the port 274 is determined valid in step 614, it may then be determined in step 622 whether a valid URI for each possible TLDA resolution is generated. When this is the case, all possible URIs are generated in step 626, otherwise it may be determined in step 630 whether a port flag is set. When the port flag is not set in step 630, then it may be determined in step 634 whether the TLDA is a zip code by comparing the TLDA to a database 158 of zip codes (illustrated in FIG. 10b). When the TLDA is a zip code, the TLDA is processed as a zip code in step 638. However, when the TLDA is determined in step 634 to not be a zip code then further steps for processing the TLDA are discussed in conjunction with FIG. 11.

When the port flag is determined in step 630 as set, then it may be determined in step 642 whether to process the port as a TLD or query. A determination is made by the specific kind of port flag that is set. When the set flag is a TLD flag, it may be determined in step 646 whether the TLDA is a postal code by comparing the TLDA to a database of postal codes (illustrated in FIG. 10b). When the TLDA is a postal code, the TLDA is processed as a postal code in step 650. However, when the TLDA is determined in step 646 to not be a postal code then further steps for processing the TLDA are discussed in conjunction with FIG. 12. When the set flag in step 642 is determined to be a query flag, then a valid URI by using port as a query may be generated in step 654. After URIs of any form are generated based on the previous steps (626, 638, 650, 654), processing may be continued by determining whether a network resource is accessible (step 242) from the URI.

Turning now to FIG. 7, user modifiable configuration settings 710 includes a multi-resolution feature 720 for generating all possible URIs, a port aliasing feature 724 to allow the use of port information to generate a valid URI, a TLD calculation feature 728 to enable generation of a resolvable TLD from a TLDA through recursive truncation, a postal code feature 732 for processing a postal code as either a query or for ccTLD conversion, a TLD selection feature 736 to allow for a selected or default TLD to be used to add or replace the TLDA particularly when a TLD can not be calculated, a URI redirect feature 740 which helps determine what resolution method is used to generate a URI, and general features 745 including but not limited to selecting namespace providers, selecting registration providers, enabling prefix/suffix processing, enabling multiple resolution methods, and telephone parameters such as local area code.

Figure 8:
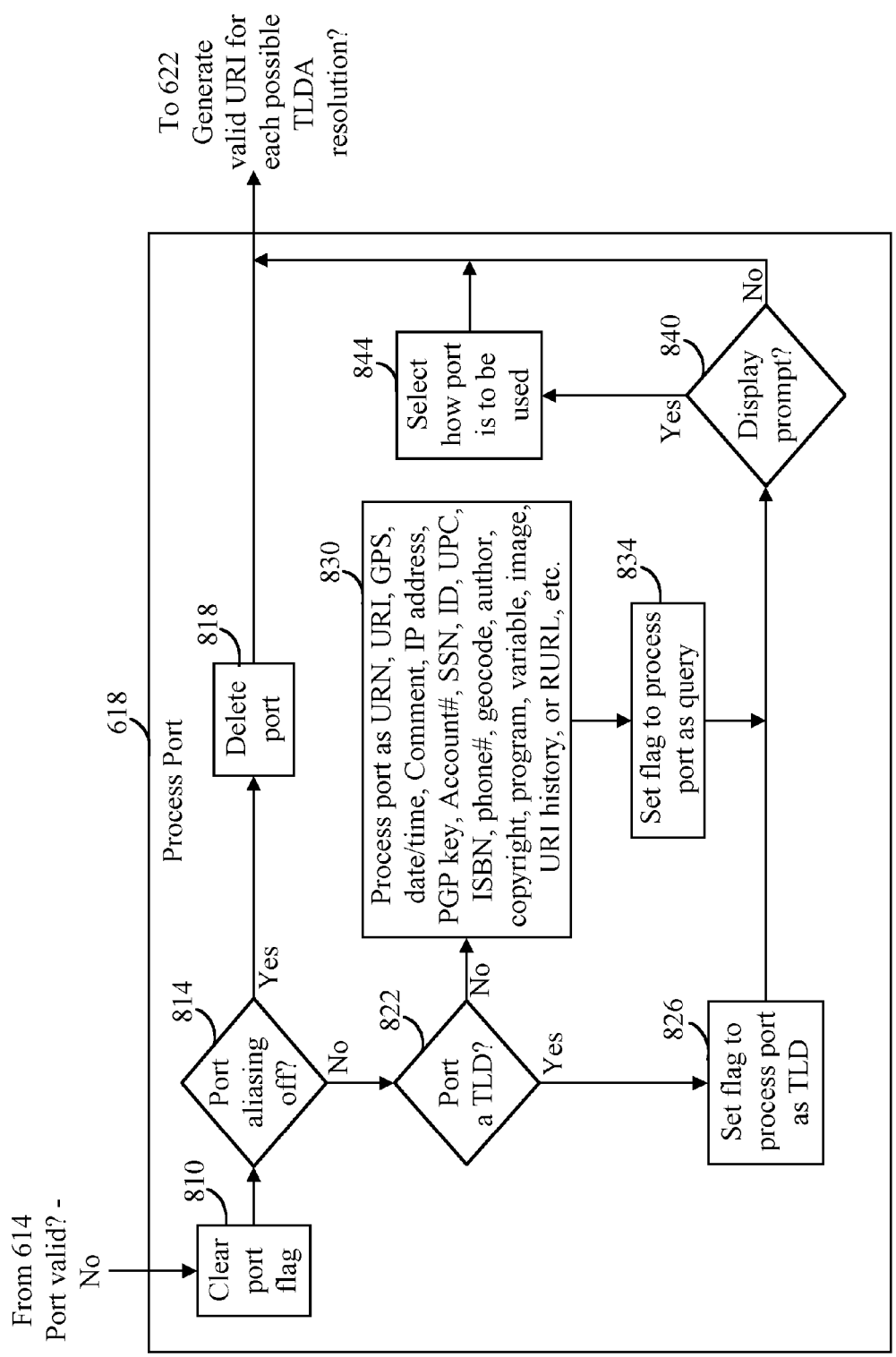
FIG. 8 is a flowchart illustrating the steps performed for processing an invalid port in accordance with the present invention.

FIG. 8 is a flowchart illustrating the steps performed for processing (step 618) an invalid port in accordance with the present invention. First, a port flag is cleared in step 810. If port aliasing is OFF in step 814 as determined from the selection of the port aliasing feature 724 retrieved from configuration settings 710 then the port is deleted in step 818 and no flags are set. When port aliasing is ON in step 814 and it is determined in step 822 that the port is a TLD then a flag is set in step 826 to process the port as a TLD. If port aliasing is ON in step 814 and it is determined in step 822 that the port is of other resource types 840 (e.g., Protocol, Namespace ID, URN, URI, GPS, date/time, Comment, IP address, PCP Key, Account#, SSN, ID, ISBN, phone#, geocode, Author, Copyright, program variable, image, URL history, or RURL, etc.) then a flag is set in step 834 to process the port as a query. After any flag is set and it is determined in step 840 from the port aliasing feature 724 retrieved from configuration settings 710 that the prompt user mode is selected, then a prompt in step 844 is displayed for a user to choose how the port information is to be used. The prompt in step 844 may be bypassed when it is determined that the port aliasing feature 724 is on. The invention also makes use of multiple URLs or recursive URLs (RURLs) which may be used to track navigational history or manage other functions in lieu of double delimiters (e.g., URLa is placed within the port of URLb which is placed within the port of URLc, etc). After port processing is performed it may then be determined in step 622 whether a valid URI for each possible TLDA resolution is generated.

Figure 9:
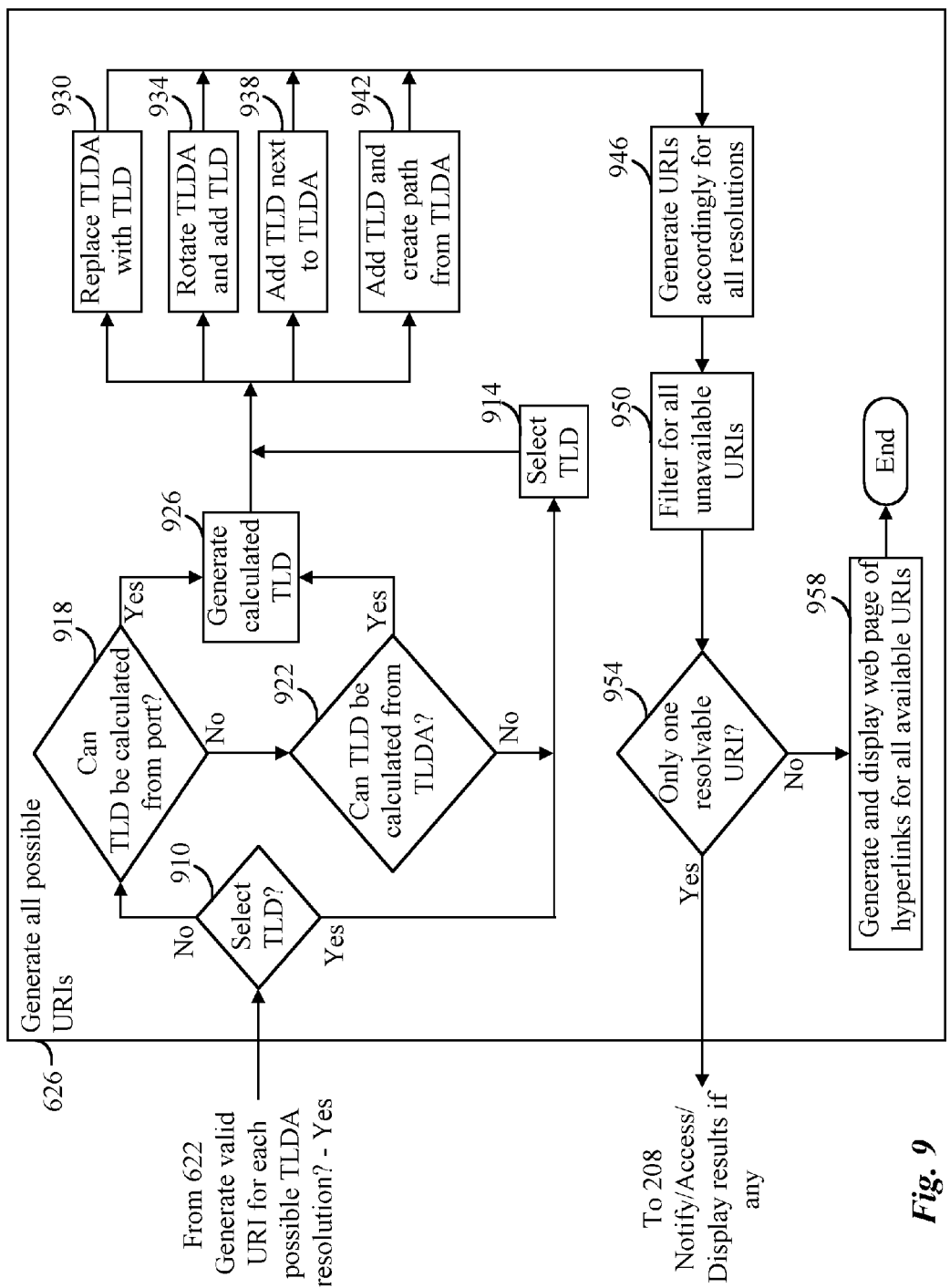
FIG. 9 is a flowchart illustrating the steps performed for generating and accessing at least one network resource from at least one URI having a resolvable TLD in accordance with the present invention.

FIG. 9 is a flowchart illustrating the steps performed for generating (step 626) and accessing a network resource from at least one URI having a resolvable TLD in accordance with the present invention. When all resolutions are determined to be calculated in step 622, then it may further be determined whether a TLD is generated or selected in step 910. When the TLD is selected, either a predetermined default TLD may be retrieved or a list of TLDs may be prompted for the user to select a TLD in step 914 based on the configuration settings 710 of the TLD selection feature 736. However, when the TLD is generated instead of selected, then it may be determined in step 918 whether a TLD can be calculated from the port. If not, then it is determined in step 922 whether a TLD can be calculated from a TLDA based on the configuration settings 710 of the TLD calculation feature 728 to enable generation of a resolvable TLD from a TLDA through recursive truncation.

When TLD calculation is enabled, an input such as "united. states" may be redirected to "united.st", where ".st' is a resolvable ccTLD. Consider the input "free.love", ".lo" is not a resolvable ccTLD, therefore TLD calculation would not apply, yielding a default or selected TLD (e.g., ".com") to generate "http://free.com/love" as one outcome. There are 676 two-letter permutations (e.g., the set [aa . . . zz]) whereas there are only 243 ccTLDs creating a discrepancy for the application of TLDAs allowing only 36% of words to be used as TLDAs that can be resolved through the method of recursive truncation. A solution to allow unlimited usage of TLDAs is to include the use of port aliasing for TLD redirection. An extension of the above example would process the input of the form "SLD.TLDA:TLD" to yield a result of the form "SLD.TLD/TLDA" or "TLDA.SLD.TLD" (e.g., "free.love:to" yields http://free.to/love or "http://love. free.to").

If a TLD can not be generated from the port (step 918) or through recursive truncation (step 922) then a TLD may be selected in step 914. If the TLD can be calculated from either the port (step 918) or TLDA (step 922), then the TLDA may be replaced in step 926 with the calculated TLD. In both cases, whether the TLD was selected or generated, methods for URI name generation in steps (930, 934, 938, 942) may be applied. All generated URIs in step 946 may be filtered in step 950 for any unavailable URIs. If it is determined in step 954 that there is only one available URI, then results, if any, may be notified, accessed, and/or displayed in step 208. When it is determined in step 954 that there is more than one available URI, a web page may be generated in step 958 by displaying all available URIs as hyperlinks. URI availability is determined by transparently initiating a HTTP (GET, POST, OR HEAD) request and receiving a HTTP RESPONSE message having a status code. If a response message is not received, timed-out, or returns a numeric status code of "400" or higher then it is determined that the URI is unavailable. All unavailable links may then be filtered by removing such links before displaying or redirecting results. Other protocols may be used to make similar availability determinations.

Figure 10A:
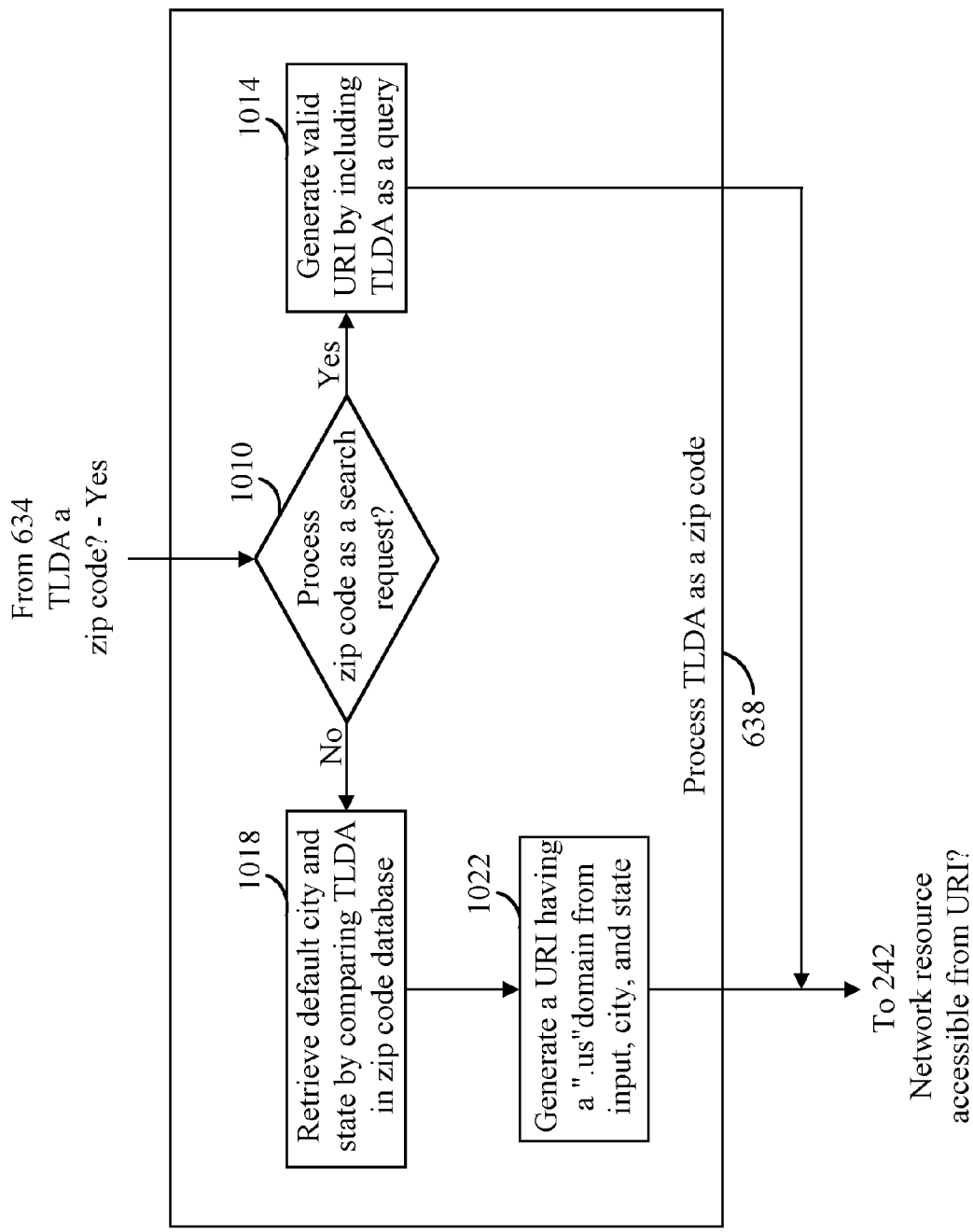
FIG. 10*a* is a flowchart illustrating the steps performed for processing a TLDA as a zip code in accordance with the present invention.

Referring now to FIG. 10a, specific steps for processing a TLDA as a zip code are shown (step 638). First it is determined in step 1010 whether the zip code TLDA is processed as a search request by retrieving the status of the postal code feature 732 from the configuration settings 710. When the zip code TLDA is processed as a search request, a valid URI may be generated in step 1014 by including the zip code TLDA as a query. For instance, "example.44116" is received as input and then determined that the TLDA ".44116" is to be processed as a search request resulting in the generated URI "http://example.com/cgi-bin/tlda.cgi?zip=44116". Quite often a zip code is used at a web site to help personalize search results by locating geographic specific information to the user. For instance, a user may access the URI "http://example.com" and then enter a zip code such as "44116" into a text box object that processes zip codes. Results are obtained in two steps. By entering "example.44116" as input, more specific personalized results pertinent to the user may be generated in one step.

When it is determined in step 1010 that the zip code TLDA is processed as a zip code, then default city and state data may be retrieved in step 1018 by comparing the TLDA in the zip code database 1040 (FIG. 10b). A URI is generated in step 1022 by combining input 210 with the retrieved default city and state and concatenating ".us" as the default ccTLD. For instance, "example.44116" is entered as input and yields the resulting URI "http://example.rockyriver.oh.us". There are many zip codes that match a city and many cities that match a zip code. Because of this it is possible to yield many URIs from input thus creating a one to many correspondence between input and URI. FIG. 10b illustrates the data structure of a zip code database that includes a logical field labeled "default" which is one technique used (as discussed in conjunction with FIG. 10a) to assure uniqueness of URI generation assuring a one to one correspondence between zip code and city.

Figure 10C:
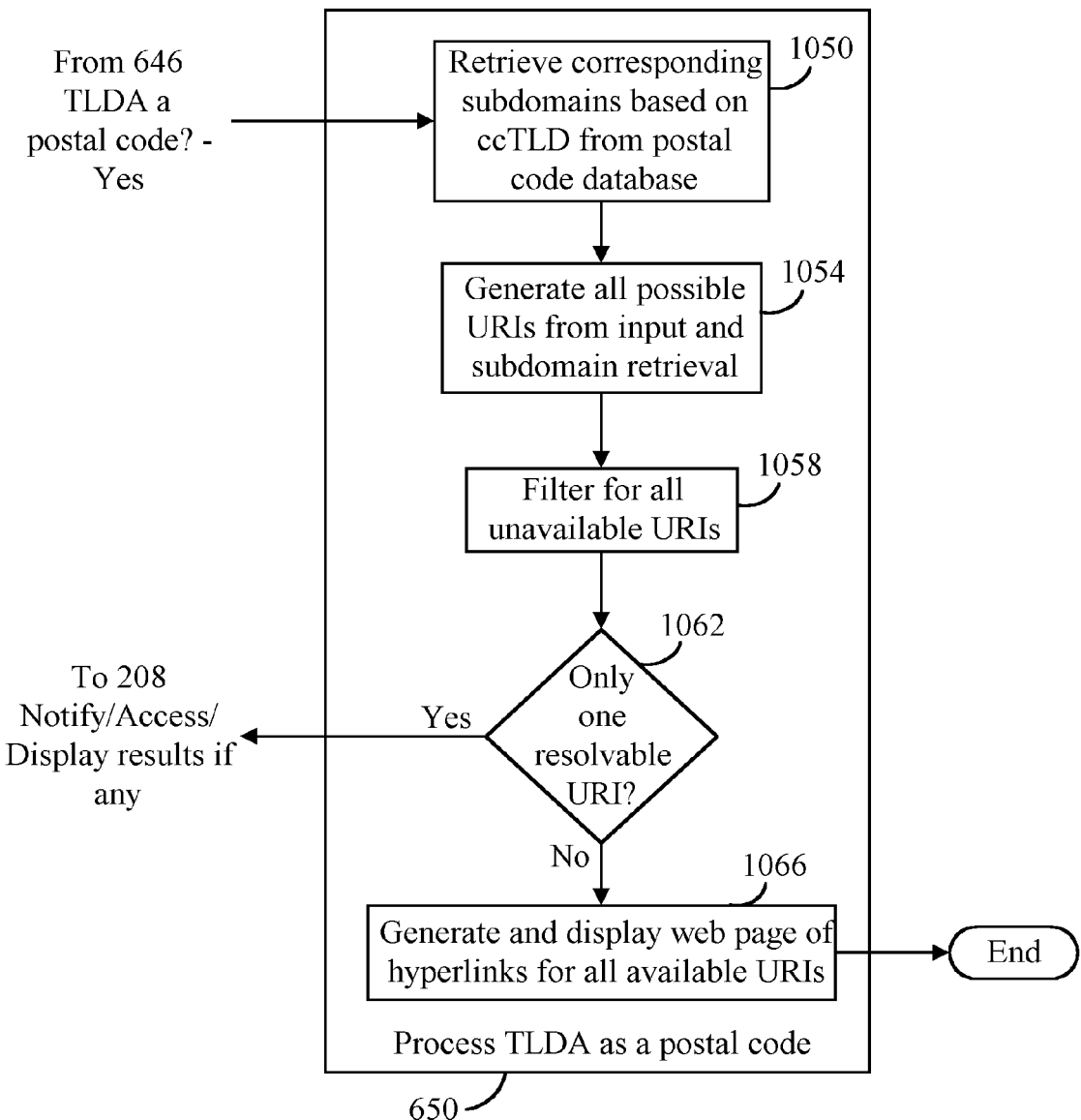
FIG. 10*c* is a flowchart illustrating the steps performed for generating at least one URI having a resolvable TLD from a postal code in accordance with the present invention.

The zip code database may be part of a larger more generalized postal code database. The postal code database provides conversion for other ccTLDs besides the ".us" domain. Turning now to FIG. 10c, specific steps for processing a TLDA as a postal code are shown (step 650). When the port is a ccTLD and the TLDA is a postal code then corresponding subdomains based on the ccTLD and TLDA may be retrieved in step 1050 from a postal code database. All possible URIs are then generated in step 1054 from the input, ccTLD, and subdomain retrieval. All generated URIs in step 1054 may then be filtered in step 1058 for any unavailable URIs. If it is determined in step 1062 that there is only one successful resolution, then results if any, may be notified, accessed, and/or displayed to the user in step 208. When it is determined in step 1062 that there is more than one resolvable URI, a web page may be generated in step 1066 by displaying all resolvable URIs as hyperlinks.

For instance, "example.44116" is entered into the location field 134 of a web browser 112. "44116" is parsed and determined to be a TLDA, and more specifically represents a zip code. The lookup table as shown in FIG. 10b is utilized to generate at least one URI from "44116". An HTML web page is generated which includes two links.

```
<HTML><BODY>
<B><U><CENTER>Results for
example.44116</CENTER></U></B><HR>
<A
HREF="example.cleveland.oh.us">example.cleveland.oh.us</A><BR>
<A HREF="example.rockyriver.oh.us">example.rockyriver.oh.us</A>
</BODY></HTML>
```

If "example.cleveland.oh.us" is available for display but "example.rockyriver.oh.us" is not available, then the browser is automatically redirected to the one and only available URI.

Another method to assure a one to one correspondence is by using ZIP+4 as a more precise means for determining city and state. In fact, ZIP+4 creates enough of a distribution to offer uniqueness for registrants of a given ZIPSPACE™. For instance, a registrant who holds the ZIPNAME™ "example.44118-3204" may distribute such indicia through different media sources. The name is used as a send or return address indicia on mail and parcel either in print or as machine readable code. This allows recipients to respond electronically and allows postal workers to more quickly route materials to their destination. The indicia creates a way to easily connect an email address to a physical location to be used for sending billing information without disclosing a full mailing address. A utility program may be used to convert the indicia to be printed as machine-readable code on labels to be used for sending and receiving mail.

Figure 11:
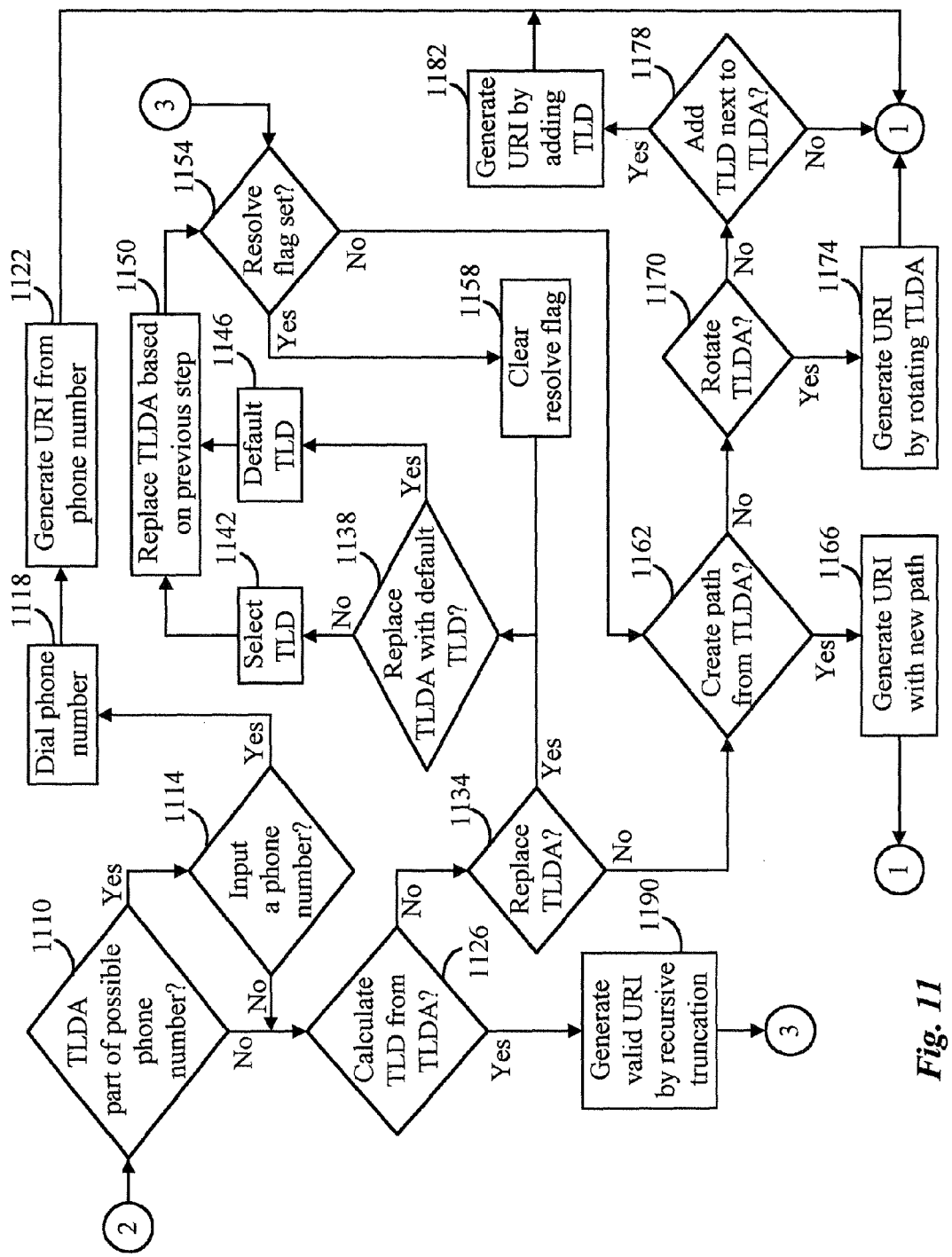
FIG. 11 is a flowchart illustrating the steps performed for traversing a hierarchy of name resolution decisions in accordance with the present invention.

Referring now to FIG. 11, further steps for TLDA processing are shown upon determination that the TLDA is not a postal code or more specifically a zip code. When it is determined in step 1110 that a TLDA is part of possible phone number, and input 210 represents in step 1114 a phone number, then the phone number may be dialed in step 1118 and a URI corresponding to the phone number is generated in step 1122. If the TLDA is determined in step 1110 or input is determined in step 1114 to not correspond to a phone number, and the TLD is not calculated from the TLDA in step 1126 based upon the TLD calculation feature 728 from the configuration settings 710, then it may be determined in step 1134 whether the TLDA is to be replaced by the URI redirect feature 740 from the configuration settings 710. If so, then it may be determined in step 1138 whether the TLDA is replaced with a selected TLD in step 1142 or a default TLD in step 1146. In either case, a URI may be generated in step 1150 with the parsed input and the selected TLD from either step 1142 or 1146.

If the resolve flag is determined in step 1154 to be set, which can only occur when the TLD calculation feature 728 from the configuration settings 710 is active (to be discussed in more detail in conjunction with FIG. 12) then the resolve flag is cleared in step 1158 and it may be determined in step 1138 whether the TLDA is replaced with a selected TLD or a default TLD as discussed above. When the resolve flag is determined in step 1154 to be not set, or it is determined in step 1134 that the TLDA is not replaced, then it may be determined how the URI is generated if at all. If it is determined in step 1162 by the URI redirect feature 740 from the configuration settings 710 that the TLDA is used to create a new path, then a URI may be generated in step 1166 by using the TLDA to create a new path. If not, and it is determined in step 1170 by the URI redirect feature 740 from the configuration settings 710 that the TLDA is to be rotated from the HLD to the LLD, then a URI may be generated in step 1174 by rotating the TLDA. If not, and it is determined in step 1178 by the URI redirect feature 740 from the configuration settings 710 that a TLD is to be added, then a URI may be generated in step 1178 by concatenating the TLD after the TLDA, making it the HLD. In all cases when a URI is generated (steps 1122, 1166, 1174, 1182), it can then be determined whether a network resource is accessible (step 242) from the URI. When it is determined in step 1126 that a TLD is to be calculated from the TLDA, then a URI may be generated in step 1190 by recursive truncation.

Figure 12:
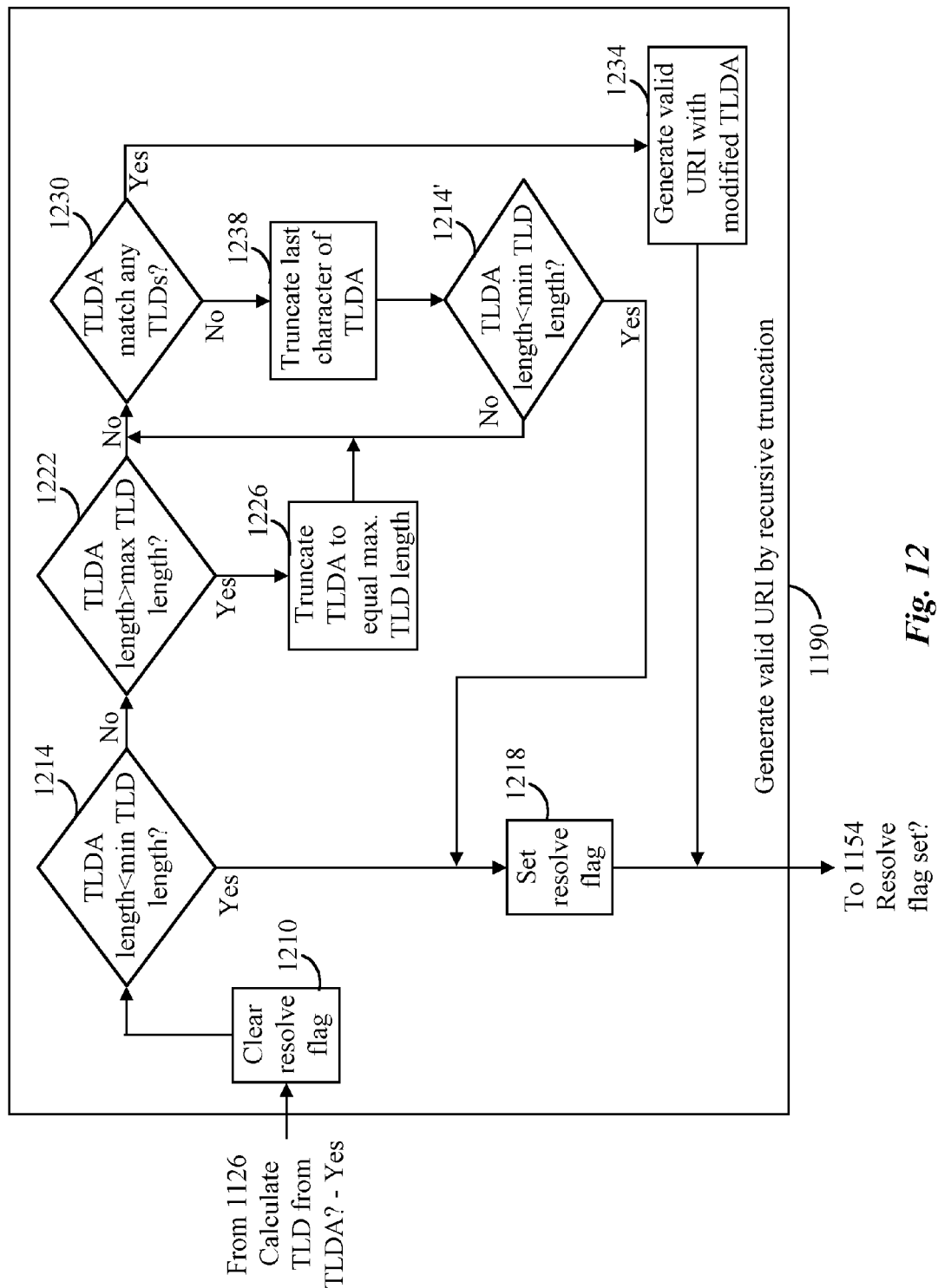
FIG. 12 is a flowchart illustrating the steps performed for generating an URI by recursive truncation in accordance with the present invention.

FIG. 12 is a flowchart illustrating the steps performed for generating an URI by recursive truncation (step 1190) in accordance with the present invention. First, a resolve flag is cleared in step 1210. The values of the minimum and maximum character length from the list or database of resolvable TLDs may be determined or predetermined [e.g., Min. Length=len(ccTLD)=2 and Max. Length=len(gTLD)=3]. If the TLDA length is less than the minimum TLD length as determined in step 1214 then the resolve flag is set in step 1218. If the TLDA length is greater than the maximum TLD length as determined in step 1222 then the TLDA is truncated in step 1226 to equal the maximum TLD length. When the TLDA length is not greater than the maximum TLD length or when the TLDA is truncated in step 1226 and the modified TLDA matches any TLDs in step 1230 then a new URI is generated in step 1234 with the modified TLDA. When there is no match in step 1230, then the last character of the modified TLDA is truncated in step 1238. If the modified TLDA length is less than the minimum TLD length as determined in step 1214' then the resolve flag is set in step 1218. If this is not the case, then steps 1230, 1238, and 1214' are repeated to perform recursive truncation until the modified TLDA either matches a TLD or is less than the minimum TLD length.

FIG. 13 is a table of generated URI equivalents to input in accordance with the present invention. Row 1 illustrates prior art of generated output from input. Row 2 illustrates a variety of URI generations from a FDN having a TLDA. Row 3 illustrates how input with invalid ports may be processed. Row 4 illustrates how numerical identifiers such as NDNs like ENUM FDN, UPC FDN, SSN FDN, CC FDN, and ISBN FDN can be processed. Row 5 illustrates how postal codes may be processed. Row 6 illustrates how e-mail may be processed.

Figure 14A:
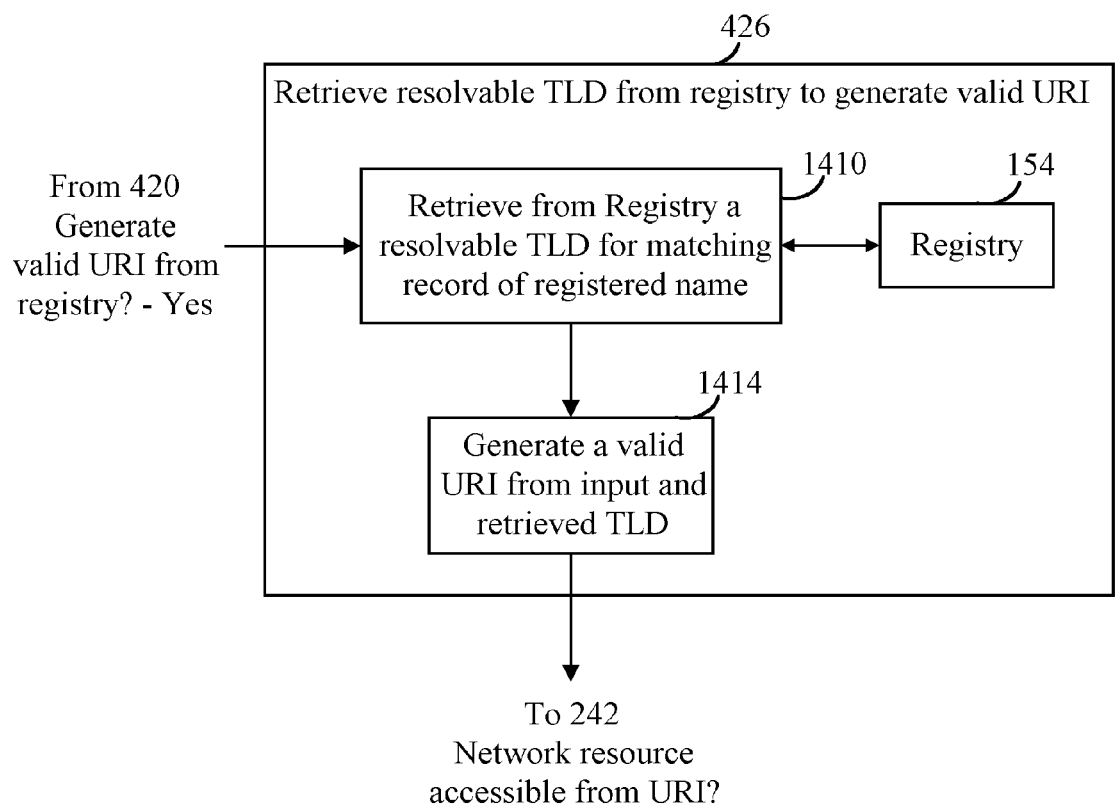
FIG. 14*a* is a flowchart illustrating the steps performed for retrieving a resolvable TLD from a registry to generate a valid URI in accordance with the present invention.

Though a user can adjust configuration settings (as discussed in conjunction with FIGS. 7, 8, 9, 10*a*, 11) in lieu of accessing a registry or translation database for URI generation through different methods of calculation/resolution, such configurations may be cumbersome adding extra steps for the user to obtain desired results. Accordingly, FIG. 14*a* shows how a registry can be used (in lieu of configuration settings) instead to generate a valid URI (step 426). First, a registered resolvable TLD is retrieved in step 1410 from a matching registration record of the registered name in the registry 154 and then a valid URI is calculated and generated in step 1414 from the parsed input 210 and retrieved resolvable TLD.

Figure 14B:
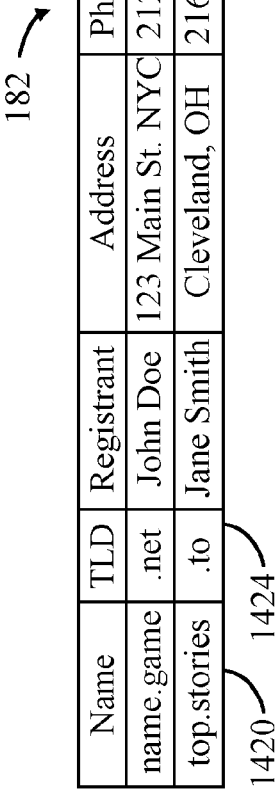
FIG. 14*b* presents an exemplary table in accordance with the present invention illustrating a simplified data structure for a registry.
Figure 14C:
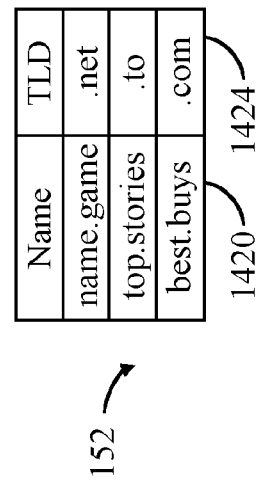
FIG. 14*c* presents an exemplary table in accordance with the present invention illustrating a simplified data structure for name translation information.

FIG. 14*b* illustrates an aspect of the data structure or registration record of the registry 154 including information such as but not limited to registered name 1420 and registered resolvable TLD 1424, registrant name, address, phone number, e-mail address, password, expiration date, or miscellaneous psychographic and demographic information. Though retrieval may be performed directly from the registry 154, the data structure illustrated in FIG. 14*b* may be redundantly stored as a database separate from the registry 154 for the sake of minimizing storage and retrieval time, and database updates. This separate database is more specifically referred to as the name translation database 152. When a registry 154 is used directly to retrieve the minimum information needed to generate a valid URI then the registry 154 is performing the equivalent function of the name translation database 152. FIG. 14*c* illustrates a simplified data structure of the name translation database 152 including a registered name 1420 and a registered resolvable TLD 1424. The above data structures may be expressed in XML as metadata and/or component data.

By using a registry 154 or name translation database 152 to correspond a registered resolvable TLD 1424 with input having a TLDA enables a wider and more balanced distribution of name space. For example, "search.me" may be registered to "search.com", "search.again" may be registered to "search.net", and "search.fast" may be registered to "search.to". Any user or registrant who is the domain name holder of "search" as a SLD for any given resolvable TLD, qualifies the registrant to correspond "search" in the form search.TLDA, where TLDA can have infinite aliases. The use of a registry 154 to translate a TLDA into a corresponding resolvable TLD (rather than translating ".com" by default) allows for many names in the form of "SLD.TLDA" to compete with the form of SLD.COM thereby enabling the creative purchasing of domain names around the globe. By providing a TLD registry, SLD holders (who may share similar trademarks) across different TLDs may now compete by registering TLDA names and emulate a shared SLD name space thereby reducing the likelihood of trademark disputes.

Generic TLDAs (gTLDAs) or any TLDA, may be reserved for the purpose of creating directories of sitemaps and white pages, etc. For instance, when indicium such as ".sitemap" is received (as input) by a browser (or the like), and only a TLDA is detected, then the browser may be automatically redirected to a URI such as "http://tlda.com/portal/sitemap/index.html". The content accessed from the network resource of the URI lists a directory or sitemap of all entities who have registered a FDN that includes the ".sitemap" TLDA. When other TLDAs are received (e.g., ".cars", ".sports", ".movies", etc.), a user may redirected to a vertical market directory service that can be endorsed, branded, and sponsored by organizations that serve such markets. For example, the ".cars" directory service may be endorsed by GM, Ford, and Chrysler or the ".sports" directory service may be sponsored by the NFL, MLB, and NBA, etc. Furthermore, trademark TLDs of trademark domain names may include FDNs such as "cars.gm" and "cars.ford", etc. that can be accessed by in this case a SLD directory service called "cars.".

When output to the browser is rendered from a FDN having a TLDA, the web based location field 514 may further include a hyperlink 526, for example, and retrieve from an advertising cache 166, context-sensitive advertising 530 to the corresponding TLDA directory service so when a user is at the "acme.cars web site, there is a link to access the ".cars" directory service for finding industry information or competitor pricing and the like. In effect, new information spaces are created as a result of reorganizing how TLDA name space is distributed to SLD holders.

Redirection to directory services may further include TLDs, SLDs, and XLDs (x-level domain) as well. For example:

.game =TLDA directory service for all registered FDNs that include ".game"

.net =TLD directory service for all registered RDNs that include ".net"

name.=SLD directory service for all registered FDNs and RDNs of the form "name.TLD" or "name.TLDA"

.name. =XLD directory service for all registered FDNs and RDNs of the form (x+1)LD.name.(x−1)LD In effect, input may be anyone of the following forms ".XLD.",".TLD", ".TLDA", and "SLD.". When content is requested from a directory service, a vertical market portal may be accessed and content may be received including advertising, coupons, rebates, discounts, and branding of products and services corresponding to input and/or the vertical market category.

Component Data and Resolution Methods

A resolvable TLD may be further considered a data element or component data that is used with other data elements to generate a URI. For instance, protocol, hostname (including all domains and subdomains), port, path, query, or fragment of a URI are regarded as data elements used as component data for generating a resolvable URI. Other data components (not shown) may include such as Namespace ID, namespace provider, identifier resolver service 168, delimiters mappings, mapping rules, etc. All combinations for concatenating component data that does not yield a full URI is referred to as a Partial Uniform Resource Identifier (PURI). The same applies for Partial Uniform Resource Locators (PURLs) and other similar resources.

Since there are numerous combinations of PURIs within a given URI, each combination may be assigned a unique resolution/generation/calculation/construction method for determining how to arrange the individual data elements of the component data to form a PURI. A set of rules for is in operative association for each resolution method. Such rules (not shown) may include URN namespace ID, resolver provider, namespace provider, naming service provider, one or more identifiers from another namespace, delimiter mappings, component data ordering, functions, procedures, recursive resolution, and any other technique used to construct a FDN, RDN, and/or URI. Using the registry 154 or name translation database 152 for retrieving a registered resolvable TLD 1424 is only one resolution method. TLDA truncation, TLDA rotation, TLDA path, delimit TLDA, or ignore TLDA etc. as discussed earlier are examples of other methods. In fact, any method including multi-resolution methods, port and recursive resolution, or zip code resolution of ZIPNAMES™ may be used as a method of identifier resolution/calculation/generation/construction of the present invention.

Each resolution method may be assigned a method number/template number (templates can be selected and specified as will be discussed) which further corresponds to a set of heuristics or rules such as a database of procedure calls that specify a function with the associated parameters such as component data or other fields in the name translation database that are used for generating a resolvable URI from a registered name. For example, method number "4" may call the TLDA Path procedure which uses a registered resolvable TLD as its only parameter. Method number "5" may call the TLDA rotation procedure and so forth. As noted, the particular selection and arrangement of component data may be assigned a method number with a corresponding procedure call and parameters that are used for URI generation.

For instance, method number "27" may equal the retrieval of scheme and port information only to be combined with the fictitious domain name in question to calculate and generate a valid URI whereas method number "28" may equal the retrieval of port, path, and TLD information for URI generation. Furthermore, resolution methods may also be assigned to naming service providers and namespace providers such as vendors that maintain a combination of registries and/or resolvers 168 in other name spaces or alternative naming systems (e.g., method number "15" may represent the retrieval of a registered name from Netword's registry). In effect, registry usually called the TLDA registry 154 can serve as a registry about other registries and can also be called a Metaregistry.

Another resolution method is using the TLDA as a query to call a procedure and have the TLDA function as a search request or variable:

"top.stories"="http://top.st/index.cgi?tlda=stories"

Though a URI may be generated from the TLDA search method by default without a translation database, a more versatile approach for processing a TLDA as a search request is to allow a registrant to specify a search string as part of the registry along with a method number which denotes how the registered name is resolved.

For example, the registrant for "yahoo.lawyer" may select the TLDA search method from a list of resolution methods, which may include other variations of TLDA search or any other method type. The user might enter a search string such as "http://search.yahoo.com/bin/search?p=" which is stored as component data in the registry or name translation database. After registration, when a device receives as input by any means, the fictitious domain name or registered name "yahoo.lawyer" for use by the invention, it is detected that ".lawyer" is a TLDA and then determined from the name translation database that method number "40" which is a TLDA search method may be used to call a function which requires a registered search string corresponding to "yahoo.lawyer" for generating a resolvable URI. More specifically, method number "40" concatenates the search string with the TLDA to form the URI. As a result of the function call, the valid URI generated and resolved is:

"http://search.yahoo.com/bin/search?p=lawyer"

Quite often a zip code is used at a web site to help personalize search results by locating geographic specific information to the user. Another example of the TLDA search method is by receiving the name "yahoo.44106" to be processed by a device, network access apparatus 110, command line, or location field 134 of a web browser. By configuring and registering a resolution method to such a name, the steps of accessing a resource and then searching a resource are combined into a single step by simultaneously accessing and searching a given resource where "SLD.TLDA" takes the form "SLD.SEARCHTERM" creating a FDN. The search term used for personalized content is not limited to zip codes but may include any search term or identifier associated to the geographic, demographic, or psychographic identification or profile of a user (identifiers such as account number, license plate, telephone number, address, e-mail address, or social security number, trademark, etc.) wherein the results of such indicia or TLDA name form a sense of personalized results.

By registering a resolution method, the processing of a zip code TLDA as a ccTLD web address or as a search term may be determined. The present invention may be further modified to consider both methods appropriate and filter and display all available links of generated URIs based on contemporaneously processing a plurality of methods.

For instance, "weather.44116" is received as input by a device. The ".44116" is parsed and determined to be a TLDA, and more specifically represent a zip code. The zip code lookup database is utilized to convert "44116" into the appropriate address, and "44116" is further used as a search term at the resolvable domain name "weather.com". An HTML web page may be generated which includes three links.

```
<HTML><BODY>
  <B><U><CENTER>Results for weather.44116</CENTER></U></B><HR>
  <A HREF="http://weather.cleveland.oh.us">weather.cleveland.oh.us</ A> < BR>
  <A HREF="http://weather.rockyriver.oh.us">weather.rockyriver.oh.us</A><BR>
  <A HREF="http://weather.com/index.cgi?zip=44116">LOCAL
WEATHER</A><BR>
  </BODY></HTML>
```

If both "weather.cleveland.oh.us" and "weather.rockyriver.oh.us" are not available, leaving only one available link, then the user may be automatically redirected to the third link listed above and access the resource for local weather.

Each resolution method further includes what component data, if any may be stored in the registry 154 or name translation database 152. The registry 154 may be expanded to support more than registered resolvable TLDs. Such component data may further include domain aliasing for any combination of subdomains other than that of the HLD. FIG. 15a illustrates an expanded data structure of the registry 154 or name translation database 152. Users may also register component data 1510 or register a method number 1514 corresponding to a resolution method that is stored in the registry 154 or name translation database 152 for use by the present invention. When a method number 1514 is retrieved, a function is called to perform a specified calculation that may include corresponding parameters used for string manipulation to derive and generate a resulting valid URI.

A resolution method may be selected by choosing which resolution method from a table of resolution methods. The table of resolution methods may include one of a rotation method, truncation method, replace method, path method, delimit method, reverse method, append method, prepend method, substitute method, query method, custom method, and naming service|namespace|resolver|registry provider method. These methods of resolution may have a definable ranking or hierarchy by enabling registrants to favor resolution methods that may provide a strategic buying advantage or gain broader appeal for the distribution of the registered name as indicia. For instance, input such as "united.states" may take ranking or precedence over "united.foods" when translating such input to the URI "http://united.st" (TLDA truncation as a resolution method takes precedence over TLDA replacement). If "united.states" is registered for truncation, to maintain uniqueness, "united.foods" may be registered for replacement as long as the registered resolvable TLD is not ".st", otherwise "united.foods" may be registered for say TLDA rotation as a resolution method to yield "http://foods.united.st".

FIG. 15b is a table that lists different resolution methods and arbitrary associated ranking or priority level. Though the illustration shows different ranking versus method numbers, the method number that denotes a resolution method may be constructed to equal the ranking or priority of the resolution method. In addition, the Form column shows (with the exception of rows rank 7 and 8) the relationship between input of the form "SLD.TLDA" and the resulting form after a resolution method has been applied. Rows rank 7 and 8 show how these resolution methods may be further applied to 3LDs or other level domains as needed. Regardless of the number of domain levels, there may remain a corresponding relationship between aN-level FDN (as a trademark) and a (N+1)-level RDN. In effect, when a received FDN is of the form "SLD.TLDA", the generated RDN from the FDN may be one of any of the following forms "SLD.TLD", "SLD.TLD/TLDA", "TLDA.SLD.TLD", "SLD.TLDA.TLD", "SLD.TLD/A", "SLD.TLD/?query=TLDA", "SLD.TLDA.RDN", "RDN/SLD.TLDA", "RDN/TLDA/SLD", and "RDN/SLD/TLDA".

Figure 16:
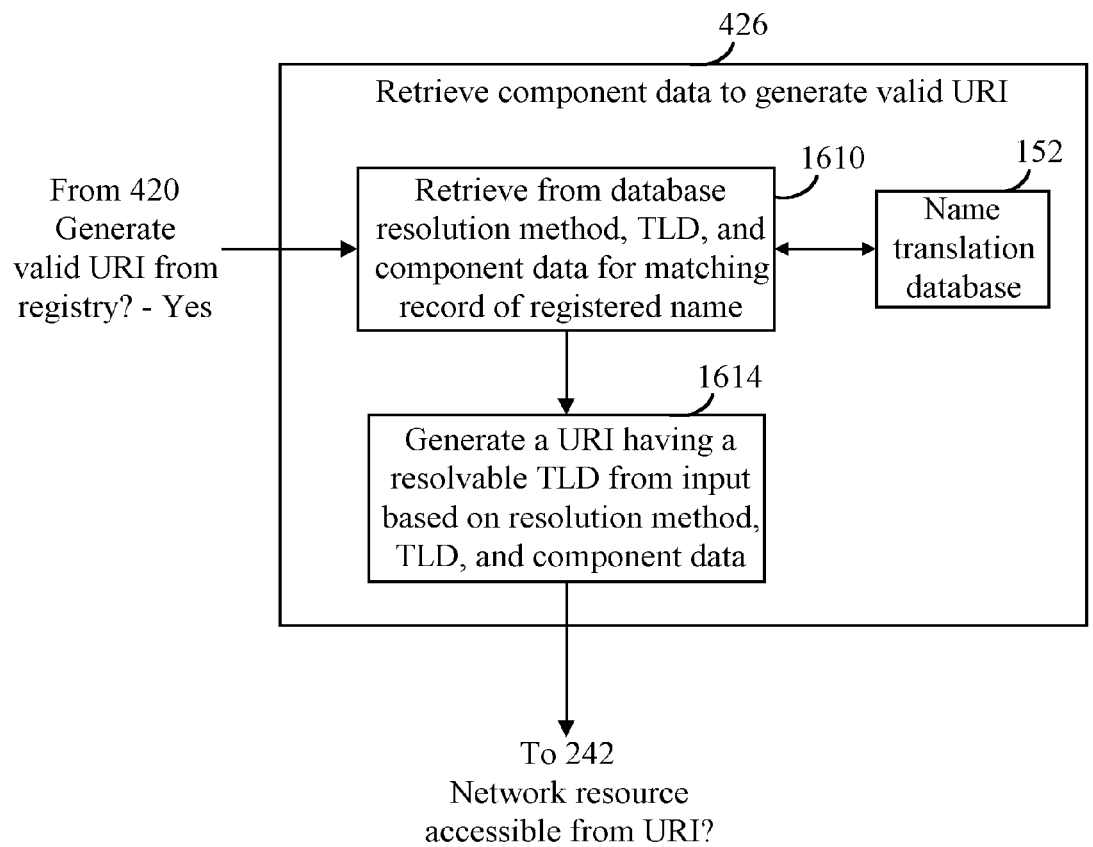
FIG. 16 is a flowchart illustrating the steps performed for retrieving component data from a name translation database to generate a URI in accordance with the present invention.

Referring now to FIG. 16, a broader set of steps may be performed (in lieu of steps illustrated in FIG. 14a) for URI generation by retrieving component data from a name translation database 152 are shown (step 426). When it is determined in step 420 that a valid URI is generated from a registry instead of configuration settings then any combination of resolution method, resolvable TLD, and/or component data may be retrieved in step 1610 from the name translation database 152 having a matching record of the registered fictitious domain name. A URI having a resolvable TLD may then be generated in step 1614 from input 210 based on the retrieved resolution method, TLD, and/or component data.

Figure 17:
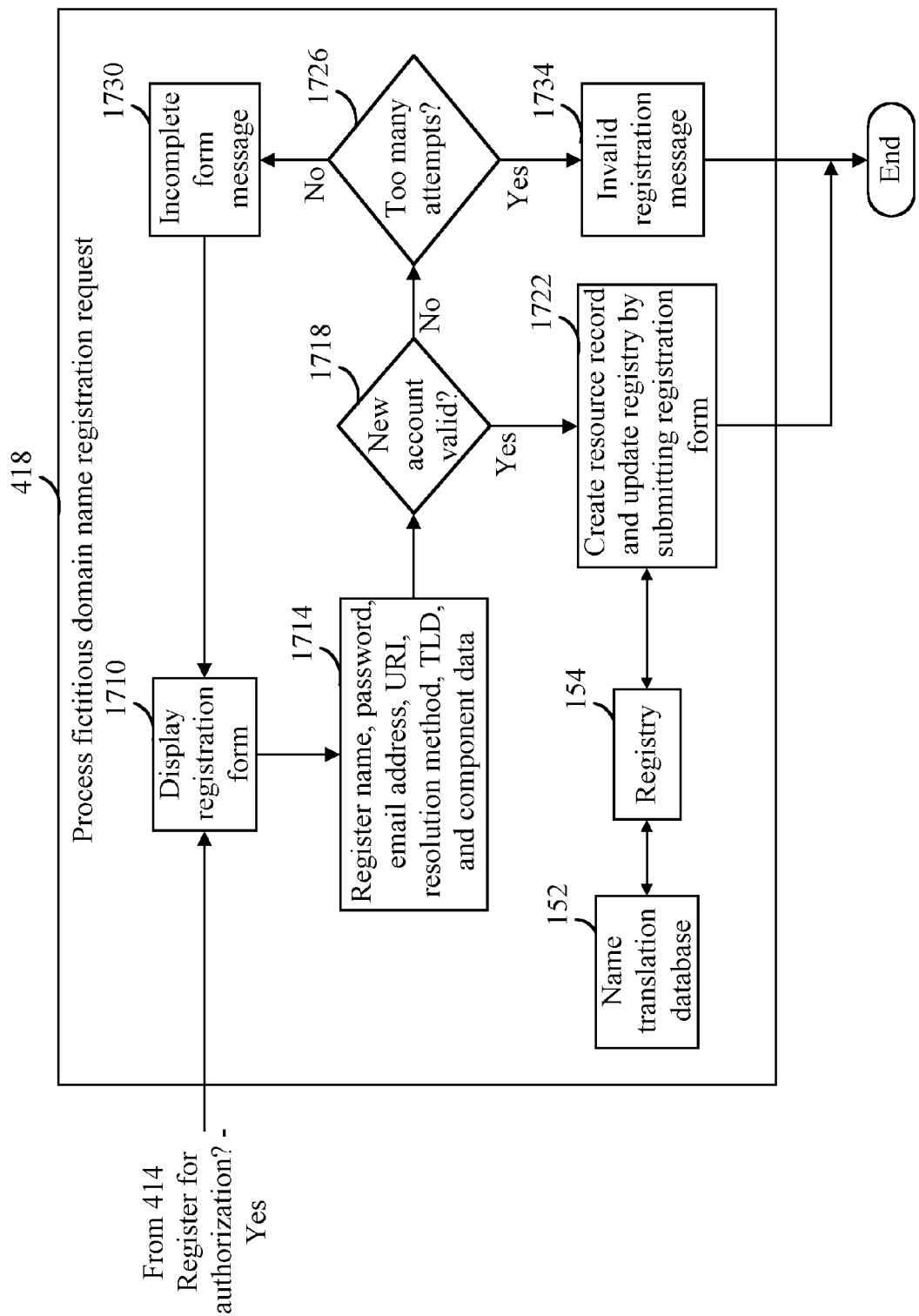
FIG. 17 is a flowchart illustrating the steps performed for processing a fictitious domain name registration request in accordance with the present invention.

Turning now to FIG. 17, specific steps for processing a fictitious domain name registration request are shown (step 418). When it is determined in step 414 that authorized registration is desired, a registration form may be displayed to the user in step 1710. When new information such as but not limited to registered name and registered resolvable TLD, registrant name, address, phone number, e-mail address, password, expiration date, and miscellaneous psychographic/demographic information, etc. is registered in step 1714 and the new information is determined valid in step 1718 then a new account is created in step 1722 and the registry 154 and name translation database 152 are in turn updated by adding a newly created registration/resource record. Upon creation of the new account it may be further determined in step 1723 whether the registrant wishes to include their registered FDN listing in a directory service. If so, the FDN listing is entered in step 1724 into the directory service corresponding to a TLDA vertical market portal for that listing. If the account is determined not valid in step 1718 and it is determined in step 1726 that there have not been too many registration attempts then an incomplete form message is displayed in step 1730 and the registration form may be redisplayed and corrected in step 1710. However, when it is determined in step 1726 that there are too many registration attempts then an invalid registration message may be displayed in step 1734.

URI Notation

URIs can be generalized by the following notation:
URI=prefix(PURI)+name+suffix(PURI)
where there exists at least a prefix, a suffix, or both.
Other equivalents to the above notation are:
URI=prefix(PURI)+name
URI=name+suffix(PURI)

EXAMPLE name = "name.game
prefix(PURI) = "http://www2.same."
suffix(PURI) = ".com/samegame/index.html"
name = either a FDN, RDN, keyword or other identifier A registrant provides a prefix and/or suffix associated with a FDN. When the FDN is entered in the location field 134 of a web browser 112 or command line of a device, it is determined that the FDN does not have a resolvable TLD. A resolution method and its corresponding component data such as the prefix and/or suffix listed may be retrieved from the registry to determine how to calculate and generate a resulting URI.

The resultant URI from the above example is "http://www2.same.name.game.com/samegame/index.html"

As mentioned, each combination of PUR1 may be assigned a unique resolution method for determining how to arrange the individual data elements of the component data to form the PUR1 prefix. For instance the separate component data, scheme (http), web (www2), domain (same) may be registered and used by either a preset or user defined resolution method to concatenate the component data or data elements to form the PUR1 prefix of http://www2.same. in lieu of a separate PUR1 (prefix) entry upon registering "name.game". A resolution method may call a function, procedure, or template that defines the specific component data parameters and their respective arrangement to generate a valid URI.

---

Another Example
name = "name.game"
prefix(PURI) = "http://www."
suffix(PURI) = ".tlda.com"
URI= prefix(PURI) + name + suffix(PURI)
URI = "http://www.name.game.tlda.com"

---

Such prefix and suffix PUR1s may be predetermined for the purpose of constructing a RDN from the FDN, wherein the RDN serves as a naming service/resolution/namespace provider or central authority for further redirection.

Extending Usage of Registered Names

A registered name may serve extended use by adding a prefix/suffix delimiter to augment the original function of the name. For example "name.game" is registered with resolution method "4" yielding the valid URI "http://name.net/game/index.html". In the case where "name.game" is used as indicium to yield a calculated destination address, the indicia may be modified with the following notation: "@name.game", where "@" is a prefix delimiter that designates the use of the "mailto:" protocol. A destination e-mail address becomes an additional field in the registry 154 and/or corresponding name translation database 152. There are other prefix delimiters that may be also used

---

!name.game=paging/instant messaging
@name.game=e-mail
name.game=phone number
*name.game=fax
$name.game=payment
?name.game=WHOIS request
+name.game=ENUM identifier associated to name.game

---

Input parsing 210 may be modified to detect a prefix (or suffix) delimiter so as to determine which destination address to retrieve from the registry 154 or name translation database 152. Extra fields such as e-mail, phone number, fax, RTN/BIN, IRC/ICQ Channel, ENUM identifier, or link to a WHOIS record, etc. may also be included in the registry 154 or name translation database 152 to support the extended use of a registered name. This allows for variations of the same fundamental registered name to expand the functionality of its use. There are reserved symbols from a given character set that are assigned as prefix delimiters. The list of prefix delimiters listed above are only a few examples of extended usage for the purpose of illustration and such delimiters and their corresponding functions may be expanded as needed. In summary, the present invention may process both prefix and suffix delimiters to RDNs, FDNs, and FMDNs. An autosearch template may be established for each prefix and/or suffix delimiter. The template can then be adapted to perform the desired identifier transformations.

The autosearch feature can also be configured to transform an identifier into mathematical arguments that can be processed by a calculator program or Java applet. For instance, the identifier "?((3+5)*(6−2))/4" can be passed to the autosearch and determined that the identifier is a mathematical calculation. The "?" is detected and a corresponding "calculation" template can be used to pass such operators and arguments to a calculator function, procedure, script, program (including the MS calculator program in accessories) and the like and present the result (in the case the answer is 4) in the location field, browser window, etc. Furthermore a URI can be constructed by converting operators and arguments of a mathematical calculation into name/value pairs that can be passed through to a Java applet or CGI script and the like. In effect, the calculator template enables the location field of a network navigation device to also function as a calculator eliminating the need for operating a separate program or command line and the like.

As discussed, the autosearch can be configured to process such prefix/suffix delimiters with any identifier before DNS resolution. For example, the identifier "+1-216-555-1212" can be passed to the autosearch and determined that the identifier is an E.164 identifier. The ENUM can be transformed into either the FDN "1.216.555.1212" and/or the RDN "2.1.2.1.5.5.5.6.1.2.1.e164.arpa" for DNS resolution.

Figure 18:
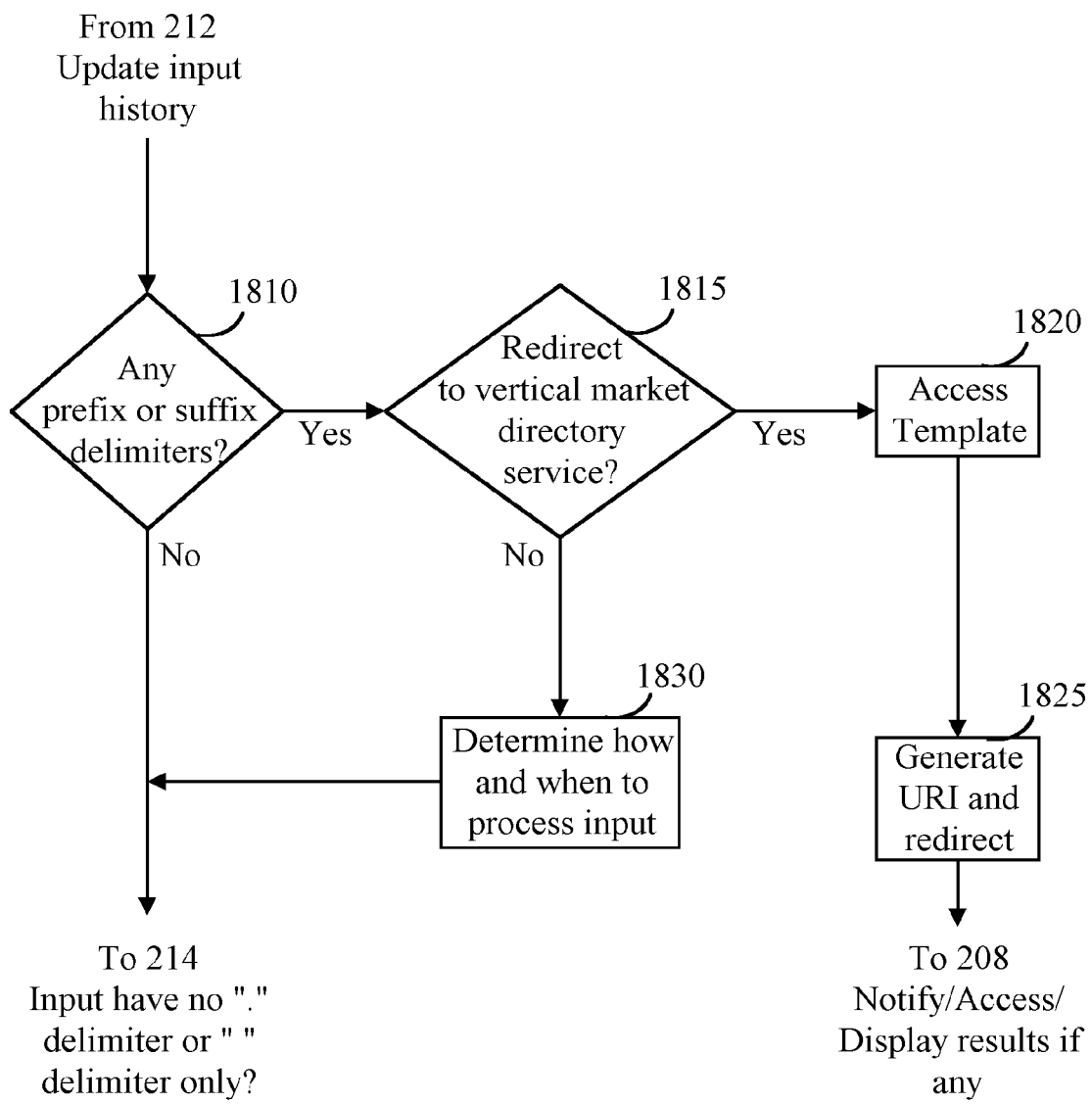
FIG. 18 is a flowchart illustrating the steps performed for processing a prefix or suffix delimiter in accordance with the present invention.

FIG. 18 illustrates the steps for processing detected prefix/suffix delimiters. After input is read and parsed in step 210, it may be determined in step 1810 whether the parsed input includes any prefix or suffix delimiters. If there are no such delimiters then processing is continued in step 214. However, when there is such a delimiter it may further be determined in step 1815 whether the input is redirected to a vertical market directory service (as discussed earlier). If so, then a corresponding template 162 may be accessed in step 1820 to generate and redirect to a valid URI in step 1825. Results, if any, may then be either notified, accessed, and/or displayed in step 208. When input is not redirected to a directory service (step 1815), then it may be determined in step 1830 how and when to process input with continued processing in step 214.

Distribution of Indicia

As discussed, generated URIs may serve as a control point for an entity to track demographics, accounting data, or display targeted advertising to a user before redirecting the generated URI to a final destination. For instance, an entity that controls the domain name "united.st" may distribute indicia such as fictitious domain names through different media sources. The entity may advertise "united.states" on television, "united.steel" in the newspaper, "united.stores" on the radio, or "united.stamps" on the Internet. All such indicia may be calculated to generate unique URIs that are resolvable through the "united.st" domain and at the same time measure response rate per media to determine market share and effectiveness of targeted advertising.

The indicia is not limited to being advertised as readable characters but may be used for automated retrieval by encoding such indicia as machinereadable but practically indiscernible by most humans such as a glyph, or onedimensional or a two-dimensional bar code. Examples of one-dimensional bar codes include, but are not limited to, 3 of 9, UPC-A, Code 128, Codebar, MSI, Extended 3 of 9, Code 93, Extended Code 93, Industrial 2 of 5, Standard 2 of 5, Code 11, and UCC/ EAN-128. Examples of two-dimensional bar codes include, but are not limited to, Data Matrix and PDF417. The indicia may also be printed to be invisible to the end user but readable by an input device such as an optical reader. If desired, the indicia may be selected to be readable by more than one type of data reader. For example, printed data may be printed with a magnetic substance, such as magnetic ink, so as to be readable by both an optical reader and a magnetic reader.

Preferably, the data reader or input device includes an optical imaging reader such as a page scanner, a photograph reader, a business card reader, a scanning wand, a reader in a fax machine, a linear CCD (charge coupled device) reader, or a two-dimensional CCD reader. In response to receiving the indicia, the network access apparatus 110 links and establishes a network connection 116 to the resource. The network access apparatus 110 receives content from the resource, and displays at least a portion of the content on a display device.

Extending Usage of Available Names

InterNIC's glossary defines domain name space as the sum total of domain names that currently represent networks and computers, as well as all of the possible domain names—not yet in use—which may potentially represent networks and computers. This means that registered domain names are only a part of the total domain name space. This definition of name space also includes the universe of domain names that do not exist as of yet.

Consider the heated political debates with respect to the so called depletion of ".com" and the struggle of lobbying for the addition of more gTLDs to the DNS (e.g., ".info", ".store", ".web", ".arts", ".rec", etc.). In Fall of 1997 after years of speculation, it was expected that seven new gTLDs were to be added to the DNS in March of 1998 when the NSI contract was to originally have expired. As a result of this expectation, web sites offered pre-registration services by allowing a user to register potentially new domain names to be stored in a queue with a registration submission form forwarded on a first come first serve basis to a registrar in the event of new gTLD availability. This "pre-registration" is equivalent to the registration of a fictitious domain name demonstrating that there is at least some application for registering domain names that are not resolvable or do not yet exist.

As discussed, this invention finds immediate utilization for domain names that are not resolvable or that do not yet exist. For instance, "example.info" may be registered as a FDN. In the event, that ".info" becomes accepted as a resolvable TLD in the future then secondary use may be derived from this invention by submitting the name on behalf of the registrant at a future date to the new ".info" registry. By demonstrating plural use of the invention it is shown that there is no need for potential registrants to wait for the approval of more TLDs in the DNS by currently registering a FDN that (is a prospective RDN) may become a RDN at a later date.

Figure 19A:
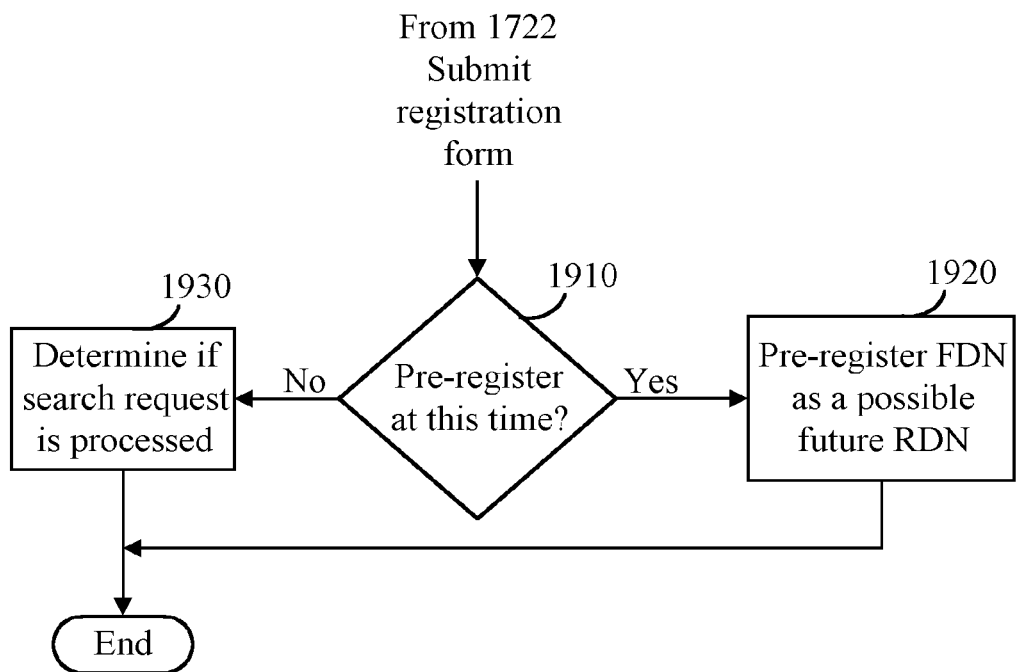
FIG. 19*a* is a flowchart illustrating the steps performed for preregistering a registered FDN as a prospective RDN in accordance with the present invention.
Figure 19B:
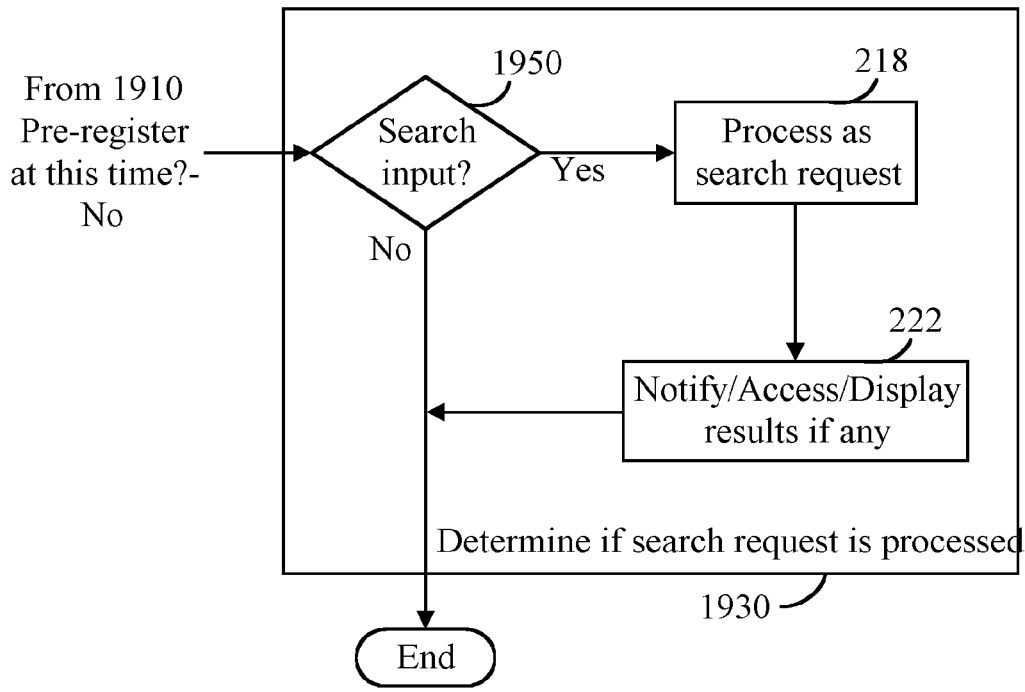
FIG. 19*b* is a flowchart illustrating the steps performed for further integrating registration services with search services in accordance with the present invention.

FIG. 19a illustrates the additional optional step of pre-registering a FDN as a possible RDN. After the registration form is successfully submitted in step 1722, it may be determined in step 1910 whether to pre-register the FDN as a potential RDN at this time. If so, then the FDN is pre-registered in step 1920 as a possible future RDN. If not, then it may be determined in step 1930 whether a search request is processed. Though not illustrated, please note that step 1930 may also be performed after step 1920. FIG. 19b illustrates whether a search request is processed (step 1930). More specifically, it is further determined in step 1950 whether received input 210 is to be processed as a search request in step 218. When this is the case, a search request is constructed from the identifier (e.g., domain name) and processed in step 218 and results, if any, are then notified, accessed, and/or displayed in step 208.

Figure 20A:
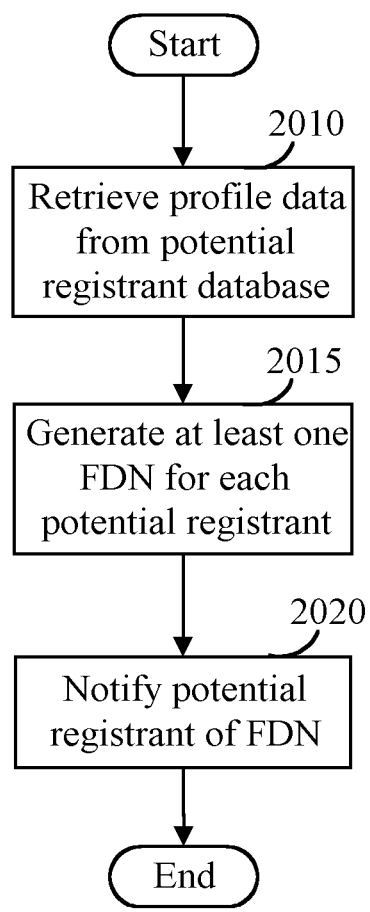
FIG. 20*a* is a flowchart illustrating the steps performed for providing potential registrants with personalized FDNs in accordance with the present invention.

FIG. 20a illustrates the steps for distributing generated FDNs to potential registrants. Profile data is retrieved in step 2010 from the potential registrant database 165 and a least one FDN is generated in step 2015 for each potential registrant. Potential registrants may then be notified (via phone, mail, e-mail, CATV, or the like) in step 2020 of FDN availability. To encourage the immediate use of TLDA name registration, indicia such as a FDNs having a TLDA are generated, sent, and sold to potential registrants via e-mail, postal mail, and other methods of delivery. These TLDA names may be targeted or personalized to the potential registrant based on knowledge of geographic, demographic, or psychographic data. For instance, it is known that John Doe from 123 Coventry Rd. of Smithtown has a pizza shop and likes fine wine. FIG. 20b illustrates an example of how to incorporate John Doe's reserved TLDA names to better target user response of sent correspondence via letter, postcard, fax, or e-mail, telephone, television, etc. to introduce the benefits of the TLDA name experience. Adjacent to the TLDA name is machine-readable code 2030 that may be used to access the Internet for registering the TLDA name.

Figure 20C:
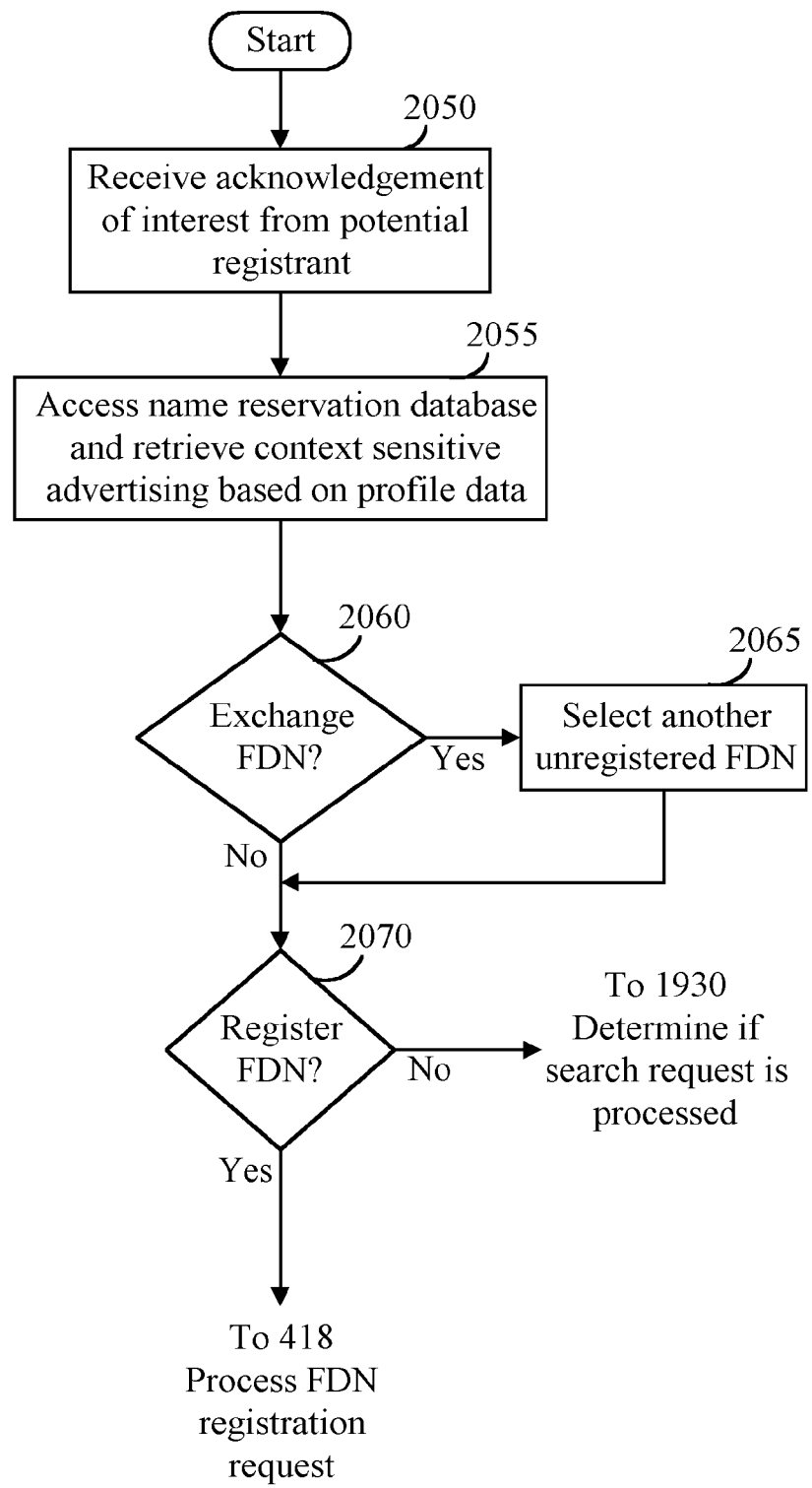
FIG. 20*c* is a flowchart illustrating the steps performed for exchanging and/or registering a received FDN in accordance with the present invention.

FIG. 20c illustrates how FDNs are registered in response to distributing FDNs to potential registrants. Acknowledgement of interest is received in step 2050 from potential registrant via telephone call, a hyperlink, accessing machine readable code 2030, interactive television, or the like. A name reservation database 164 may be accessed in step 2055 to retrieve context sensitive advertising from the advertising cache 166 based on profile data that may also be stored in the name reservation database 164 or accessed from the potential registrant database 165. It may then be determined in step 2060 whether the potential registrant wishes to exchange the FDN for another. If so, an unregistered FDN is selected in step 2065. After selection or when no exchange is desired, it is then determined in step 2070 whether the potential registrant will register the FDN. If so, then the FDN is processed in step 418 as a registration request otherwise it is determined in step 1930 whether a search request is processed.

A telephone call may be made to notify a potential registrant of this available FDN. Suggestive selling provides the possibility to facilitate the friendly introduction to first time users of the Internet experience. The generated name might not be a first choice, but may be used to attract the user to learn more about the versatility of how FDNs can be used as identifiers such as trademarks. This offer also allows the user to redeem their generated name in exchange for one selected by the user. When a TLDA name is redeemed via telephone or web page, a name reservation database 164 may be accessed to identify who the potential registrant is and unique advertising messages 166 may be displayed in conjunction with standard content which guides the registration process based on the potential registrant's user profile derived from geographic, demographic, and psychographic data.

Figure 21A:
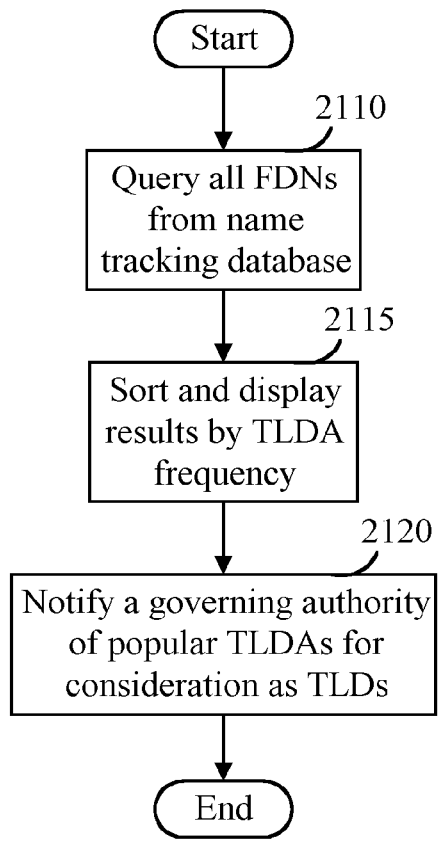
FIG. 21*a* is a flowchart illustrating the steps performed for notifying a naming authority of possible future TLDs in accordance with the present invention.

Further uses may be derived from both registered and unregistered FDNs. FIG. 21a illustrates how query results from the name tracking database may be used. A name tracking database 160 (or server logs) is queried by TLDA in step 2110 to rank the most frequently requested TLDAs. For instance, the query may show that there are 80,000 requests for an FDN having a ".web", 60,000 for ".info", and "50,000 for ".store" within the last month. The results of such query are sorted and displayed in step 2115 and may be used as survey data to promote statistics of what TLDAs may become possible TLDs in the future due to popular demand. This is accomplished in step 2120 by notifying a naming authority (e.g., ICANN or IANA) of popular TLDAs that may be considered as future TLDs.

Figure 21B:
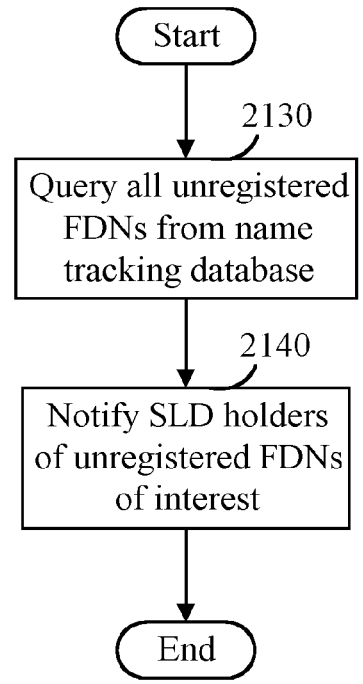
FIG. 21*b* is a flowchart illustrating the steps performed for notifying SLD holders of unregistered FDNs of interest in accordance with the present invention.

Another use is illustrated in FIG. 21b, unregistered FDNs from the name tracking database 160 may be queried in step 2130 by frequency to determine public demand of popular web sites that have not yet been registered to authorize URI generation from a FDN. Competing SLD holders are notified in step 2140 of unregistered FDNs that may be of interest. The results of such a query may be used as sales leads to contact companies and educate them about how TLDA names can be used for advertising, branding, market segmentation, and product differentiation.

Figure 21C:
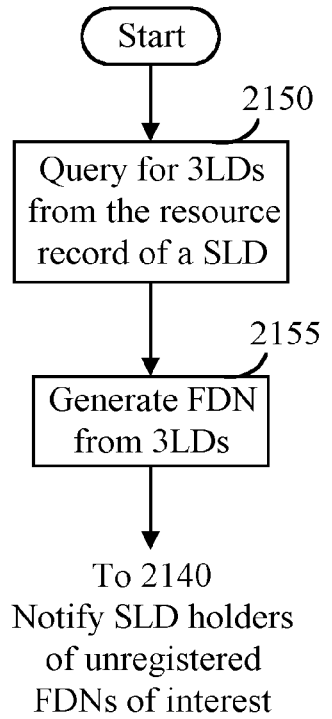
FIG. 21*c* is a flowchart illustrating the steps performed for generating FDNs from 3LDs of SLD holders in accordance with the present invention.

FIG. 21c illustrates another way of how FQDNs may be generated and promoted. The DNS resource record of a SLD holder is queried in step 2150 to determine what 3LDs, if any, exist for each SLD. For instance, it is determined that 3LDs such as "sports.cleveland.com" and "classifieds.cleveland.com", etc., are found when "cleveland.com" zone files are queried. TLDA names or FDNs such as "cleveland.sports" and "cleveland.classifieds" may then be generated in step 2155 from these results and such information used as sales leads for contacting each respective domain name holder and provide a personalized demonstration of how TLDA names can be used. Once again, competing SLD holders may be notified in step 2140 of unregistered FDNs that may be of interest. To the user, TLDA names simplify Internet navigation. To the corporation, TLDA names makes it simpler to promote their companies and brands on the Internet.

Figure 22:
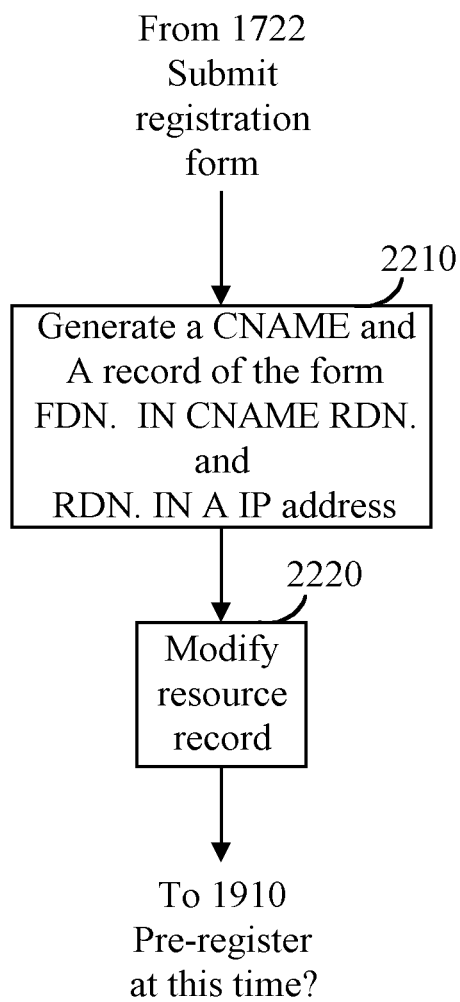
FIG. 22 is a flowchart illustrating the steps performed for emulating RDNs with FDNs in accordance with the present invention.

Similar to how (name space) RDNs provide a (topology or layer) mapping to IP addresses (address space), FDNs constitute a FDN space 286 that serves as a (mutually exclusive) separate topology (or name space) that may be applied to or layered on top of the existing RDN space 285 (topology) now in use. Because each and every point of RDN space can be mapped without conflict in FDN space, those skilled in the art can also modify the browser program 112 to have a FDN persist in the location field 134 instead of displaying the mapped RDN as a result of URI redirection. One example of such modification is illustrated in FIG. 22. After a registration form is successfully submitted in step 1722, a "(NAME" record of the form "FDN. IN CNAME RDN." (and "A" record) may be generated in step 2210 for insertion next to an "A" record of the form "RDN. IN A IP address". For example, the FDN "name.game" is registered to the SLD holder of "name.com" at IP address "31.141.59.26". The following "CNAME" and "A" record may then be generated:

name.game. IN CNAME game.name.com.
game.name.com. IN A 31.141.59.26

The DNS resource record 124 may be modified in step 2220 to either manually or automatically include the generated "A" and/or "CNAME" records from step 2210. An "A" record may already exist and not need to be added. After the appropriate records are added, the choice of pre-registration is determined in step 1910. The addition of these records can assist in enabling the location field to allow the FDN "name.game" to persist as an alias to the canonical name "game.name.com". This further supports name space emulation by having the FDN "behave" similar to that of a RDN, hence RDN emulation through FDNs become supported directly in the browser location field 134 rather than only through the frame of a web based location field 514.

For instance, "name.game" is entered in the location field 134 of a web browser 112 and input is determined to be a registered FDN. An aspect of the present invention translates the FDN by TLDA rotation method, which is used by default to generate the RDN "game.name.com". The RDN is resolved by accessing the resource records 124 stored at "name.com". The resource records 124 validate that "name.game" is an alias to "game.name.com" and retrieves the corresponding IP address and returns the address back to the browser 112. A connection is established to the server, to access the fictitious URI "http://name.game" from the IP address corresponding to the RDN "game.name.com". Minor modifications may be needed to the browser program 112 or resolver library 114 to assure full support of such emulation.

Those of ordinary skill in the art may make and use a computer program product separate from all others. In addition, the program may be integrated as part of an API, operating system, or plug-in/add-on for a web browser 112. Such a program may be downloaded and installed for integration into the command line of a device or location field 134 of a browser program 112. In addition, such a product may be combined with other plug-in products (e.g., NeoPlanet, RealNames, Netword, NetZero, ICQ, AIM, I-DNS, WAL1D, Quick Click, Google, etc.) to offer additional functionality and to more quickly reach an existing customer base. Program installation may be activated in response to accessing a web site or any resource corresponding to a URI.

Modifying the source code of the browser program 112 itself or as (e.g., Windows, Linux, NT, UNIX, MAC, etc.) may be more desirable, in effect, enabling tens or hundreds of millions of users to take advantage of more creative ways to use indicia such as FDNs as a means to access a valid URI. For any of the above implementations, HLD resolvability may be determined before, during, and/or after DNS resolution on the client side, server side, or at any point at any point on a network including at a peer-to-peer machines, proxy servers, firewalls, hubs, routers, resolvers (e.g., DNS resolvers, RealNames resolvers, Netword Resolvers, UDDI resolvers, etc.), and nameservers, etc. In addition, the step of HLD resolvability may further reside in hardware, software and/or firmware (e.g., network card, BIOS, adapter cards, etc.). HLD resolvability may be determined before processing a name resolution request or in response to determining that the domain name is unresolvable.

MSIE browser (or other programs that use the MSIE shell) may forward an identifier having an unresolvable domain name or FDN to the autosearch feature for further processing. Instead of prompting the client browser 112 to display an error message, the identifier may instead be processed by the autosearch and/or routed to another naming service provider for further processing. For example, such input may be routed to a FDN registry or to a FDN translation service in operative association with a RealNames server and/or similar resolver and the like. Modifications may be made to the script/program/template running the autosearch that generates the "response.asp" web page on the server "auto.search.msn.com" to enable FDN processing and/or processing a search request having the FDN or unresolvable domain name.

An extra template 162 may be created and used in the registry of the MSIE autosearch feature. When the "auto.search.msn.com" server detects that the request includes a TLDA, the extra template may be used as a means to access an authorization database, registry, name translation database, or "GO LIST", to determine how to generate a valid URI that corresponds to the received FDN having a TLDA. By using an extra template 162, the browser program does not have to be modified, thereby eliminating distribution costs for a browser version update. Currently, the resolution of MDNs require a client browser plug-in to intercept the MDN before reaching the DNS for name resolution. MSIE autosearch feature is not equipped to process MDNs. An extra MDN and FMDN template may be added to the registry of the MSIE autosearch feature to enable MDN and FMDN processing in response to unsuccessful DNS resolution. For instance, when a registered FDN (e.g., "aol.love") is processed by MSIE and determined to have a TLDA, an extra name/value pair is passed generating the following URI:

"http://auto.search.msn.com/response.asp?MT=aol.love&srch=3&prov=utf8&authorize=tlda.com"

A specific template is accessed when the name/value pair "authorize=tlda.com" is parsed and passed as a variable. The fictitious domain name is inserted into the accessed template to generate the URI:

http://www.tlda.com/cgibi n/tlda/authorize.cg i?name=aol.love&refer=msie

The accessed URI will authorize that "aol.love" is a registered FDN name and retrieve "TLDA rotation" as the resolution method and retrieve ".com" as the resolvable TLD, to generate the valid URI, "http://love.aol.com". The browser is immediately redirected to the valid URI upon generation. The name/value pair "refer=msie" is parsed and passed as a variable to determine the source of the URI redirection for the purposes of billing, tracking, and accounting. Other name/value pairs can also be passed to determine whether the output is redirected to registration services, resolution services, and search services, alone or in any combination thereof. In the event that "aol.love" is not authorized and remains an unregistered FDN then the FDN may be inserted into another template to generate the URI:

http://www.tlda.com/cgi-bin/tlda/register.cgi?name=aollove&refer=msie

The browser may then be immediately redirected to the valid URI upon generation. Other templates 162 may be included and used for processing prefix/suffix delimiters, URI redirection from SLD or HLD (e.g., "acme.", ".net", or ".sports") to a corresponding vertical market directory service, using a TLDA as a customized search term (e.g., TLDA Query), using a template for each resolution method, and creating a user definable template in conjunction with specified component data at the time of registration or thereafter.

One method of implementation does not rely upon a TLD registry and instead a template may be made to use ".com" as a default TLD and use TLDA rotation or TLDA Query as a resolution method for valid URI generation. The template 162 may be distributed as part of a client and/or server side script to simplify name translation and not rely on any kind of registration. Though the template 162 does not need to rely upon an authorization database to generate valid URIs from FDNs, it is preferred that the minimum of a "GO L1ST" is used to track and acknowledge name translation. Furthermore, entries of other gTLDs, may be added to override the concatenation of a default ".com" with ".edu", ".gov", ".int", and ".mil" instead. For instance, when the FDN "uspto.5987464" is received as input, an override is detected from the "GO L1ST" and ".gov" is used instead to construct a URI to access U.S. Pat. No. 5,987,464 from the "uspto.gov" web site instead of and/or in addition to accessing information from "uspto.com". Other override entries may include method number/template number. In addition, the "GO L1ST" may be constructed in a manner similar to DNS resource records including time-to-live (TTL) values, etc. By so doing, updates may easily be propagated in a distributed system.

In one aspect of the present invention, name tracking databases, name translation databases, or registries may be centrally maintained and updated through redundant servers. The data structure of such information may be stored as metadata (e.g., XML) or in any other format to allow integration of such data with the data managed by other naming service providers. Through Application Programming Interface (API), naming service providers can communicate with such resolvers, registries, and/or databases. Furthermore, access can be both platform and language independent. For instance, the TLDA registry can be accessed through any gateway such as Mobile Access Gateway. All requests may be routed to a NAPTR RR, SRV RR, or round-robin DNS for the purposes of distributing bandwidth and load balancing across a server farm. The server farm may include dedicated servers for each database or parts of a single database that operate in parallel to assure high throughput. In other aspects the name translation databases or registries may be maintained and updates propagated in a distributed hierarchy similar to that of the DNS.

The name tracking database may be enhanced by combining the data from the name translation database and storing it at the Internet Service Provider (1SP) level to act as a distributed cache for minimizing bandwidth of server requests across the backbone of the Internet. The enhanced name tracking database may also be distributed as a client side cache for even quicker access, particularly when the network is unstable or unreliable causing retrieval delays, or when a network connection is lost. A method for distributing the enhanced name tracking database is to divide the database into zone files by truncating the TLDA. For instance, FDNs "united.states" and "top.stories" may be provided from a "ST" zone file that is maintained by an authorized ISP. There are 676 two-letter zone files (zone files may be adapted and distributed to account for numeric symbols or symbols from other character sets accordingly) that may be distributed around the globe and updates may propagate through the FDN registry system similar to that of the DNS. In addition, such FDNs may be distributed by total character length of the FDN. For example, "united.states" may be stored in and provided from a "13 character" zone file whereas "top.stories" may be stored in and provided from an "11 character" zone file.

This invention may be implemented in networks and distributed systems of varying scope and scale. The registry, registration records, name translation database, or name tracking database may be located at separate sites and separate computers in a large distributed system. However, the various servers and clients described may actually be processes running on various computers and interacting to form a distributed and/or peer-to-peer system. In smaller implementations, some or all of the various servers described may actually be processes running on a single computer. All such components of the fictitious domain identifier system are robust, secure, and scalable. Security methods including authorization techniques may be applied to all information records in the system including registries and DNS resource records.

Pre-navigation methods may also be applied to FDN detection techniques. Improvements may be made to the autosearch and/or browser, for example to try and apply such FDN techniques in yet earlier steps or in later steps. There may further be included any number of other steps that may be performed between the step of determining a domain name is fictitious and processing the FDN such as requesting a network resource or performing a registration request and/or search request. In effect, FDN detection may occur before any validity tests and after failed DNS resolution requests, for example.

The present invention is by no means limited to only process FDNs form a navigation request or network resource request. Other request types such as processing FDNs in a search request are provided in U.S. patent application Ser. No. 09/598,134 filed Jun. 21, 2000, by Schneider, entitled "Method and apparatus for integrating resolution services, registration services, and search services." FDNs may be integrated with search services in accordance with the present invention. For instance, when it is determined that the search request does not include a registered phrase or keyword, then it may further be determined whether the search request includes a FDN, by consulting a registry 154. When the request is determined to include a FDN, it then may be determined whether to perform a search request with the input as a literal string. Search results may be retrieved. A search request may be initiated by selecting an exact phrase option from a listbox or surrounding the FDN with a delimiter such as the quote sign (e.g., "top.stories") to process the detected FDN as a literal string, otherwise a FDN detected from input may be processed as a registration and/or resolution request. When it is determined that the input is instead processed as a resolution and/or registration request, then the resolvability and/or availability of the FDN may be determined.

To date, wildcard RR redirection in TLD zone files has only been used for the purpose of enabling a TLD registry to also become a registrar and provide domain name registration services. U.S. patent application Ser. No. 09/682,133 filed Jul. 25, 2001, by Schneider, entitled "Method, product, and apparatus for requesting a network resource" teaches how to create a market driven registrar competition across all TLDs (e.g., ccTLDs, gTLDs, alternative TLDs, and the like) by providing wildcard redirection, particularly in a gTLD zone file.

An emerging economy of names has created a politically controlled TLD space due to the technical constraint of the DNS having a single authoritative root. Though alternative roots have surfaced to provide alternative TLDs, such services are criticized by supporters of the root that such implementations disrupt the DNS and fragment the Internet. A wildcard RR has until now never been added to the root zone file of the authoritative root server of the DNS or of any other alternative root system. By adding a wildcard RR, all domain names that do not have a resolvable TLD (e.g., any domain name having a TLDA) can be redirected to a TLDA resolver 168 and/or registry 154 to determine how to further resolve the domain name identifier. An infrastructure domain such as "tlda.arpa" can be used for redirection as will be shown.

Figure 23A:
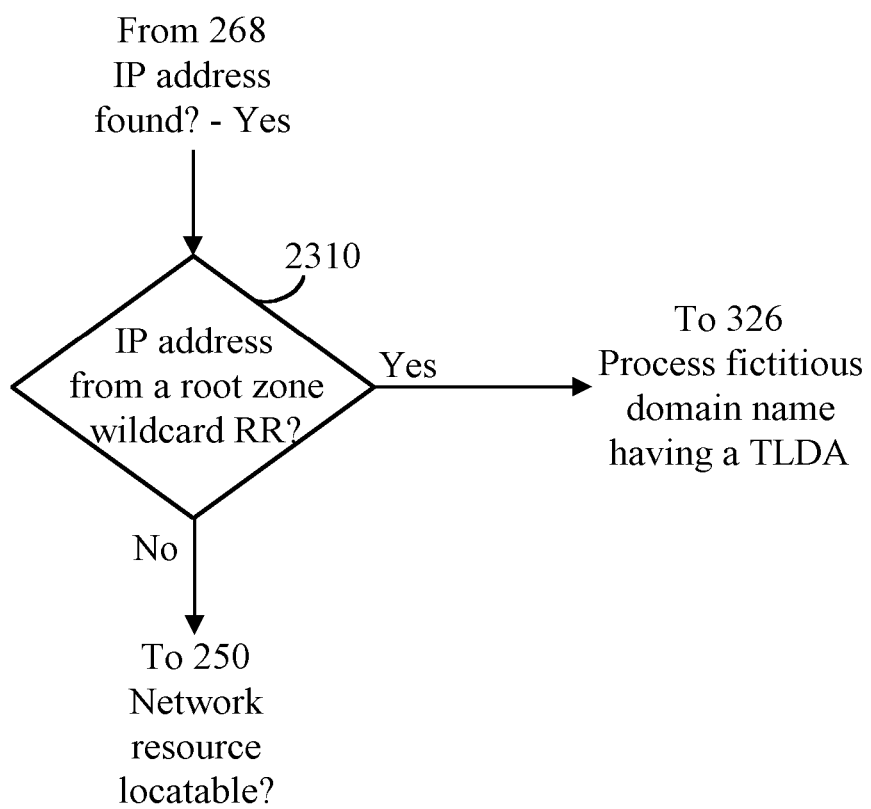
FIG. 23*a* illustrates the steps performed for determining a redirection method in response to detecting a wildcard resource record in accordance with the present invention.

FIG. 23a illustrates the steps performed for selecting a resolution method in response to detecting a root zone wildcard resource record in accordance with the present invention. When an IP address is found in step 268, it is determined in step 2310 whether the IP address was retrieved from a wildcard resource record. If not, it is determined in step 250 whether a network resource can be located from the found IP address. When an IP address is retrieved from a wildcard resource record, a network resource corresponding to a RDN such as a VDN having a resolvable TLD or an IP address can be adapted to determine which naming service/registry /namespace provider can resolve the FDN having a TLDA. This determination can be made automatically based on any combination of parameters including configuration settings, metadata, user preferences, past history, currently available resources, and the like. If need be, the option of determining a resolution method may be provided enabling a user to select at least one namespace provider from a plurality of namespace providers.

FIG. 23b presents an exemplary file in accordance with the present invention of a root zone file having a wildcard resource record. The root zone file 2315 includes the addition of a wildcard RR 2320 for the purpose of redirecting domain names having a TLDA (that would otherwise be considered fictitious) to a market driven namespace provider system, in this case through the infrastructure domain "tlda.arpa". For instance, when the above root zone file 2315 is queried to resolve "name.game", it is determined that there is no TLD called ".game". The wildcard RR is detected and passes the query value of "name.game" to a server labeled "tlda.arpa". In effect, the wildcard RR treats the query as resolvable and redirects "name.game" to "tlda.arpa" for further processing such as namespace resolution and/or registration services through a TLDA Registry or licensed Metaregistry. Namespace providers may register to participate in FDN resolution by providing API resolver parameters, delimiter mappings, namespace mappings, Namespace ID, or any other parameters that can transform FDNs having a TLDA into the sponsored namespace managed by the provider. For instance, RealNames can participate by registering their Unified Resolution and Discovery Protocol (URDP) resolver service and Microsoft can participate in registering their Universal Directory, Discovery and Integration (UDDI) system to receive and process FDNs detected during DNS resolution, for example.

There are many namespaces (e.g., multilingual names, fictitious domain names, ENUM, Credit Card Numbers, domain number system (DNUMS) (e.g., a numerical identifier system adapted for telephone keypad having "*" and "#" delimiters in place of "." and "/" delimiters of the URI), URNs, etc.) that serve as a layer to the DNS. The relationship of these different naming systems may be looked at as a hub and spokes, wherein the DNS serves as a hub with each namespace in relationship to the DNS serving as a spoke. These namespaces may now be accessed as a result of root zone wildcard redirection. The domain name "tlda.arpa" may serve as a wildcard gateway/portal (also called a primary zero level domain) to determine what type of redirector string or Secondary Virtual ZLD (SVZLD) may be used/accessed, if at all, to resolve other namespaces within the DNS. The Primary Zero Level Domain (PZLD) is in operative association with a network resource adapted to determine how to process the detected domain identifier having a top level domain alias.

Figure 24:
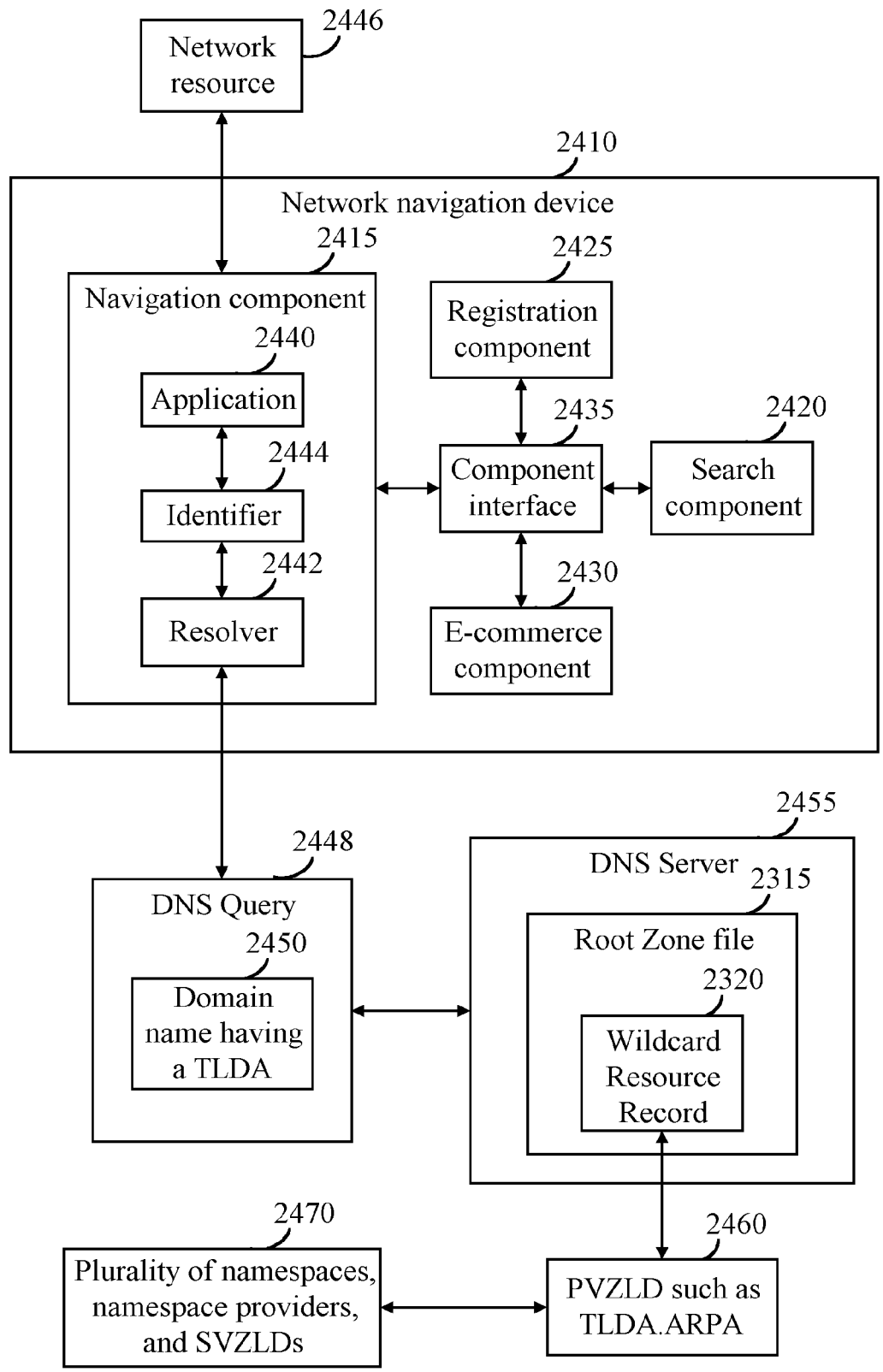
FIG. 24 illustrates a block diagram of a network navigation device in communication with a DNS server in accordance with the present invention.

FIG. 24 illustrates a block diagram of a network navigation device in communication with the DNS server. A network navigation device 2410 includes multiple components such as a navigation component 2415, a search component 2420, a registration component 2425, a e-commerce component 2430, and a component interface 2435 in operative association with the above or any other components. Each component may include an open API (not shown) for interfacing with any combination of other device and/or other components. The navigation component further includes sub-components such as an application 2440, a DNS resolver 2442, and a resource identifier 2444 stored in component memory. To locate and/or access a network resource 2446 from the identifier 2444, the navigation component passes the identifier 2444 from the application 2440 to the resolver 2442. The identifier includes a domain name having a TLDA 2448. The resolver 2442 provides a DNS query 2450 with the domain name having a TLDA 2448. A hierarchy of nameservers in the DNS system 120' are successfully queried until an authoritative DNS root server 2455 is accessed. The DNS server 2455 includes a root zone file 2315 having a wildcard resource record 2320. The wildcard RR 2320 redirects all domain name having TLDAs 2448 to a network resource 2446 corresponding to a Primary Virtual Zero Level Domain (PVZLD)

2460 such as the infrastructure domain "tlda.arpa", which manages and brokers FDN requests across a plurality of namespaces, namespace providers, and secondary virtual zero level domains (SVZLDs) 2470. The namespace provider is a naming authority to at least one SVZLD and the PVZLD is adapted to redirect to at least one SVZLD in response to the resolved DNS query including the domain name having the TLDA.

In other configurations, the network navigation device 2410 includes a navigation component 2415 that attempts to complete a navigation request from an identifier 2444 and a search component 2420 adapted to generate a non-search request from at least a portion of the identifier 2444 in response to the navigation component 2415 that can not complete the navigation request. Furthermore, the network navigation device 2410 includes a navigation component 2415 that receives a navigation request having an identifier 2444, a search component 2420 that intercepts the identifier 2444, the search component 2420 adapted to determine that the identifier 2444 includes a FDN and generate a search request from at least a portion of the identifier 2444 having the FDN.

The use of the root zone wildcard eliminates the need for client systems to intercept a received identifier before reaching the DNS or further process the received identifier in response to a DNS error upon resolving the identifier. Because the wildcard can be used as a means to access other alternate roots, the single authoritative root can remain unified but yet have a synergistic relationship to alternative roots that participate in communicating with the PZLD also known as the primary virtual ZLD (PVZLD), or authoritative ZLD/absolute ZLD (AZLD). The wildcard RR used as a PZLD restores the intended purpose of the DNS by creating a unified global public infrastructure with respect to itself and, in addition, to other naming systems.

At least a portion of the registration request can be processed from a search function such as the autosearch. Autosearch templates may be adapted to determine the availability of registration in response to generating many identifiers across many naming systems. The registration request can be processed in response to determining that the network resource can not be accessed. A network resource that can not be accessed can be determined by attempting to access the network resource from the identifier and determining that the access attempt is unsuccessful or by determining whether the network resource can be located. A network resource that can not be located can be determined by attempting to locate the network resource and determining that the location attempt is unsuccessful or by determining whether the domain name is resolvable. Network bandwidth required to determine that the network resource can not be accessed/located can be minimized. Network bandwidth required to determine whether a domain name is resolvable can be minimized.

The present invention includes a method for determining that an identifier includes a fictitious domain name (FDN) and requests a network resource from at least a portion of the identifier. FDN can include the step of determining that the identifier includes a domain name that is not a valid domain name (VDN) or determining that the identifier includes a domain name having at least one domain level alias or determining whether the HLD of the FDN is resolvable. HLD resolvability can include the step of comparing the HLD to a list of resolvable top level domains (TLDs) without processing a DNS query, comparing the HLD before processing a DNS query, comparing the HLD while processing a DNS query, and comparing the HLD after processing a DNS query.

HLD can be compared before and/or after processing the DNS query by performing at least a portion of the step of comparing the HLD to the list of TLDs with a search function such as an autosearch. HLD can be compared during the DNS query by comparing the HLD to the list of TLDs in one of a root zone file and zone file cache. HLD that is determined resolvable is a TLD and the HLD that is determined not resolvable is a top level domain alias (TLDA). A valid domain name (VDN) having a resolvable TLD is a real domain name (RDN).

It can be determined whether the HLD is multilingual in response to determining that the HLD is not resolvable by determining whether the HLD is a representation of a resolvable TLD, wherein the representation of the HLD is denoted in a character set other than that of a limited 7-bit ASCII character set. HLD that is determined a representation of a resolvable TLD is a multilingual top level domain (MTLD) and the HLD that is determined not a representation of a resolvable TLD is a multilingual top level domain alias (MTLDA). A domain name having the MTLD is a real multilingual domain name (RMDN) and the domain name having the MTLDA is a fictitious multilingual domain name (FMDN). A RMDN can be generated from the FMDN.

Requesting the network resource from the identifier can include the step of accessing the network resource from the identifier. Accessing the network resource from the identifier can include the step of locating the network resource from the identifier. Locating the network resource from the identifier can include the step of determining whether the FDN from the identifier is resolvable in the domain name system (DNS). A network resource that can not be located from the first identifier can further include the steps of generating a second identifier and locating the network resource from the second identifier. A first identifier that includes the FDN can also include the steps of generating a second identifier and locating the network resource from the second identifier.

Generating the second identifier can include the step of updating a name tracking database with one of a first identifier and second identifier or determining whether the step of generating the second identifier is authorized by comparing the first identifier to one of a template, GO LIST, authorization table, name translation table, and registry. It can be determined whether to register for authorization in response to determining the step of generating the second identifier is not authorized. The first identifier can be registered as a FDN or FMDN for authorization when registration is chosen, and the step of determining whether to process a search request when registration is not chosen. The first identifier can be registered as a FDN or FMDN includes the step of determining whether to include the FDN or the FMDN in a directory listing service. The first identifier can be pre-registered as a prospective RDN in response to the step of registering the first identifier as a FDN for authorization. The first identifier can be pre-registered as a prospective RMDN in response to the step of registering the first identifier as a FMDN for authorization. It can be determined whether to process a search request after processing the registration request.

With a first identifier including a FMDN and the second identifier includes a RMDN, a second identifier can be generated by selecting from one of a resolvable TLD, resolution method, and component data. With a first identifier including a FDN or FMDN and the second identifier includes a RDN, a second identifier can be generated by selecting from one of a resolvable TLD, resolution method, and component data. The component data can be one of a namespace identifier, naming authority, namespace provider, resolver service, delimiters mappings, mapping rules, rewrite rules, scheme, host, domain, TLD, port, path, query, fragment, and partial uniform resource identifier (PUR1).

The resolvable TLD can be selected by choosing which resolvable TLD of a table of resolvable TLDs is selected to construct the RDN from the first identifier. A resolution method can be selected by choosing which resolution method from a table of resolution methods. The table of resolution methods can include one of a rotation method, truncation method, replace method, path method, delimit method, reverse method, append method, prepend method, substitute method, query method, custom method, and registry provider method. For example, Custom method can include any combination of rules for in operative association with one or more resolution methods. Such rules may include URN namespace ID, resolver provider, namespace provider, naming service provider, one or more identifiers from another namespace, delimiter mappings, component data ordering, functions, procedures, and recursive resolution.

The second identifier can include one of a predetermined RDN and at least a portion of the first identifier. The predetermined RDN and the at least a portion of the first identifier is one of a subdomain of the predetermined RDN and path of the predetermined RDN. The second identifier can includes at least a portion of the first identifier and one of a PUR1 prefix and PUR1 suffix. The first identifier can be a FDN of the form "SLD.TLDA" and the second identifier is of one of the form "SLD.TLD", "SLD.TLD/TLDA", "TLDA.SLD.TLD", "SLD.TLDA.TLD", "SLD.TLD/A", "SLD.TLD/?query=TLDA", "SLD.TLDA.RDN", "RDN/SLD.TLDA", and "RDN/SLD/TLDA" or a FMDN of the form "SLD.MTLDA" and the second identifier is of one of the form "SLD.TLD", "SLD.TLD/MTLDA", "MTLDA.SLD.TLD", "SLD.MTLDA.TLD", "SLD.MTLD/A", "SLD.TLD/?query=MTLDA", "SLD.MTLDA.RDN", "RDN/SLD.MTLDA", and "RDN/SLD/MTLDA".

Identifier generation can include the steps of determining that the first identifier includes a port alias, determining whether the port alias includes a resolvable TLD, generating the second identifier having the resolvable TLD in response to determining that the port alias includes a resolvable TLD, and generating the second identifier including the port alias as a query in response to determining that the port alias does not include a resolvable TLD. Identifier generation can include the step of generating an identifier for each resolution method from a plurality of resolution methods and can further include the steps of determining the resolvability of all the generated identifiers, filtering all identifiers from the generated identifiers that are determined not resolvable, determining that there are a plurality of unfiltered identifiers, generating a hyperlink for each the unfiltered identifier, and presenting each the generated hyperlink.

A first identifier can include a TLDA having a postal code and the step of generating the second identifier includes the steps of determining whether to process the postal code as a TLDA or search request, generating the second identifier including the postal code as a query in response to determining that the postal code is to be processed as the search request, retrieving from a postal code database one of a resolvable country code top level domain (ccTLD) and at least one subdomain corresponding to the postal code in response to determining that the postal code is to be processed as the TLDA, and generating the second identifier by replacing the TLDA of the first identifier with any retrieved subdomains and the ccTLD. The first identifier can include a TLDA having a zip code is of the form "host.tlda" and the step of generating the second identifier includes the steps of retrieving from a zip code database at least one city and state corresponding to the zip code and generating an identifier for each retrieved the city and the state by replacing the TLDA with the city, the state, and a ".us" ccTLD, wherein each the second identifier is of the form "host.city.state.us". The first identifier can include a TLDA having a postal code and a port alias having a ccTLD and the step of generating the second identifier includes the step of selecting the ccTLD from the port alias.

Second identifier generation can include the step of retrieving information from one of a user modifiable configuration settings, template, GO LIST, name translation table, and registry. Retrieving information from the user modifiable configuration settings can include selecting a next step to be performed from one of a determining whether to generate the second identifier for each possible resolution method, determining whether to process a detected port alias, determining whether to process a detected postal code as a TLDA or search request, determining whether to select a resolvable TLD from a default resolvable TLD or table of resolvable TLDs, and choosing which resolution method from a table of resolution methods. Second identifier generation can include the step of accessing the template from a search function such as an autosearch. The templates can include at least one of a namespace template, redirection template, prefix template, identifier generation template, identifier registration template, resolver selection template, resolution method template, calculator template, and numerical identifier template (such as an ENUM/ISBN/UPC template).

Requesting the network resource from the second identifier can include the step of receiving content from the network resource corresponding to one of a first identifier and second identifier, wherein the second identifier includes one of a predetermined RDN and at least a portion of the first identifier. The content can include one of a redirect command to a third identifier and advertising corresponding to the first identifier. The identifier can include one of a prefix delimiter, suffix delimiter, and domain name. It can be determined whether to process a search request in response to determining that the identifier does not include one of a prefix delimiter, suffix delimiter, and domain name. It can be determined which operative function to perform corresponding to the identifier in response to determining that the identifier includes one of a prefix delimiter and suffix delimiter. The identifier can be of one of the form ".TLD", ".TLDA", ".MTLD", ".MTLDA", ".XLD.", and "SLD." and the step of determining which operative function to perform includes the step of requesting content from a directory service, wherein the directory service content corresponds to the identifier.

The directory service can be a vertical market portal and the content can include advertising, coupons, rebates, discounts, and branding of products and services that correspond to one of a first identifier and vertical market. The step of determining which operative function to perform includes the step of selecting the operative function corresponding to the prefix delimiter from one of a calculation, page, instant message, e-mail, phone call, fax, payment, and WHOIS request. The identifier can include the prefix delimiter prepended to the domain name, wherein the prefix delimiter is one of a "!" delimiter corresponding to the instant message, "@" delimiter corresponding to the email, "#" delimiter corresponding to the phone call, "*" delimiter corresponding to the fax, "$" delimiter corresponding to the payment, and "?" delimiter corresponding to the WHOIS request. The identifier can be received from a location field and include the prefix delimiter and a mathematical calculation having at least one operator and argument corresponding to the calculation.

It can be determined that the identifier is a E.164 number, accessing an ENUM template from a search function, generating a ENUM domain name from at least a portion of the identifier and the ENUM template, and locating at least one the network resource corresponding to the ENUM domain name. The step of determining that the identifier includes the FDN includes the step of performing at least a portion of the step of determining that the identifier includes the FDN with a search function such as an autosearch. The step of generating the second identifier can include the step of performing at least a portion of the step of generating the second identifier with a search function such as an autosearch. The step of locating the network resource from the second identifier can include the step of performing at least a portion of the step of locating the network resource with a search function such as an autosearch.

It can be further determined whether the identifier is resolvable in response to determining that the identifier does not include the FDN and requesting the network resource from the identifier in response to determining that the identifier is resolvable. The identifier is a first identifier further including the steps of generating a second identifier in response to determining that the first identifier includes the FDN or in response to determining that the first identifier is not resolvable and requesting the network resource from the second identifier. A network resource that can not be accessed in response to requesting the network resource from the second identifier can be processed by a fictitious domain name registration request having at least a portion of one of a first identifier and second identifier.

The FDN can be one of a uniform resource name (URN) FDN, numerical domain name (NDN), real multilingual domain name (RMDN), fictitious multilingual domain name (FMDN), postal code FDN, hybrid domain name (HDN), Keyword Domain Name (KDN), Trademark Domain Name (TDN), and Domain Alias Domain Name (DADN). The NDN is one of a ENUM FDN, SSN FDN, UPC FDN, CC FDN, and ISBN FDN. Processing an ENUM FDN can further include the steps of accessing an ENUM template from a search function, generating an ENUM domain name from the ENUM FDN and the ENUM template, and locating at least one the network resource corresponding to the ENUM domain name. When an ENUM FDN is not a complete ENUM FDN and the step of generating an ENUM domain name from said incomplete ENUM FDN can include the step of completing said incomplete ENUM FDN by retrieving at least one of an ENUM prefix, area code, and local exchange from one of a template, registry, component data, metadata, and configuration settings.

The identifiers can be a uniform resource identifier (URI). The URI can be a uniform resource locator. A search request from the identifier can be constructed, processed, and presented. It can be determined whether to process a search request after processing the registration request. The identifier can be received from internal automation, external automation, activation of a hyperlink, network resource redirection, and input such as a user interface element. Inputting the identifier into a user interface element may include the step of inputting the identifier into one of a browser location field, text box, command line, speech to text interface, optical recognition interface, and magnetic recognition interface. A user interface element may include one of a web page, hyperlink, message box, and prompt and is presented to determine whether to process the registration request particularly when a network resource can not be accessed.

A FDN having a TLDA can be translated into an IP address from a DNS query by accessing at least one resource record from one of an at least one zone file and at least one file cache such as a root zone file having a wildcard resource record. The IP address corresponds to the network resource wherein the network resource is adapted to determine which namespace provider of a plurality of namespace providers can process the FDN. The network resource manages a primary virtual zero level domain (PVZLD). The namespace provider is a naming authority to at least one secondary virtual zero level domain (SVZLD) and the PVZLD is adapted to distribute the DNS query including the FDN having the TLDA to the at least one SVZLD.

A DNS server includes a root zone file and a resource record adapted to resolve a DNS query including a domain name having a top level domain alias (TLDA). The DNS server can be a single authoritative root server, alternative root server, and virtual inclusive root server. The resource record is a wildcard resource record and can include an IP address. The IP address corresponds to a network resource adapted to determine which namespace provider of a plurality of namespace providers can process the domain name having the TLDA. The network resource is adapted to manage a primary virtual zero level domain (PVZLD). The namespace provider is a naming authority to at least one secondary virtual zero level domain (SVZLD) and the PVZLD is adapted to redirect to at least one SVZLD in response to the resolved DNS query including said domain name having said TLDA.

When it is determined that the first domain name is resolvable it can be determined whether the network resource can be located and when it is determined that the first domain name is not resolvable, a registration request can be processed. When it is determined that the network resource can be located it can be determined whether the network resource can be accessed and when it is determined that the network resource can not be located, a registration request can be processed.

A domain name can be translated into an IP address by accessing at least one resource record from at least one zone file or file cache. A resource record can be a wildcard resource record having an IP address corresponding to a network resource adapted to determine which domain name registration provider of a plurality of domain name registration providers can process the registration request when it is determined that the first domain name is available for registration.

The registration request can be a domain name registration request and/or keyword registration request. The domain name registration request and keyword registration request can be contemporaneously processed. Domain name registration provider can be a domain name registrar, domain name reseller, or domain name affiliate. Keyword registration provider can be a keyword registrar, keyword reseller, and keyword affiliate. A keyword registration provider of a plurality of keyword providers can be selected to process the keyword registration request.

In a keyword registration request, at least one keyword can be generated from the identifier and determined whether the at least one keyword is resolvable. A keyword resolution request can be processed from the at least one keyword when the at least one keyword is determined resolvable. It can be determined whether the at least one keyword is available for keyword registration when the at least one keyword is determined not resolvable.

The keyword resolution request can be processed by accessing at least one network resource from the at least one keyword. At least one of a keyword resolver system and file cache can be queried to determine whether the at least one keyword is resolvable. A keyword registration form can be generated when the at least one keyword is determined available for registration and keyword registrant information can be provided when the at least one keyword is determined not available for registration. The keyword registration form can include a domain name registration form.

Related domain names may be generated from a first domain name and determined whether such generated domain names are available for registration by performing a WHOIS request on the first domain name and any the related domain names when processing a domain name registration request. A domain name registration form may be generates for each domain name determined available for registration and registrant information may be provided for each domain name determined not available for registration. A domain name registration form also includes a keyword registration form or may include any other identifier registration form.

The domain name registration provider is at least one of a domain name registrar, domain name reseller, and domain name affiliate. It can be determined which domain name registration provider of a plurality of domain name registration providers will process the domain name registration request by retrieving one of a default named domain name registration provider and a method of selecting a domain name registration provider from one of an autosearch template and modifiable configuration settings. The method of selecting a domain name registration provider is chosen from the least cost domain name registration provider, a preselected list of domain name registration provider, and a random choice of domain name registration provider. The method of selecting the least cost domain name registration provider can include the step of consulting a table of registration cost information updated in real time.

The first domain name can be a FDN and a valid domain name can be generated from at least a portion of the identifier and determined whether the network resource can be accessed from the valid domain name. A registration request having the FDN can be processed when it is determined that the valid domain name can not be accessed. The valid domain name can be generated from an autosearch.

An apparatus includes a processor, a memory in operative association with the processor, means for determining that an identifier includes a fictitious domain name (FDN), and means for requesting a network resource from at least a portion of said identifier. A computer program product includes computer readable program code stored on a computer readable medium, the program code adapted to execute the method for determining that an identifier includes a fictitious domain name (FDN), and requesting a network resource from at least a portion of the identifier.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. An apparatus comprising:
    a Domain Name System (DNS) server comprising a processing device configured to resolve a DNS query based on a predetermined syntax;
    wherein the DNS query includes a domain name having a highest level domain (HLD);
    wherein the DNS server is configured to use a root zone file having at least one resource record to facilitate the resolution of the DNS query in response to determining that the HLD is a top level domain alias (TLDA) that is not an HLD registered in the DNS server, and that the DNS query cannot be resolved in accordance with a set of registered domain names;
    wherein said resource record includes an Internet Protocol (IP) address and said IP address corresponds to a network resource different from the DNS server and configured to determine which namespace provider of a plurality of namespace providers is configured to resolve said domain name having said TLDA;
    wherein the DNS server is further configured to redirect the domain name to the namespace provider of the plurality of namespace providers based on the network resource.

2. The apparatus according to claim 1, wherein the DNS server is one of a single authoritative root server, alternative root server, or virtual inclusive root server.

3. The apparatus according to claim 1, wherein the resource record comprises a wildcard resource record.

4. The apparatus according to claim 1, wherein said network resource is configured to manage a virtual zero level domain (VZLD).

5. The apparatus according to claim 4, wherein the VZLD is an internet infrastructure domain managed from an ".arpa" top level domain.

6. The apparatus according to claim 4, wherein the VZLD is a primary virtual zero level domain (PVZLD).

7. A method for resolving queries to a Domain Name System (DNS), the method comprising:
    receiving a syntactically valid DNS query having a highest level domain name (HLD) at a DNS server;
    generating a resolved target of the DNS query in conjunction with the DNS server by operatively communicating between a resolver and the DNS server; and
    determining at the DNS server that the DNS query references a domain name that the DNS server cannot register in response to the HLD being a top level domain alias (TLDA) that is not an HLD registered in the DNS server, and in response thereto, accessing at least one resource record in a root zone file configured to provide information for resolving the syntactically valid DNS query by the DNS server; and
    wherein said resource record includes an Internet Protocol (IP) address and the IP address corresponds to a network resource different from the DNS server and configured to determine which namespace provider of a plurality of namespace providers is configured to resolve said domain name having said TLDA;

wherein the method further comprises the DNS server redirecting the domain name to the namespace provider of the plurality of namespace providers based on the network resource.

8. The method according to claim 7, wherein the DNS server is one of a single authoritative root server, alternative root server, or virtual inclusive root server.

9. The method according to claim 7, wherein the resource record comprises a wildcard resource record.

10. The method according to claim 7, wherein said network resource is configured to manage a virtual zero level domain (VZLD).

11. The method according to claim 10, wherein the VZLD is an internet infrastructure domain managed from an ".arpa" top level domain.

12. The method according to claim 10, wherein the VZLD is a primary virtual zero level domain (PVZLD).

13. A non-transitory computer readable medium having instructions stored thereon that, in response to execution by a computing device, cause the computing device to perform operations comprising:
- receiving a syntactically valid DNS query having a highest level domain name (HLD) at a DNS server;
- generating a resolved target of the DNS query in conjunction with the DNS server by operatively communicating between a resolver and the DNS server; and
- determining at the DNS server that the DNS query references a domain name that the DNS server cannot register in response to the HLD being a top level domain alias (TLDA) that is not an HLD registered in the DNS server, and in response thereto, accessing at least one resource record in a root zone file configured to provide information for resolving the syntactically valid DNS query by the DNS server; and
- wherein said resource record includes an Internet Protocol (IP) address and IP address corresponds to a network resource different from the DNS server and configured to determine which namespace provider of a plurality of namespace providers is configured to resolve said domain name having said TLDA;
- wherein the operations further comprise the DNS server redirecting the domain name to the namespace provider of the plurality of namespace providers based on the network resource.

14. The non-transitory computer readable medium according to claim 13, wherein the resource record comprises a wildcard resource record.

15. The non-transitory computer readable medium according to claim 13, wherein said network resource is configured to manage a virtual zero level domain (VZLD).

16. The non-transitory computer readable medium according to claim 15, wherein the VZLD is an internet infrastructure domain managed from an ".arpa" top level domain.

17. The non-transitory computer readable medium according to claim 15, wherein the VZLD is a primary virtual zero level domain (PVZLD).

* * * * *

UNITED STATES PATENT AND TRADEMARK OFFICE
CERTIFICATE OF CORRECTION

PATENT NO. : 8,612,565 B2
APPLICATION NO. : 13/538433
DATED : December 17, 2013
INVENTOR(S) : Schneider It is certified that error appears in the above-identified patent and that said Letters Patent is hereby corrected as shown below:

In the Drawings

In Fig. 3c, Sheet 16 of 47, for Tag "76", in Line 2, delete "F DN" and insert -- FDN --, therefor.

In the Specification

In Column 4, Lines 2-3, delete "an TCP/IP" and insert -- a TCP/IP --, therefor.

In Column 6, Line 20, delete "(NETL1B)." and insert -- (NETLIB). --, therefor.

In Column 7, Line 55, delete "(lnterNIC)" and insert -- (InterNIC) --, therefor.

In Column 10, Line 15, delete "WO09922488A2" and insert -- WO9922488A2 --, therefor.

In Column 12, Line 17, delete "rfc1034.html"." and insert -- rfc1034.html", --, therefor.

In Column 15, Line 7, delete "(1DNs)" and insert -- (IDNs) --, therefor.

In Column 18, Line 4, delete "PUR1as" and insert -- PURI as --, therefor.

In Column 22, Line 12, delete "PUR1s." and insert -- PURIs. --, therefor.

In Column 26, Line 5, delete "database 154" and insert -- database 152 --, therefor.

In Column 27, Line 25, delete "example.com The" and insert -- example.com. The --, therefor.

In Column 33, Line 62, delete "registry 152," and insert -- registry 154, --, therefor.

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,612,565 B2

In Column 35, Line 59, delete "a autosearch" and insert -- an autosearch --, therefor.

In Column 37, Line 65, delete ""GO L1ST"" and insert -- "GO LIST" --, therefor.

In Column 37, Line 67, delete ""GO L1ST"" and insert -- "GO LIST" --, therefor.

In Column 52, Line 63, delete "name = "name.game" and insert -- name = "name.game" --, therefor.

In Column 53, Line 12, delete "PUR1" and insert -- PURI --, therefor.

In Column 53, Line 15, delete "PUR1" and insert -- PURI --, therefor.

In Column 53, Line 19, delete "PUR1" and insert -- PURI --, therefor.

In Column 53, Line 19, delete "http://www2.same. in" and insert -- http://www2.same.in --, therefor.

In Column 53, Line 20, delete "PUR1" and insert -- PURI --, therefor.

In Column 53, Line 33, delete "PUR1s" and insert -- PURIs --, therefor.

In Column 54, Line 67, delete "machinereadable" and insert -- machine-readable --, therefor.

In Column 56, Line 14, delete "such as a" and insert -- such as --, therefor.

In Column 59, Line 32, delete "register.cgi?name=aollove&refer=msie" and
insert -- register.cgi?name=aol.love&refer=msie --, therefor.

In Column 59, Line 50, delete ""GO L1ST"" and insert -- "GO LIST" --, therefor.

In Column 59, Line 56, delete ""GO L1ST"" and insert -- "GO LIST" --, therefor.

In Column 59, Lines 60-61, delete ""GO L1ST"" and insert -- "GO LIST" --, therefor.

In Column 60, Line 21, delete "(1SP)" and insert -- (ISP) --, therefor.

In Column 62, Line 48, delete "a e-commerce" and insert -- an e-commerce --, therefor.

In Column 64, Line 67, delete "(PUR1)." and insert -- (PURI). --, therefor.

In Column 65, Lines 22-23, delete "PUR1 prefix and PUR1 suffix." and
insert -- PURI prefix and PURI suffix. --, therefor.